(12) United States Patent
Werth

(10) Patent No.: US 10,387,804 B2
(45) Date of Patent: Aug. 20, 2019

(54) IMPLEMENTATIONS OF, AND METHODS OF USE FOR A PATTERN MEMORY ENGINE APPLYING ASSOCIATIVE PATTERN MEMORY FOR PATTERN RECOGNITION

(71) Applicant: BoonLogic, Bloomington, MN (US)

(72) Inventor: Larry Werth, Eagan, MN (US)

(73) Assignee: BoonLogic, Minneapolis, MN (US)

( * ) Notice: Subject to any disclaimer, the term of this patent is extended or adjusted under 35 U.S.C. 154(b) by 834 days.

(21) Appl. No.: 14/870,990

(22) Filed: Sep. 30, 2015

(65) Prior Publication Data

US 2016/0092779 A1    Mar. 31, 2016

Related U.S. Application Data

(60) Provisional application No. 62/057,298, filed on Sep. 30, 2014.

(51) Int. Cl.
*G06N 20/20* (2019.01)
*G06N 20/10* (2019.01)
(Continued)

(52) U.S. Cl.
CPC ......... *G06N 20/20* (2019.01); *G06K 9/00986* (2013.01); *G06K 9/6273* (2013.01);
(Continued)

(58) Field of Classification Search
CPC .. G06N 99/005; G06N 3/0445; G06K 9/6273; G06K 9/00986
See application file for complete search history.

(56) References Cited

U.S. PATENT DOCUMENTS

| 4,504,970 A |   | 3/1985 | Werth et al. |
| 4,541,115 A | * | 9/1985 | Werth .................... G06K 9/68 |
|             |   |        | 382/159 |

(Continued)

FOREIGN PATENT DOCUMENTS

WO    1995005642    2/1995

OTHER PUBLICATIONS

Annovi et al. "A Pipeline of Associative Memory Books for Track Finding", IEEE Transactions on Nuclear Science, Jun. 2001, pp. 595-600, vol. 48, No. 3.

(Continued)

*Primary Examiner* — Ajay Ojha
(74) *Attorney, Agent, or Firm* — Winthrop & Weinstine, P.A.; Nadeem W. Schwen

(57) ABSTRACT

Computer-readable storage memory may include a) input memory having addressable blocks of random access memory storing an input data pattern, b) pattern input address memory having addressable blocks of random access memory, each of the addressable blocks storing a predetermined address of the input memory, c) current state address memory comprising a block of random access memory storing a current state address, and d) at least one next state memory having addressable blocks of random access memory, each of the addressable blocks storing predetermined data determining a next state address. The pattern input address memory and the at least one next state memory may each be sized with at least a number of addressable blocks as a maximum state address storable in the current state address memory. The current state address may index an addressable block of the pattern input address memory and the at least one next state memory.

18 Claims, 33 Drawing Sheets

(51) Int. Cl.
 G06N 20/00 (2019.01)
 G06N 3/04 (2006.01)
 G06K 9/00 (2006.01)
 G06K 9/62 (2006.01)
(52) U.S. Cl.
 CPC .......... *G06N 3/0445* (2013.01); *G06N 20/00* (2019.01); *G06N 20/10* (2019.01)

(56) References Cited

U.S. PATENT DOCUMENTS

| | | |
|---|---|---|
| 4,550,431 A | 10/1985 | Werth et al. |
| 4,551,850 A | 11/1985 | Werth et al. |
| 5,473,707 A | 12/1995 | Werth |
| 5,473,708 A | 12/1995 | Werth |
| 5,875,264 A | 2/1999 | Carlstrom |
| 6,473,846 B1 | 10/2002 | Melchior |
| 6,816,630 B1 | 11/2004 | Werth et al. |
| 7,240,048 B2 | 7/2007 | Pontius |
| 7,299,282 B2 | 11/2007 | Sarkissian et al. |
| 8,055,599 B1* | 11/2011 | Werth ............ G06K 9/68 706/45 |
| 8,335,750 B1 | 12/2012 | Werth |
| 8,612,371 B1 | 12/2013 | Werth |
| 2005/0144553 A1 | 6/2005 | Bass et al. |
| 2005/0251509 A1 | 11/2005 | Pontius |
| 2007/0150621 A1* | 6/2007 | Kravec ............ G06K 9/00986 710/1 |
| 2007/0192863 A1 | 8/2007 | Kapoor et al. |
| 2007/0255676 A1 | 11/2007 | Brown et al. |
| 2008/0189784 A1 | 8/2008 | Mangione-Smith et al. |

OTHER PUBLICATIONS

Mattausch et al. "Compact Associative-Memory Architecture With Fully Parallel Search Capability for the Minimum Hamming Distance", IEEE Journal of Solid-State Circuits, Feb. 2002, pp. 218-227, vol. 37, No. 2.

Wang et al. "On New Fuzzy Morphological Associative Memories", IEEE Transactions on Fuzzy Systems, Jun. 2004, pp. 316-323, vol. 12, No. 3.

* cited by examiner

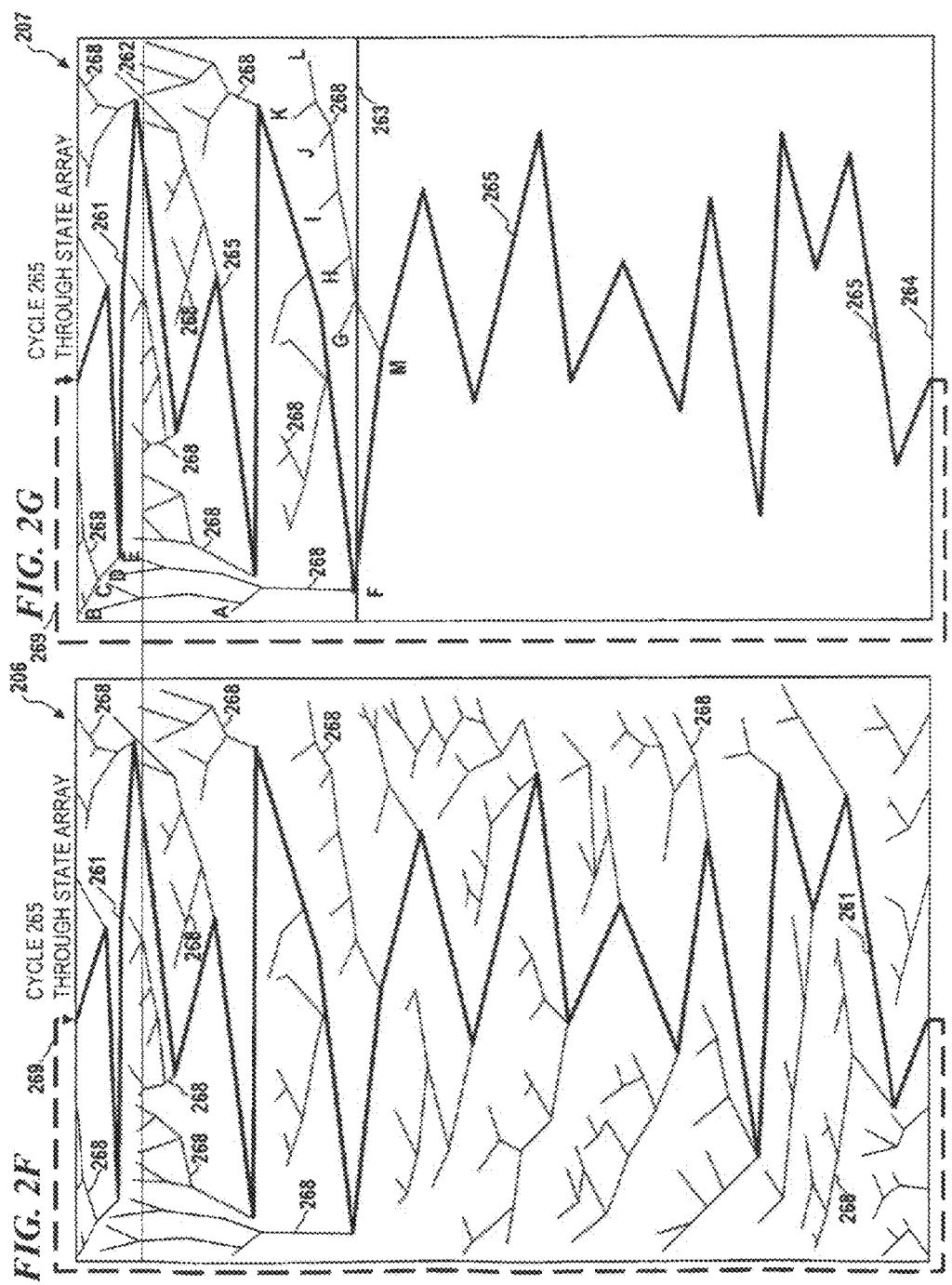

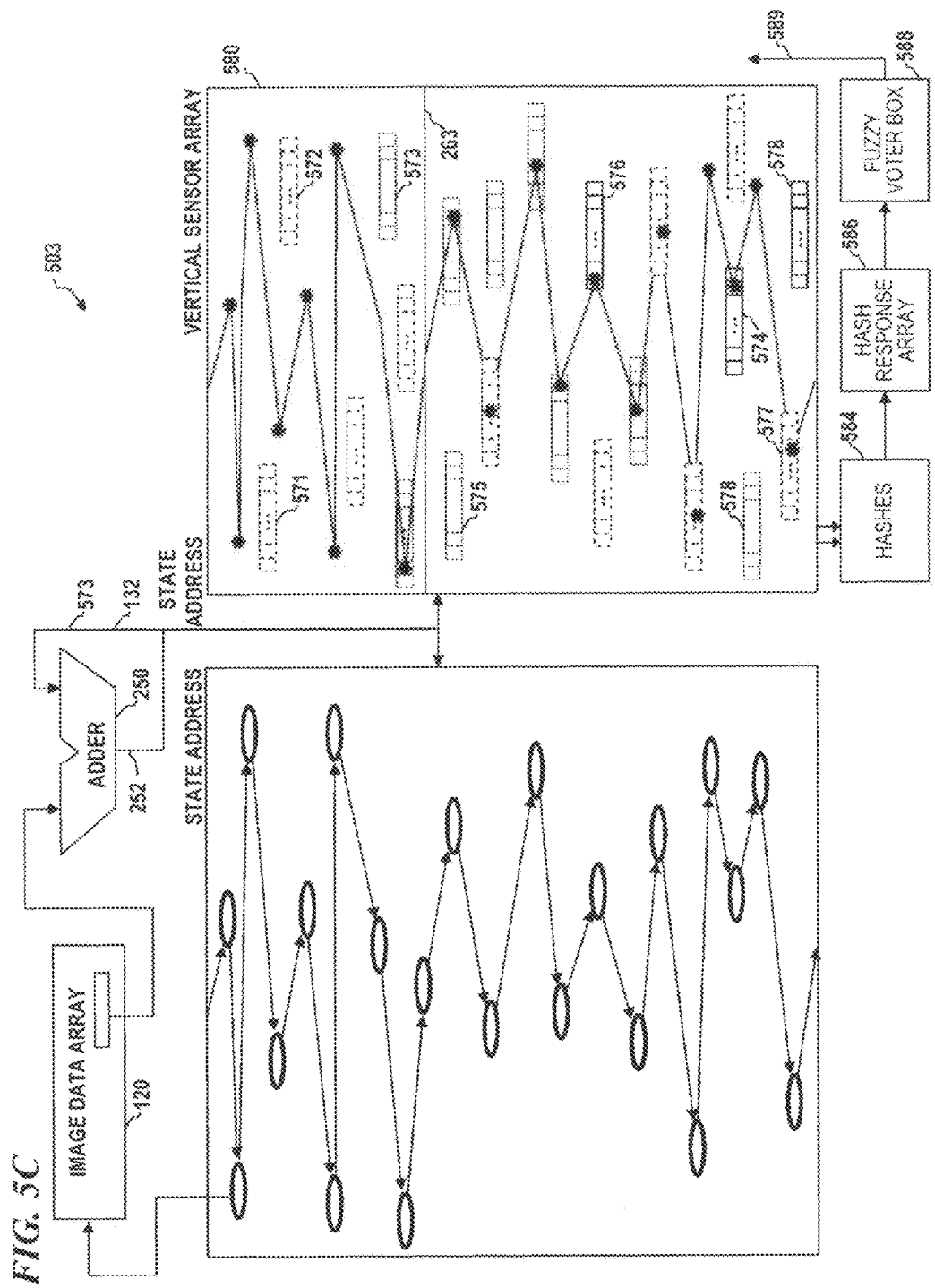

IMPLEMENTATIONS OF, AND METHODS OF USE FOR A PATTERN MEMORY ENGINE APPLYING ASSOCIATIVE PATTERN MEMORY FOR PATTERN RECOGNITION

CROSS-REFERENCE TO RELATED APPLICATIONS

This application claims priority to U.S. Prov. Pat. Appl. No. 62/057,298, titled "Systems and Devices Using Pattern Memory Engine," filed Sep. 30, 2014, and is related to U.S. Pat. No. 8,055,599, titled "Pattern Recognition Using Cycles or Traces in an Associative Pattern Memory (APM), Vertical Sensors, Amplitude Sampling, Adjacent Hashes and Fuzzy Hashes," issued Nov. 8, 2011, U.S. Pat. No. 8,335,750, titled "Associative Pattern Memory (APM) with Vertical Sensors, Amplitude Sampling, Adjacent Hashes and Fuzzy Hashes," issued Dec. 18, 2012, and U.S. Pat. No. 8,612,371, titled "Computing Device and Method Using Associate Pattern Memory Using Recognition Codes for Input Patterns," issued Dec. 17, 2013, and the contents of each are hereby incorporated by reference herein in their entirety.

This application is also related to U.S. Pat. No. 4,504,970, titled "Training Controller for Pattern Processing System," issued Mar. 12, 1985, U.S. Pat. No. 4,541,115, titled "Pattern Processing System," issued Sep. 10, 1985, U.S. Pat. No. 4,550,431, titled "Address Sequencer for Pattern Processing System," issued Oct. 29, 1985, U.S. Pat. No. 4,551,850, titled "Response Detector for Pattern Processing System," issued Nov. 5, 1985, U.S. Pat. No. 5,473,707, titled "Pattern Processing System with Weighted Training Codes," issued Dec. 5, 1995, and U.S. Pat. No. 5,473,708, titled "Pattern Processing System Using Minimum Length Address Loops," issued Dec. 5, 1995, and the contents of each are hereby incorporated by reference herein in their entirety.

FIELD OF THE INVENTION

The present disclosure relates to the field of computerized pattern recognition. Particularly, the present disclosure relates to computerized pattern recognition through a Pattern Memory Engine (PME) using an associative pattern memory, referred to herein as cycles.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There has been a lot interest in technologies for computer pattern recognition. For example, in *Mathematical Neurobiology* by J. S. Griffith (Academic Press, New York, 1971), models of neural networks are described. One model was a randomly connected network of neurons. Each neuron was either active (firing) or inactive. The total status of all the neurons defined the state of activity of the network. Since the neurons are connected to other neurons, any given state of activity would generate a next state of activity. Although the neuron connections were initially assigned at random, the connections remain fixed as the network moves from one state to the next. The total number of possible states is finite. Given any initial state, the network will step from state to state and ultimately hit a state that occurred previously. Since the network connections are fixed (deterministic), the network will continue to cycle through the same set of states. Given any arbitrary initial state the network always terminate in a cycle. Finite automata are a type of cellular automata that are the main focus of *A New Kind of Science* by Stephen Wolfram (Wolfram Media, Inc., 2002). In his book and other research papers, cycles are analyzed in depth.

The above mentioned U.S. Pat. Nos. 4,504,970, 4,541,115, 4,550,431, 4,551,850, 5,473,707, and 5,473,708 describe various pattern recognition methods including using Associative Pattern Memory (APM) techniques to detect patterns. However, there remains a need in the art for improved systems and methods for computerized pattern recognition.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a computer-readable storage memory. The computer-readable storage memory may include a) input memory having addressable blocks of random access memory, the input memory storing an input data pattern, b) pattern input address memory having addressable blocks of random access memory, each of the addressable blocks storing a predetermined address of the input memory, c) current state address memory comprising a block of random access memory storing a current state address, and d) at least one next state memory having addressable blocks of random access memory, each of the addressable blocks storing predetermined data for determining a next state address to store in the current state address memory. The pattern input address memory and the at least one next state memory may each be sized with at least a number of addressable blocks as a maximum state address storable in the current state address memory. The current state address may index an addressable block of the pattern input address memory and the at least one next state memory. In some embodiments, there may be at least two next state memories, each having addressable blocks of random access memory, each of the addressable blocks storing predetermined data for determining a next state address to store in the current state address memory. In such embodiments, data in an addressable block of the input memory indexed by the predetermined address in an addressable block of the pattern input address memory indexed by the current state address may determine which of the at least two next state memories to index for determining a next state address to store in the current state address memory. In further embodiments, there may be magnitude comparison memory having addressable blocks of random access memory, each of the addressable blocks storing a predetermined magnitude value. In such embodiments, data in an addressable block of the input memory indexed by the predetermined address in an addressable block of the pattern input address memory indexed by the current state address may be compared with a magnitude value in an addressable block of the magnitude comparison memory indexed by the current state address, and the result of the comparison may determine which of the at least two next state memories to index for determining a next state address to store in the current state address memory. In some embodiments, the predetermined data in each of the addressable blocks of the at least one next state memory contains a random number between a predetermined range of numbers. In other embodiments, the predetermined data in each of the addressable blocks of the at least one next state memory contains a next state address value, the next state address value being a summation of an index of the respective addressable block of the at least one next state memory and a random number between a predetermined range of numbers. In still further embodiments, there may be ID memory having addressable blocks of random access memory, each of the addressable blocks storing an ID hash of predetermined bits, and addressable by an ID hash index. In additional embodiments, there may be vertical sensory memory having addressable blocks of random access memory, each of the addressable blocks storing predetermined data from which a hash index and bit number can be determined, the bit number identifying which bit in the ID hash indexed in the ID memory by the hash index to set.

The present disclosure, in another embodiment, relates to a computer-readable storage memory. The computer-readable storage memory may include a) input memory having addressable blocks of random access memory, the input memory storing an input data pattern, b) pattern input address memory having addressable blocks of random access memory, each of the addressable blocks storing a predetermined address of the input memory, c) current state address memory comprising a block of random access memory storing a current state address, and d) at least one next state memory having addressable blocks of random access memory, each of the addressable blocks storing predetermined data for determining a next state address to store in the current state address memory. The pattern input address memory and the at least one next state memory may each be sized with at least a number of addressable blocks as a maximum state address storable in the current state address memory. The current state address may index an addressable block of the pattern input address memory and the at least one next state memory. In some embodiments, there may be pattern map memory having addressable blocks of random access memory, data in an addressable block of the pattern map memory indexed by the predetermined address in an addressable block of the pattern input address memory indexed by the current state address. In such embodiments, each addressable block of the pattern map memory may store data identifying the type of data stored in an addressable block of the input memory indexed by the predetermined address in an addressable block of the pattern input address memory indexed by the current state address. In some embodiments, the type of data stored in an addressable block of the input memory may be binary data, magnitude data, or category data. Category data may be data from a dataset having a predetermined number of data choices. In such embodiments, the at least one next state memory may include a next state memory corresponding to each data choice. If an addressable block of the pattern map memory indexed by the predetermined address in an addressable block of the pattern input address memory indexed by the current state address identifies the type of data stored in an addressable block of the input memory indexed by the predetermined address in an addressable block of the pattern input address memory indexed by the current state address as a category type, then a next state address to store in the current state address memory may be determined from data in the next state memory corresponding to the data in an addressable block of the input memory indexed by the predetermined address in an addressable block of the pattern input address memory indexed by the current state address. In some embodiments, there may be ID memory having addressable blocks of random access memory, each of the addressable blocks storing an ID hash of predetermined bits, and addressable by an ID hash index. In further embodiments, the ID hashes of ID memory may be determined from a sequence of selections of the at least two next state memories.

The present disclosure, in yet another embodiment, relates to a parallel pattern memory engine comprising at least two of the computer-readable storage memories described above operating in parallel. In some embodiments, the addressable blocks of the pattern input address memory of one of the at least two of the computer-readable storage memories may have a different set of predetermined addresses than the addressable blocks of the pattern input address memory of another of the at least two of the computer-readable storage memories. Likewise, the addressable blocks of the at least one next state memory of one of the at least two of the computer-readable storage memories may have a different set of predetermined data than the addressable blocks of the at least one next state memory of another of the at least two of the computer-readable storage memories. In some embodiments, the input data pattern of one of the at least two of the computer-readable storage memories may be data from a different source than the input data pattern of another of the at least two of the computer-readable storage memories. In a further embodiment, there may be a first sensor generating a first type of data and providing pattern data as the input data pattern to one of the at least two of the computer-readable storage memories and a second sensor generating a second type of data and providing pattern data as the input data pattern to another of the at least two of the computer-readable storage memories.

The present disclosure, in yet another embodiment, relates to a serial pattern memory engine comprising at least two of the computer-readable storage memories described above operating in serial. In such case, a computer-readable storage memory on a lower level may provide its output to a computer-readable storage memory on a higher level. In additional embodiments, the serial pattern memory engine may include another computer-readable storage memory operating in parallel with at least one of the other computer-readable storage memories. In certain embodiments, a computer-readable storage memory on a higher level may provide its output as feedback to a computer-readable storage memory on a lower level.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 2F is another diagram of a state array, according to some embodiments of the present disclosure.

FIG. 2G is another diagram of a state array, according to some embodiments of the present disclosure.

FIG. 5C is a more detailed block diagram of a limited jump pattern-recognition system that uses a vertical sensor array to generate hashes, according to some embodiments of the present disclosure.

DETAILED DESCRIPTION

Figure 1A:
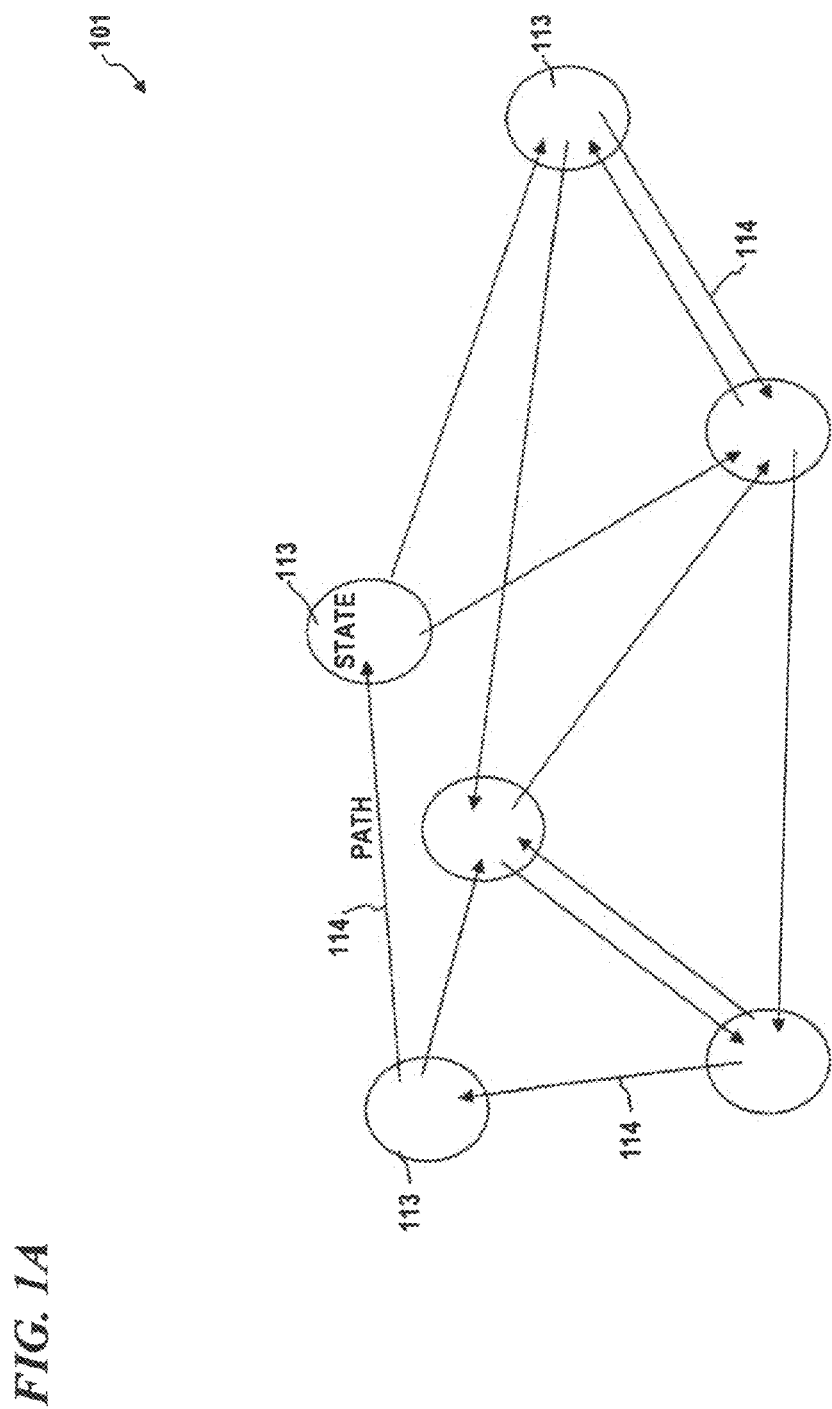
FIG. 1A shows a directed graph representing some embodiments of the present disclosure.

The present disclosure relates to novel and advantageous computerized pattern recognition. Particularly, the present disclosure relates to novel and advantageous computerized pattern recognition through a Pattern Memory Engine (PME) using an Associative Pattern Memory (APM), also referred to herein as cycles. Although the following detailed description contains many specifics for the purpose of illustration, a person of ordinary skill in the art will appreciate that many variations and alterations to the following details are within the scope of the various embodiments of the present disclosure. Accordingly, the following embodiments of the present disclosure are set forth without any loss of generality to, and without imposing limitations upon, the claimed invention.

The following Table 1 includes data from J. S. Griffith's book:

TABLE 1

| Total # States | Expected # of Terminal States | Expected # of Cycles | Expected # of Transition States | Fraction Terminal States |
|---|---|---|---|---|
| 100 | 12 | 3 | 7 | 0.12 |
| 1,000 | 40 | 4 | 20 | 0.04 |
| 10,000 | 125 | 5 | 63 | 0.0125 |
| 100,000 | 396 | 6 | 198 | 0.00396 |
| 1,000,000 | 1,253 | 7 | 627 | 0.001253 |
| 10,000,000 | 3,963 | 9 | 1982 | 0.000396 |
| 100,000,000 | 12,533 | 10 | 6267 | 0.0001253 |
| 1,000,000,000 | 39,632 | 11 | 19817 | 0.0000396 |

Note that, in some embodiments:

Given any initial state, there will be a certain number of transition states before a path converges to a cycle or a trace. Column 4 in Table 1 describes the expected number of such transition states.

Column 2 describes the expected number of states that will be in a cycle (terminal states).

Column 3 describes the expected number of different cycles.

Column 5 describes the fraction of total states that will be in cycles.

One significance of Table 1 is that, given any arbitrary initial state, the network will always converge to a small fraction of terminal states and therefore provides a form of data reduction or representation. For example, given 1 million possible states, only 1,253 will be in terminal states (i.e., a looping path, cycle or trace).

For example, if each state was mapped to a region of an input pattern and the next state was dependent on the sample value at that point each different input pattern would create a different random network for which the same statistics apply as in the table above. A random next state could still be assigned to each state for each different sample value. This data reduction or representation therefore can provide an enormous capacity to distinguish and represent different patterns. Further, if the sequence of states in the terminal states were also considered in the representation, the capacity to distinguish and represent patterns increases even more dramatically.

A technology that uses this concept of cycles and improves thereon is described in U.S. Pat. Nos. 8,055,599, 8,335,750, and 8,612,371, which were previously incorporated by reference herein in their entirety. The various embodiments of the present disclosure provide further improvements over those patents.

One Implementation of Concept of the Present Disclosure

The concept of states and state transitions does not have to be about neural networks. State transition diagrams are used in many disciplines. Probably the most general discipline is finite automata. It can be illustrated as a directed graph.

For example, in FIG. 1A, each state 113 is represented as a circle and the transitions or path 114 are represented as arrows. In the embodiment shown, each state has two possible next states, which, in this example, could correspond to a sample value of 1 or 0 from a specific region of a binary input pattern. Depending upon the discipline, cycles are called attractors, oscillations, limit cycles, or reverberations. Reverberations are cycles observed in real biological networks. Finite automata are a type of cellular automata that are the main focus of *A New Kind of Science* by Stephen Wolfram (Wolfram Media, Inc., 2002). In his book and other research papers, cycles are analyzed in depth.

In some embodiments, a state is simply a memory address in an array (e.g., a state array or a vertical-sensor array). An array of 1 million represents 1 million states. As used herein, a state and a memory address used to access data in the state array are equivalent.

Figure 1B:
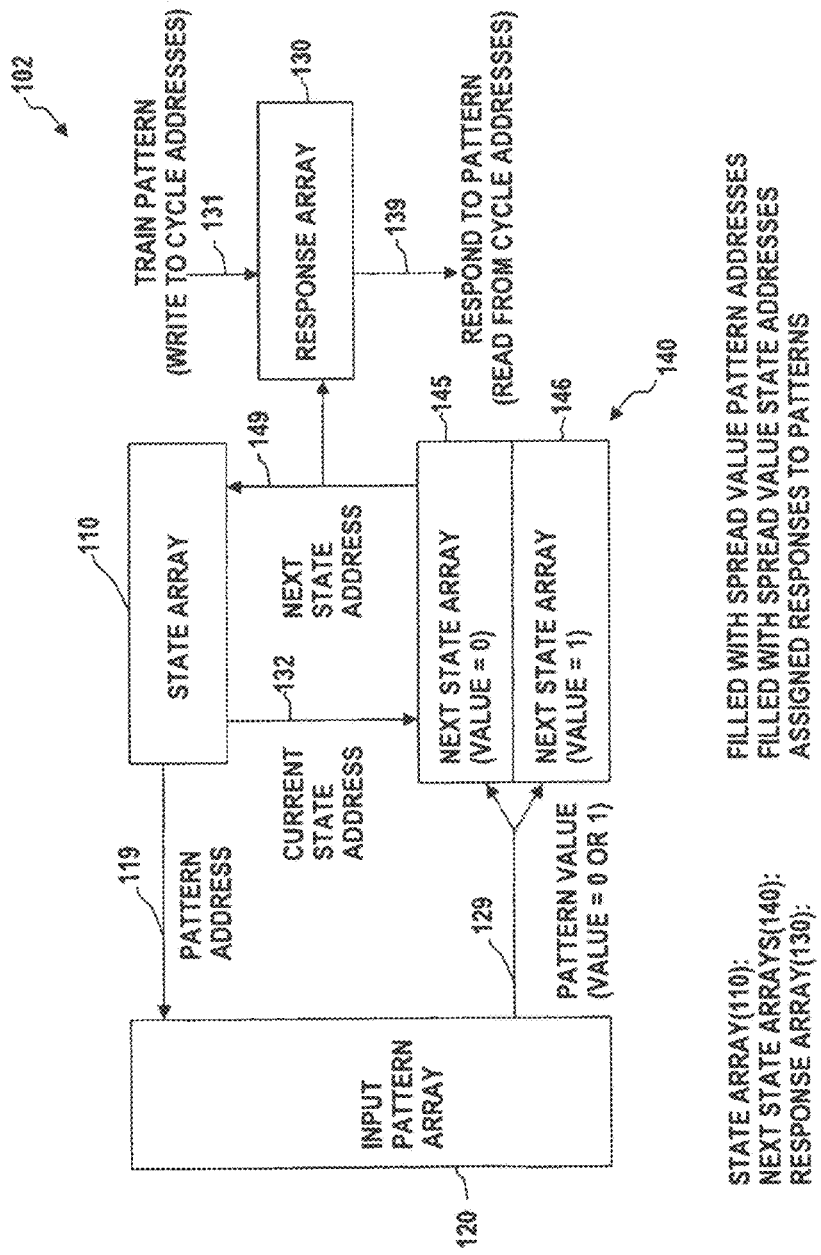
FIG. 1B is a conceptual block diagram of an unlimited jump pattern-recognition system, according to some embodiments of the present disclosure, which can be implemented in software and/or hardware.

In some embodiments of a PME, as shown in FIG. 1B, the state array 110, next state arrays 145 and 146, and response array 130 have the same number of addresses and share a common state address which can be either the current state address 132 or the next-state address 149. In some embodiments, the arrays are combined and thus implemented as a single four-dimensional array (i.e., an array in which each location stores four data values: a state-array value, a next-state-array value for pattern value=0, a next-state-array value for pattern value=1, and a response-array value (if there is one) for a trained pattern that has a path that encounters that address). In some embodiments, the input pattern value 129 (the data from a location in input pattern array 120 that is addressed by the pattern address 119 from the state array 110) determines the next state address 149. In some embodiments, the input pattern is represented by the input pattern array 120 as binary-sample values and therefore there is a next state array (145 and 146) for each of the (in this case, two) possible input-pattern values (the values at the locations in the input pattern that are sampled by the path). In some other embodiments, the present invention uses methods to handle multiple (i.e., more than two) pattern values that include multiple next state address arrays such as shown in FIG. 1C, or methods that use techniques other than assigning each separate value an array (such as the normalizing method shown in FIG. 3), however, this is a diagram to show one implementation.

In order to spread out the various paths that different input patterns generate, a set of spread values (e.g., random numbers, pseudo-random values, or values derived from, for example, selected digits or sets of digits from transcendental numbers such as pi, e, square roots of prime numbers, or the like, or any other set of numbers that will help to spread out the paths and/or the hash(es) derived from the hash(es) obtained from a given input pattern) are used to initialize various arrays in the PME processor. These types of numbers are herein called "spread numbers" and are typically generated by one of the above manners (e.g., a random-number generator, or by sampling various digits of a transcendental number) by a PME generator. In some embodiments, the state array is initialized by loading into it spread numbers (e.g., pseudo-random) that each point to one of the addresses in the input array (i.e., these numbers tell the PME processor which input value to sample at each state of the state array), and the next-state-increment array is initialized by loading into it spread numbers (e.g., pseudo-random) that each indicate the size of the increment for the next state address (when added to the current-state address, the sum points to one of the addresses in the state array (i.e., these numbers tell the PME processor which address in the state array has the next input value to sample). By using random numbers or any other suitable set of numbers (as described above), the sequence and set of input pattern values that are sampled are spread out (so different hashes or different paths result from different input patterns, and such that the same or similar hashes or paths are generated from the same or similar input patterns.

In some embodiments, in the training mode, a succession of training input patterns are used, for example each training input pattern is presented and continuously sampled in a random or pseudo-random (i.e., spreading) manner. A cycle will be generated or a trace will be detected for each training input pattern at which time the desired response (e.g., a pattern identifier that the programmer wants the system to output) for that pattern can be written into the response array 130 at the addresses in the cycle or trace. In response mode (also called recognition mode) the content of the response array 130 is read once a cycle or trace is identified. If the to-be-recognized input pattern is the same as (or substantially similar to) one previously trained, then the cycle addresses will contain the desired responses (the pattern identifiers stored into the response array during the prior training mode) for that pattern. For example, if the pattern input was an image of the character "A", the trained response could be the ASCII code for "A" or other suitable identifier for that pattern. In this case the intended response would be for pattern recognition.

Figure 1C:
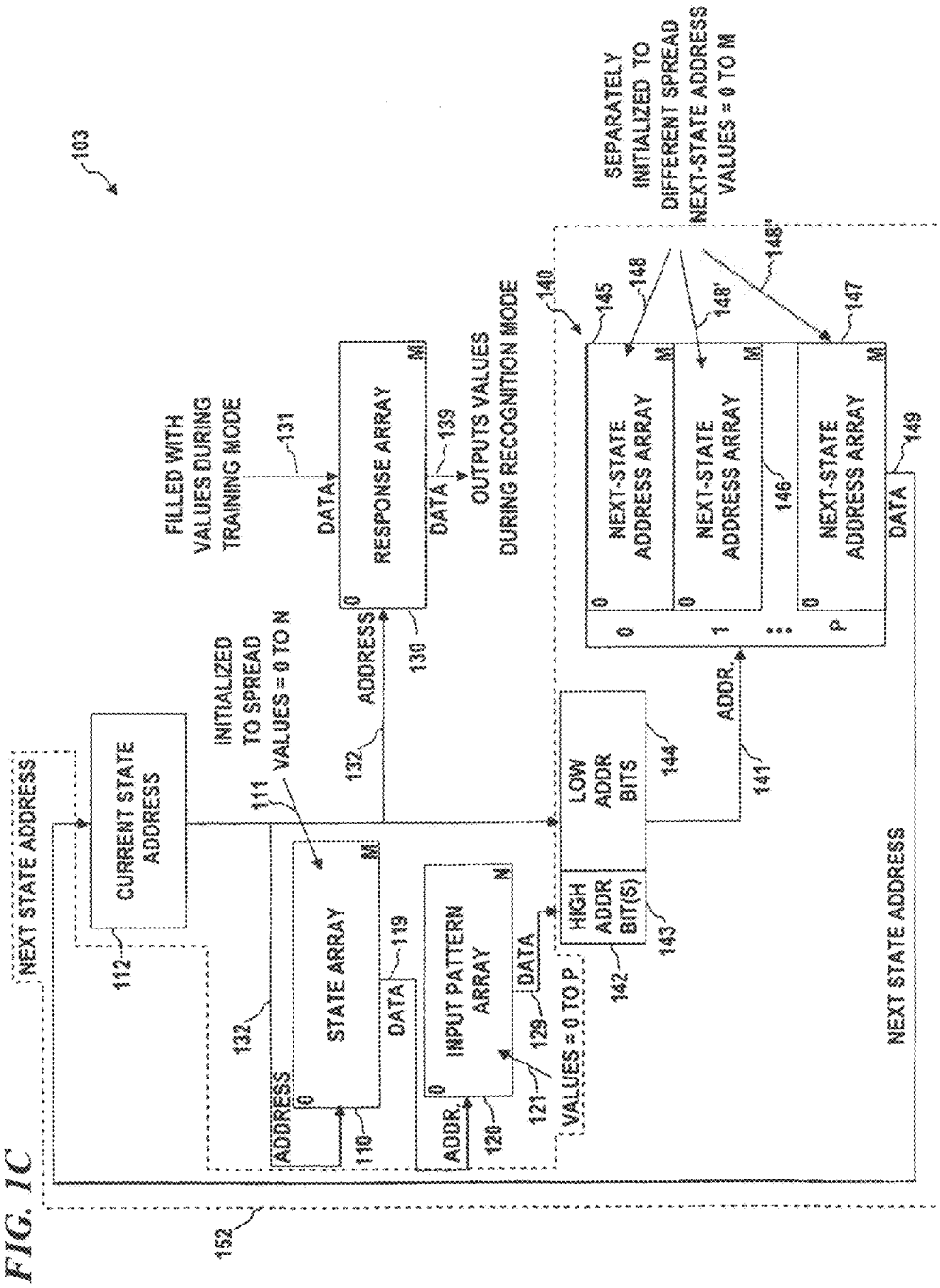
FIG. 1C is a block diagram of another unlimited jump pattern-recognition system, according to some embodiments of the present disclosure, which can be implemented in software and/or hardware.

FIG. 1C is a block diagram of an unlimited jump pattern-recognition (UJPR) system 100, according to some embodiments of the present disclosure, which can be implemented in software and/or hardware. Since the next-state-address arrays for each input-pattern-array value forms the entire address for the state array, the length of the jump from any given state array address to the next state array address is unlimited and can be considered to be forward (to a higher address) or backward (to a lower address than the current address). In some embodiments, this embodiment does not readily permit forcing a minimum cycle length. In some embodiments, UJPR system 103 includes an input pattern array 120 (having N+1 locations that are addressed as 0 to N). It also uses a state array 110 (having M+1 locations that are addressed as 0 to M) that is initialized by filling each location with a random number (or other spread number) between 0 and N (denoted RANDOM(0:N)), and one or more next-state address arrays 145, 146 and/or 147. In operation, next-state-address unit 152 is used to read data 119 from the state array 110 and is used as an address into the input pattern array 120; the data 129 read from the input pattern array (IPA) 120 is used as the upper-order address bits 143 and the current state address 112 is used for the lower-order address bits 144, wherein address register 142 (containing the upper bits 143 and lower bits 144 together) outputs an address 141 into the next-state address array (NSAA) 140 (which, in some embodiments, is divided into individual next-state address arrays 145, 146 and/or 147, wherein the data value from input pattern array 120 selects which one of the next-state address arrays 145, 146 and/or 147 to use to obtain the next address for the state array).

In initialization mode, UJPR system 103 is "initialized" by loading each location of state array 110 with a random number between 0 and N (denoted RANDOM(0:N)). In some embodiments, each location in each of the next-state address arrays 145, 146 and/or 147 is initialized with a random number between 0 and M (allowing branches or state jumps to any state location (0 to M) in state array 110). The data 149 read from the NSAA 140 is loaded into current state address register 112 which then provides that address as the next current-state address 132 into the state array 110.

In training mode, UJPR system 103 is "trained" by loading a known sample pattern into IPA 120, starting at an arbitrary address in the state array 110 (such as address zero or any other address). The value from that starting state is read and used as the address into the IPA 120 to obtain a sample value, which is used for determining the next state address, which is then sampled and the process is repeated until at some point, it is detected that one of the states is visited again. From that point on, the branching pattern will repeat, since the data in input pattern array 120, state array 110, and next-state address arrays 140 is fixed and thus will yield the same branches. This condition of repeating branches through the state array 110 is called a cycle. Once a cycle is detected, the set of addresses of that cycle (which can be obtained by again repeating the cycle) is used as address inputs 132 to response array 130, and data 131 identifying the particular training pattern is written to each of the cycle addresses in response array 130. This process is then repeated for as many known sample patterns as desired (in some embodiments, a plurality of different input patterns are detected as the same pertinent data and identical response data is loaded in all locations of the cycles detected for those input data, while in other embodiments, each training pattern is designated to be recognized with a different response, so each cycle is loaded with different response data).

In recognition mode, UJPR system 103 is used to analyze a set of input data (such as an image, handwriting, audio, video, seismic data or any other data) by loading at least a part of the data (an input sample pattern) into IPA 120, starting at an arbitrary address in the state array 110 (such as address zero or any other address). The value from that starting state is read and used as the address into the IPA 120 to obtain a sample value, which is used for determining the next state address, which is then sampled and the process is repeated until at some point, it is detected that one of the states is visited again. From that point on, the branching pattern will repeat, since the data in input pattern array 120, state array 110, and next-state address arrays 140 is fixed and thus will yield the same branches. Once a cycle is detected for the unknown input data, any one of the set of addresses of that cycle is used as address input 132 to response array 130, and data 139 having the response loaded during training identifying the particular training pattern is read from response array 130, and that response is the recognized pattern (the output of the analysis).

As used herein, a state array 110 is an array of data, wherein the data at each location in the state array 110 specifies one portion (a location) of the input pattern array that will be sampled and, with the next-state address array(s), specifies the order in which those portions are sampled. In some embodiments, the state array 110 is initially filled with random (or pseudo random) numbers between 1 and the number of entries (N) in the input pattern array 120. In some embodiments, each entry in the state array 110 specifies one address in the input pattern array (IPA) 120, and in operation (training mode or recognition mode, respectively), the pattern recognition system will read the value from that address in the IPA 120 (which has been loaded with data to be trained or analyzed, respectively) and use the value from there to determine the next address (state) in the state array 110.

As used herein, a "cycle" is the pattern of states or the path (i.e., the sequence of addresses used to address locations in the state array) that is obtained by processing a given input pattern using an APM-processing system, such as the various embodiments of PME disclosed herein, with a given state array pattern (i.e., the data loaded into the state array) and a given next-state-address pattern (the data or calculations used to obtain the next address used to obtain data from the state array), wherein regardless of the starting state, the branching pattern (given that increments from addresses near the end of the array branch to addresses at the beginning of the array (an end-around branch)) will eventually end up in a loop-branching path or pattern (i.e., herein called the cycle). Once the path is discovered to use an address previously used along this path, it is said that the cycle has been detected.

As used herein, "trace" is the pattern of states or the path (i.e., the sequence of addresses used to address locations in the state array) that is obtained by processing a given input pattern using an APM-processing system, such as the various embodiments of PME disclosed herein, with a given state-array pattern and a given next-state-address pattern, wherein as long as the starting state is sufficiently close to the start of the state array, the sequence of addresses will have converged (to a given certainty or probability) to the same path as would be detected as a cycle using the method of the previous paragraph. As described below, a trace boundary can be defined that establishes to a given probability, that the path is following the same address sequence as would be followed by a cycle when following a path. The portion of the path after the trace boundary is called the trace. The term "path" is herein used as the generic term for the sequence of addresses that define either a cycle or a trace.

The systems (FIG. 1B and FIG. 1C) described above have limitations which were addressed in U.S. Pat. No. 5,473,708. As detailed in Table 1 above, most likely, more than one cycle can occur depending upon the initial state. This means that for any given pattern, all the cycles that could occur for that pattern need to be trained. Also, since the next state for each state is randomly selected, the next state could happen to be the same as the current state (a cycle of length 1) and only one sample point and only one response address would be accessed. The response would simply repeat whatever was stored at that response address and be useless.

U.S. Pat. No. 5,473,708 was important to the success of some embodiments of the concept. A method was implemented that would control the minimum length of any cycles that could occur. Once a state occurs it is prevented from reoccurring for a minimum number of subsequent states. This is referred to this as a refractory period.

Implementing a refractory period offers several advantages. The input pattern will be sampled at least some minimum number of times. Transition states have a greater tendency to converge back to the single cycle given small variations in the input pattern allowing for fuzzy recognition. With an appropriate minimum cycle length there is a high probability that there will only be one cycle for a given input pattern—not multiple cycles.

Consider an example with an APM having one-million states and a minimum cycle length of at least 3700 states. If there were more than one cycle, the second cycle would also have to be 3700 or longer and the two cycles could not have a common address. Given that any cycle is a random selection of addresses, it is highly improbable that there would exist a second cycle with 3700 randomly selected points that would not overlap with the first cycle. The probability of not selecting one of the 3700 points out of 1 million is: 996,300/1,000,000 or 0.9963. The probability of not selecting 1 of the 3700 after 3700 tries is: (0.9963)^3700 or 0.0000011 or one in a million. Therefore, the selection of a minimum cycle length can essentially assure that there will be only one cycle for any given input pattern. A cycle is simply a random set of addresses in memory that identify themselves by being accessed repeatedly. As a result, any input pattern can be represented by a random set of addresses in memory.

There are different ways to implement a minimum cycle length. One embodiment involves changing the content of the next state arrays and adding a counter to create the next state. Rather than have the next state arrays contain the actual addresses of the state array, they contain random numbers within a specified range that are added to a counter. The count value becomes the next state address and random addresses are generated incrementally. Once the counter exceeds the number of states it rolls over to the beginning of the count just like a typical binary counter. An identical count (next state) cannot occur until after the count rolls over. With a state memory size of one million and a minimum cycle of about 3700 the next state arrays should contain random numbers between 1 and 540 (not zero, since that would result in a cycle of length 1). This means that the average increment of the counter would be 540 divided by 2, which is 270, and the average number of steps (states) before it rolls over at 1 million would be 1,000,000 divided by 270, which is 3,703. Therefore the average cycle will be very close to 3700 and only one cycle will exist for each pattern.

Figure 2A:
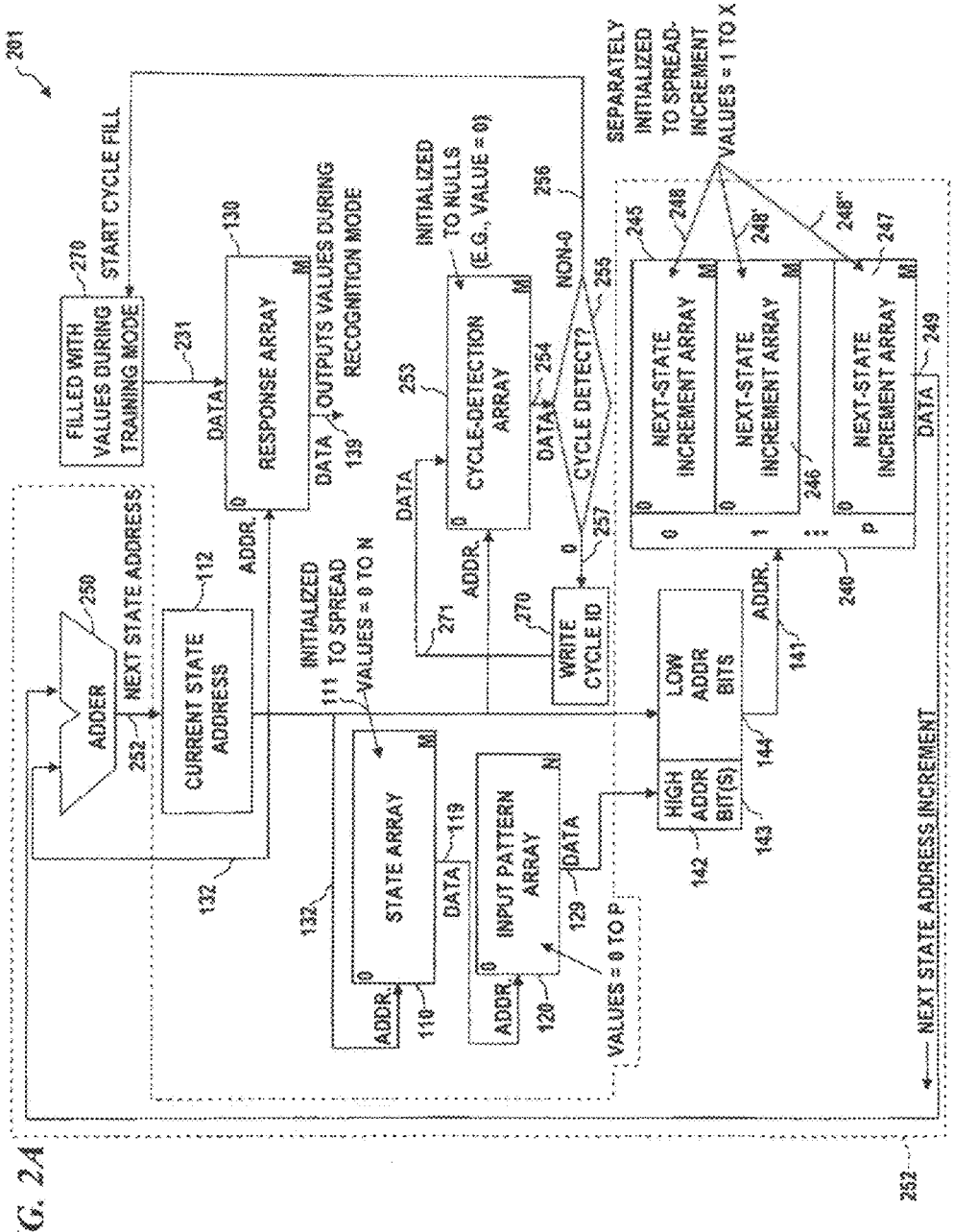
FIG. 2A is a block diagram of a limited jump pattern-recognition system, according to some embodiments of the present disclosure, which can be implemented in software and/or hardware.

FIG. 2A is a block diagram of a limited jump pattern-recognition (LJPR) system 201, according to some embodiments of the invention, which can be implemented in software and/or hardware. LJPR system 201 implements a different mechanism for limiting a minimum number of states in every cycle. In some embodiments, those elements having reference numbers between 100 and 199 are identical to like-numbered elements in UJPR system 103 of FIG. 1C, described above. One feature of LJPR system 200 is that the current state address is determined by using next-state-address unit 252 and adding a next-state increment to the current state address, and limiting the step size of the increment to a value less than a selected value X. Thus, next-state increment array (NSIA) 240 (which, in some embodiments, is divided into individual next-state address arrays 245, 246 and/or 247, wherein the data value from input pattern array 120 selects which one of the next-state increment arrays 245, 246 and/or 247 to use to obtain the next address for the state array, and the current state address 132 is used for the low address bits of the address of NSIA 240).

In initialization mode, LJPR system 201 is initialized by loading each location of state array 110 with a random number between 0 and N (denoted RANDOM(0:N)). In some embodiments, each location in next-state increment array 245 is initialized with data 248 each location having a random number between 1 and X, each location in next-state increment array 246 is initialized with data 248' each location having a random number between 1 and X, and each location in next-state increment array 247 is initialized with data 248" each location having a random number between 1 and X (allowing branches or state jumps to a limited number of forward-direction states), thus forcing every cycle to have an end-around jump from a state near the end of state array 110 (within X locations of the end) to a state near the beginning of state array 110 (within X locations of the beginning). The data 249 read from the NSIA 240 is added to the address from current state address register 112 and the resultant sum is loaded into current state address register 112 which then provides that address as the next current-state address 132 into the state array 110.

Figure 12:
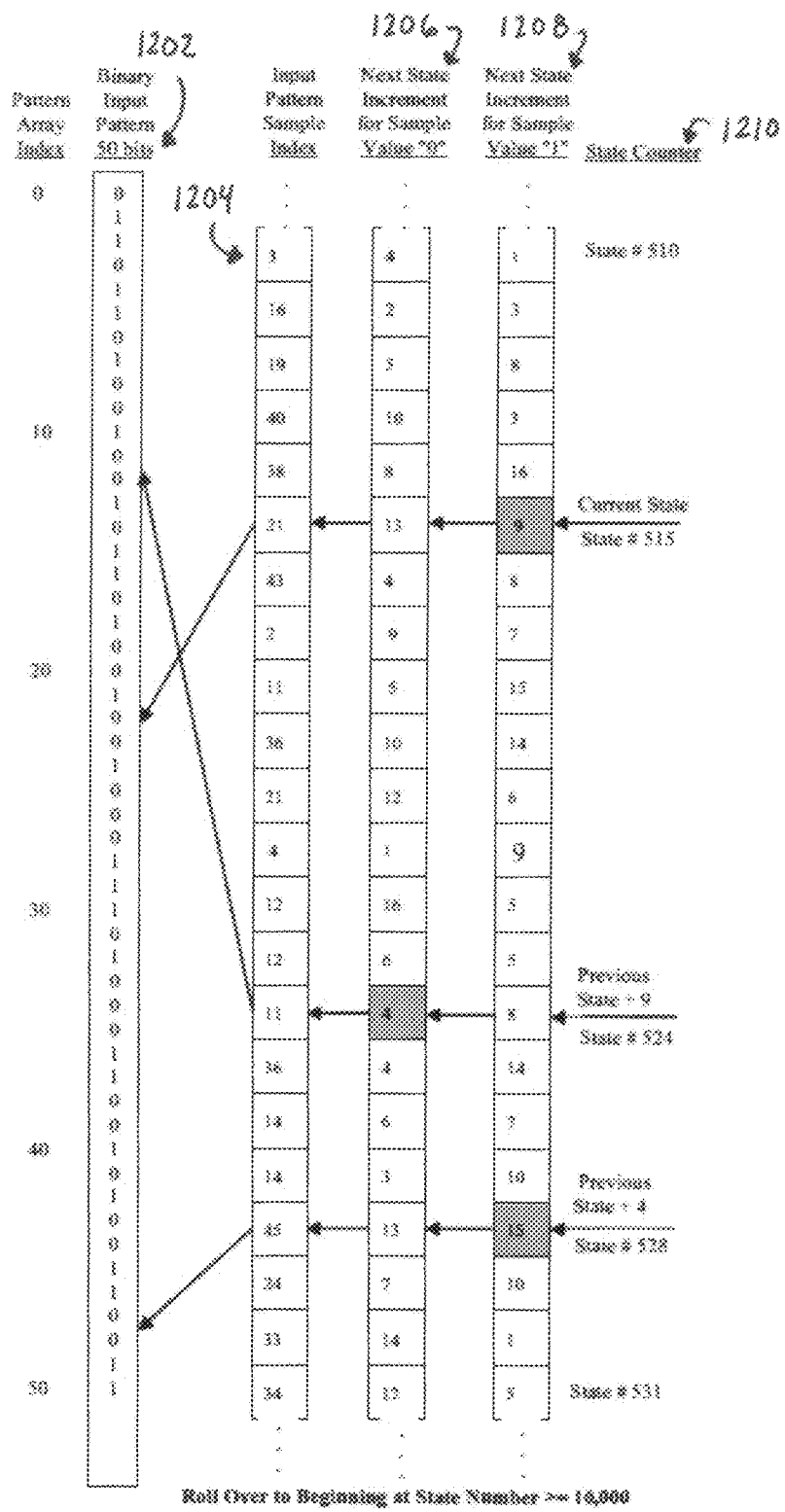
FIG. 12 illustrates a sample portion of PME arrays, according to some embodiments of the present disclosure.

FIG. 12 illustrates a practical example of the PME illustrated in FIG. 2A. FIG. 12 illustrates four columns, each of which is a single dimensional array. Array 1202 is an input pattern array 120, and contains an input pattern of, for example, 50 bits, each of which can be addressable by its array index and storing an input pattern value 129. Array 1204 is a state array 110 and arrays 1206 and 1208 are next state or next-state increment arrays, with array 1206 determining the next state if the sampled input pattern value 129 of array 1202 is a "0" and array 1208 determining the next state if the sampled input pattern value 129 of array 1202 is a "1". Arrays 1204, 1206, and 1208 may be of a length equal to the number of states. The number of states may typically be much larger than the input pattern array, and in this example there are 10,000 states. As may be appreciated, only a portion of arrays 1204, 1206, and 1208 is illustrated in FIG. 12. Specifically, only states 510 to 531 are illustrated. A common index to each of arrays 1204, 1206, and 1208 is the current state, which may be maintained in a state counter 1210.

During initialization of the PME, the PME generator may fill array 1204 with spread numbers, or otherwise a pattern of random or non-random numbers, as described above. In this case, the spread numbers range from 0 to 49, to provide an index into array 1202. The PME generator may also fill arrays 1206 and 1208 with spread numbers, or otherwise a pattern of random or non-random numbers, as described above. The range of the spread numbers may be predetermined for reasons that will be described in further detail below. For the purposes of illustration, the maximum state increment for this example has been set at 16, and thus, the spread numbers range from 1 to 16.

The state counter 1210 may serve as the index to arrays 1204, 1206, and 1208 and may be incremented depending on the sampled input pattern values 129. The state counter 1210 rolls over to the beginning when the state counter increments, in this case, to 10,000 or above. As may be appreciated, generally, a cycle will not occur or be detected until after the state counter 1210 rolls over.

In FIG. 12, the current state of the state counter 1210 is 515. Beginning, therefore, with state 515, address 515 of array 1204 is indexed and is determined to store the value 21. The value 21 is used to index array 1202, and it is determined that address 21 of array 1202 stores the value 1. Accordingly, array 1208 will be used to determine the increment value for determining the next state. Thus, address 515 of array 1208 is indexed and is determined to store the increment value 9. The state counter is then incremented by 9 to determine the next state of 524. The process then repeats. Specifically, since the new state is 524, address 524 of array 1204 is indexed and is determined to store the value 11. The value 11 is used to index array 1202, and it is determined that address 11 of array 1202 stores the value 0. This time, array 1206 will be used to determine the increment value for determining the next state. Thus, address 524 of array 1206 is indexed and is determined to store the increment value 4. The state counter is then incremented by 4 to determine the next state of 528. Again, the process repeats. Specifically, the new state is now 528, so address 528 of array 1204 is indexed and is determined to store the value 45. The value 45 is used to index array 1202, and it is determined that address 45 of array 1202 stores the value 1. Now, array 1208 will again be used to determine the increment value for determining the next state. Thus, address 528 of array 1206 is indexed and is determined to store the increment value 15. The state counter is then incremented by 415 to determine the next state of 543. This process repeats until the state counter rolls over and a state is repeated, thus indicating a cycle has been detected.

Another aspect of the present invention shown in FIG. 2A (which can also be combined with any of the other embodiments described herein) is the cycle-detection array 253. In some embodiments, cycle-detection array 253 is initialized (before each training mode operation and before each recognition-mode operation) by loading all locations with a null value (such as zero (0)). As each state is executed, the address 132 is used as an address into cycle-detection array 253, and the value 254 from that address is read as data from the cycle-detection array 253 and compared by checking unit 255 against the null value (e.g., checking if it is zero), and if null is detected 257, a non-null value 271 is written as data to that address in cycle-detection array 253 by write-cycle-ID controller 270. Once the operation has proceeded sufficiently, a non-null value will eventually be read from the location in cycle-detection array 253 (i.e., from an address in cycle-detection array 253 that was visited and filled with the non-null value earlier in this operation) and the non-null result 256 will indicate that a cycle has been detected. If in training mode, this starts a cycle fill by unit 270, which will fill every location in response array 130 that corresponds to a cycle address with a response value (thus training the response array with a response to the cycle caused by that pattern). If in recognition mode, then the non-null cycle detect will cause one or more of the cycle addresses to be read out from the response array 130 providing data 139 that identifies the recognized pattern in the input pattern data. In some embodiments, assuming that the patterns to be recognized are sufficiently spread out, a single value is read out from the response array 130 providing data 139 that identifies the recognized pattern. In other embodiments, a plurality of values along the path or cycle of the unknown image are read out and if a majority (more than 50%) or if no response has a majority, the response having the largest count of that response value, identifies the recognized pattern.

In some other embodiments, an alternative cycle-detection method is used. In the alternative cycle-detection method, the cycle detection array is initialized at start-up by loading all address locations with a null value such as zero (0). Rather than zeroing out the cycle detection array every time a new cycle is to be generated, some embodiments just store a new incremented count at that location for each new cycle. For example, in some embodiments, the cycle-detection array 253 is initially initialized with zeroes. The first use, i.e., identifying the first cycle, will fill in the value "1" into each cycle location (every one of the addresses to which the state array was traversed). Identifying the second cycle will test whether a "2" already exists at each location traversed along the second cycle—if not a "2" will be filled in—but if so, the detection of the cycle is established. Thus, if later the 55,306$^{th}$ cycle was just generated (each location of that cycle was filled by a "55306") and detected (by revisiting a location and discovering a "55306" at that location), then detection of that 55,306$^{th}$ cycle is established. For the next following cycle, the next number written to the cycle-detection array 253 (to identify the next 55,307$^{th}$ cycle) would be "55307". When the current cycle's number is read from an address during a cycle-detect operation, a new cycle has been detected. This is simply for speed (avoiding having to fill the cycle-detection array 253 with null values save time). When the incremented count value rolls over to zero (after 4,294,967,295 for a 32-bit number), the system re-initializes the entire cycle-detection array 253 to the null value of zero.

Figure 2B:
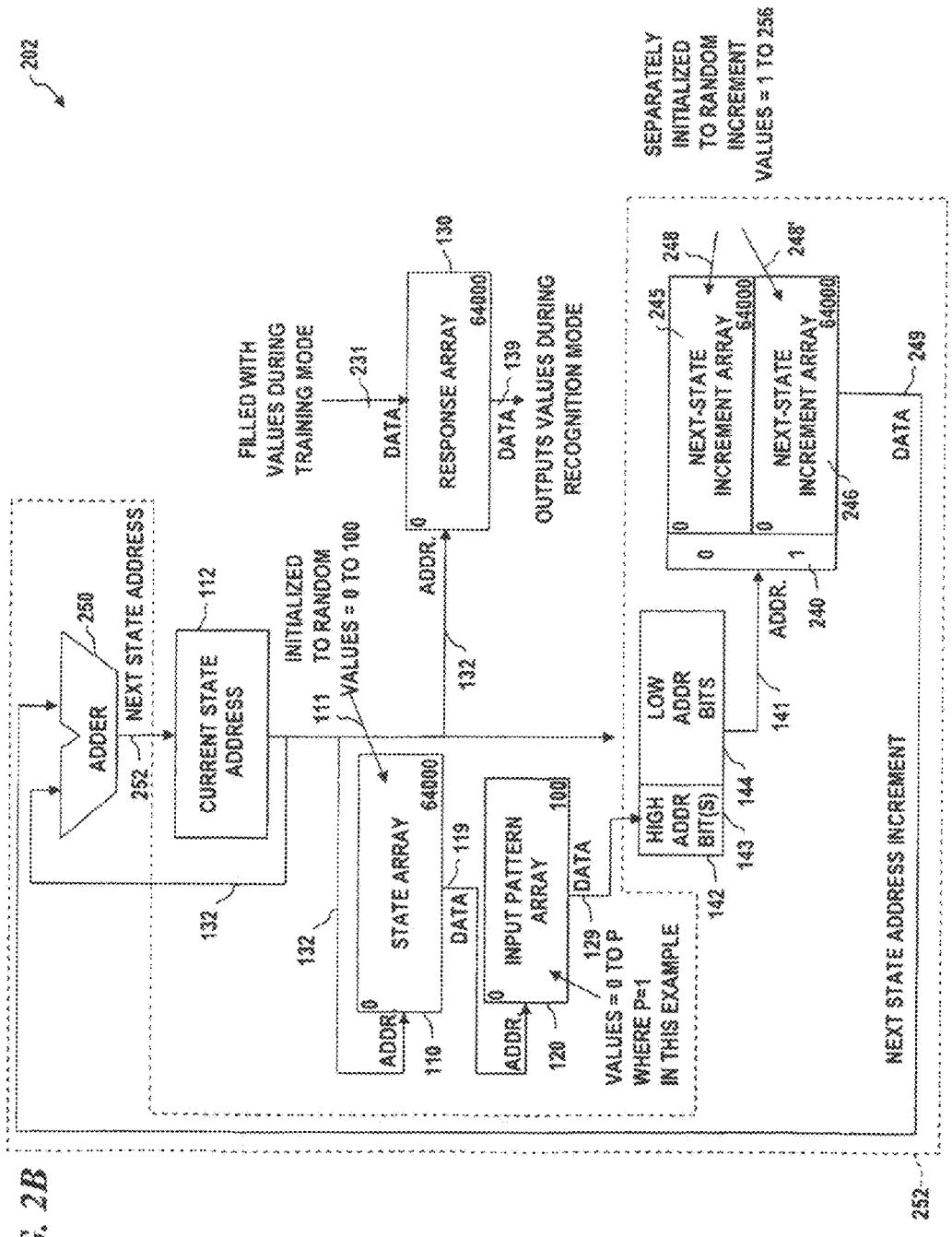
FIG. 2B is a block diagram of a pattern-recognition system with an example-sized state array (e.g., 64000 states), input pattern array, and step size.

FIG. 2B is a block diagram of pattern-recognition system 202 with exemplary sized state array (e.g., 64000 states in this example; in other embodiments, smaller arrays are used, or much larger arrays are used since memory prices and their energy consumption have dramatically dropped), as well as an exemplary sized input pattern array, and step size. In this example, the state array size is 64001 (i.e., addresses 0 to M=64000), input pattern array size is 101 (i.e., addresses 0 to N=100), and step size is a maximum of X=256 (i.e., random numbers between 1 and 256). In some embodiments, the input pattern array is allowed to only have a binary 0 or 1, thus only two next-state increment arrays 245 and 246 are used. Thus, response array 130 also has 64001 locations, and each next-state increment array 245 and 246 has 64001 locations each having random values between 1 and 256. The binary bit value read from IPA 120 provides the high-order bit 143 of the address into NSIA 240.

Figure 2C:
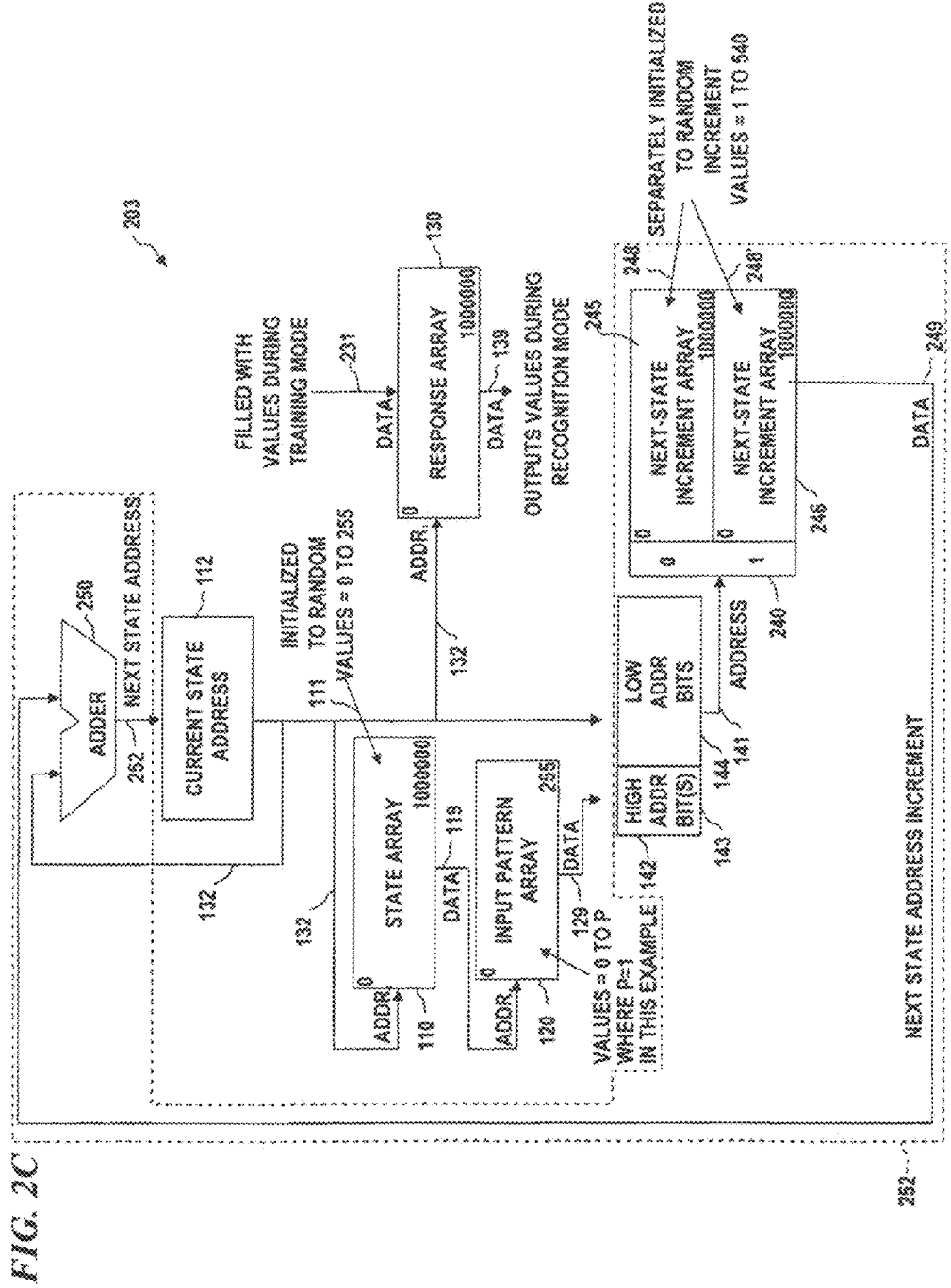
FIG. 2C is a block diagram of a pattern-recognition system with a different example-sized state array (e.g., 1,000,000 states), input pattern array, and step size.

FIG. 2C is a block diagram of pattern-recognition system 203 with different exemplary sized state array (e.g., 1,000,000 states), input pattern array, and step size. In this example, the state array size is 1,000,001 (i.e., addresses 0 to 1,000,000), input pattern array size is 256 (i.e., addresses 0 to 255), and step size is a maximum of 540 (i.e., random numbers between 1 and 540). In some embodiments, the input pattern array is allowed to only have a binary 0 or 1, thus only two next-state increment arrays 245 and 246 are used. Thus, response array 130 also has 1,000,001 locations, and each next-state increment array 245 and 246 has 1,000,001 locations each having random values between 1 and 540. The binary bit value read from IPA 120 provides the high-order bit 143 of the address into NSIA 240. As noted above, with a state memory size of one million and a minimum cycle of about 3700 the next state arrays should contain random numbers between 1 and 540. This means that the average increment of the counter would be 540 divided by 2, which equals 270, and the average number of steps (states) before it rolls over at 1 million would be 1,000,000 divided by 270, which equals 3,703. Therefore, the average cycle will be very close to 3700 and only one cycle will exist for each pattern.

Figure 2E:
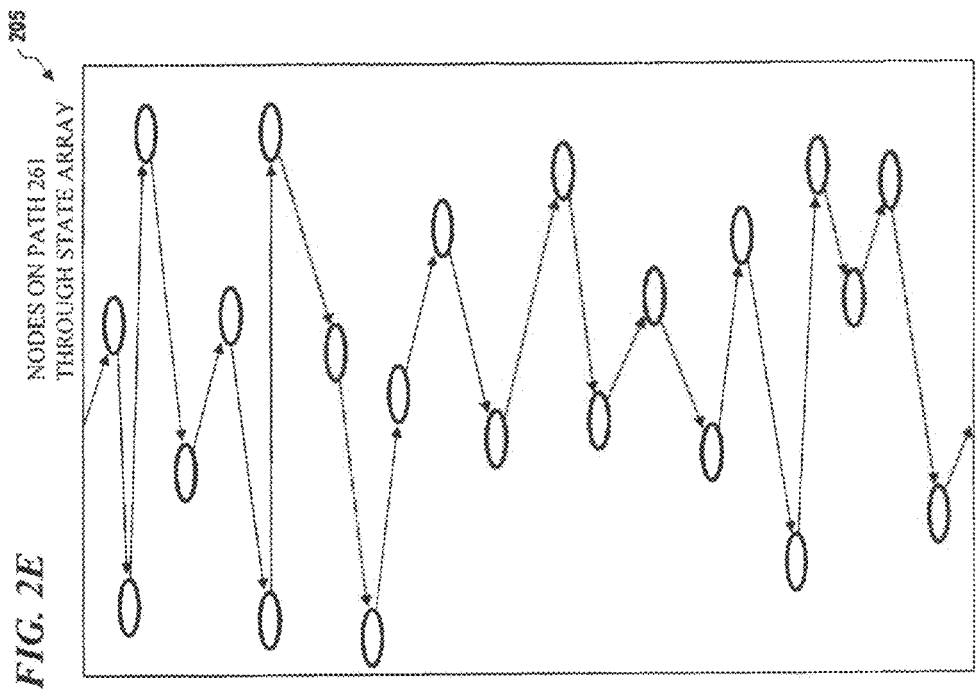
FIG. 2E is another diagram of a state array, according to some embodiments of the present disclosure.
Figure 2D:
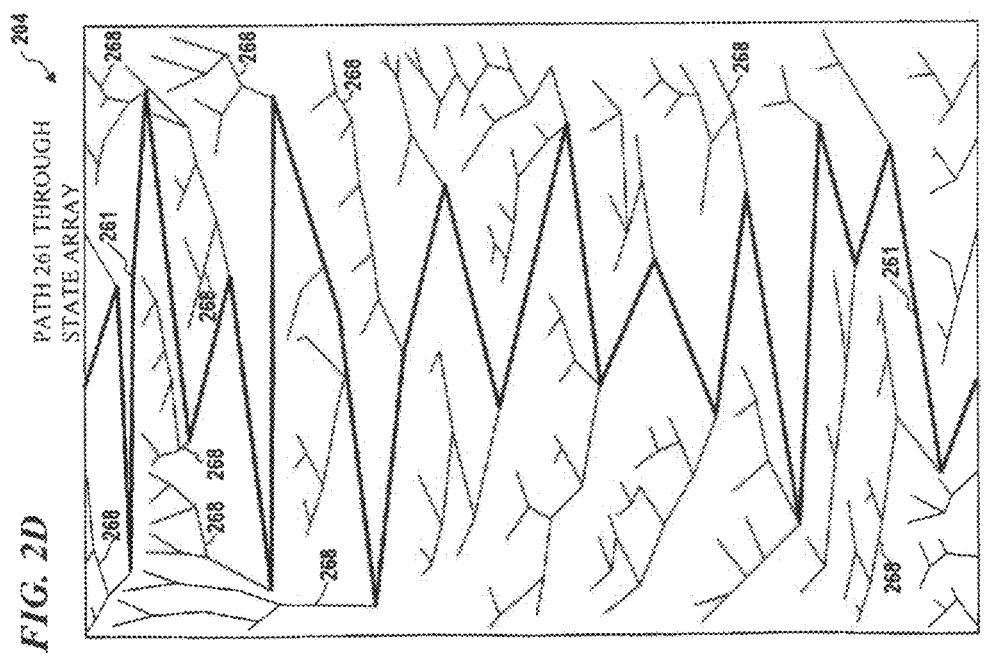
FIG. 2D is a diagram of a state array, according to some embodiments of the present disclosure.

FIG. 2D is a diagram of state array 204, having state array addresses located throughout state array 204 according to some embodiments of the present disclosure. In some embodiments, path 261 traverses through the addresses of state array 204 according to the addresses provided by the current-state-address unit (e.g., current-state-address unit 112 of FIG. 2A). In some embodiments, path 261 traverses through state array 204 beginning at the top of state array 204 and continues to traverse down through state array 204. Dendrites 268 represent locations in state array 204 that eventually connect with path 261. Current-state addresses in the state-array locations that are not located directly on path 261, will eventually lead to path 261 by traversing the state-array locations located along the dendritic paths and when a state-array location on the path is encountered all following state-array locations will be contained on the path. That is, once a current-state address in the state array 204 is located in a state array location contained on the path, all future current-state addresses will also be on the path. Further, in some embodiments, once a current-state address is on the path, a future current-state address cannot be located in a state-array location that is not on the path. Dendrites 268 can be thought of as tributaries (as an analogy) that flow into a river (the path in this analogy), in that all paths along a tributary with eventually lead to the river and once the tributaries always flow in one direction into the river.

FIG. 2E is a diagram of state array 205, and represents the node locations of path 261 as path 261 traverses through the state array 205 according to some embodiments of the invention. In some embodiments, the node locations are the locations in the state array that corresponds to the current-state addresses.

FIG. 2F is a diagram of state array 206, including path 261 and dendrites 268 as described above and end-around path 269 and cycle 265 according to some embodiments of the present disclosure. Cycle 265 includes both the complete path 261 that traverses through state array 206 and end-around path 269 that traverses from the last state-array location based on a last current-state address at about the end state array 206 to the first state-array location corresponding to a first current-state address at about the beginning of the state array 206.

FIG. 2G is a diagram of state array 207, is another representation of cycle 265 as it traverses through and completes an end-around from about the end of the state array 207 to about the beginning of state array 207 according to some embodiments of the present disclosure. State array 207 further includes start boundary 262 and trace boundary 263 wherein, in some embodiments, dendrites corresponding to state-array locations located above start boundary 262 (e.g., dendrites that begin at points A, B, C, D or E in FIG. 2G) will encounter path 261 and therefore cycle 265 at a location on path 261 (e.g., at point F for points A, B, C, D and E) that is above trace boundary 263. This is in contrast to dendrites corresponding to state-array locations that start below the start boundary 262 (e.g., dendrites that begin at points G, H, i, J, K or L) which do not necessarily encounter path 261 at a state-array location located above the trace boundary 263. That is, in some embodiments, all dendrites having a starting point located above the start boundary will join path 261 at a point located above the trace boundary 263, but not all dendrites having a starting point located below the start boundary will join path 261 at a point located above the trace boundary 263.

Figure 2I:
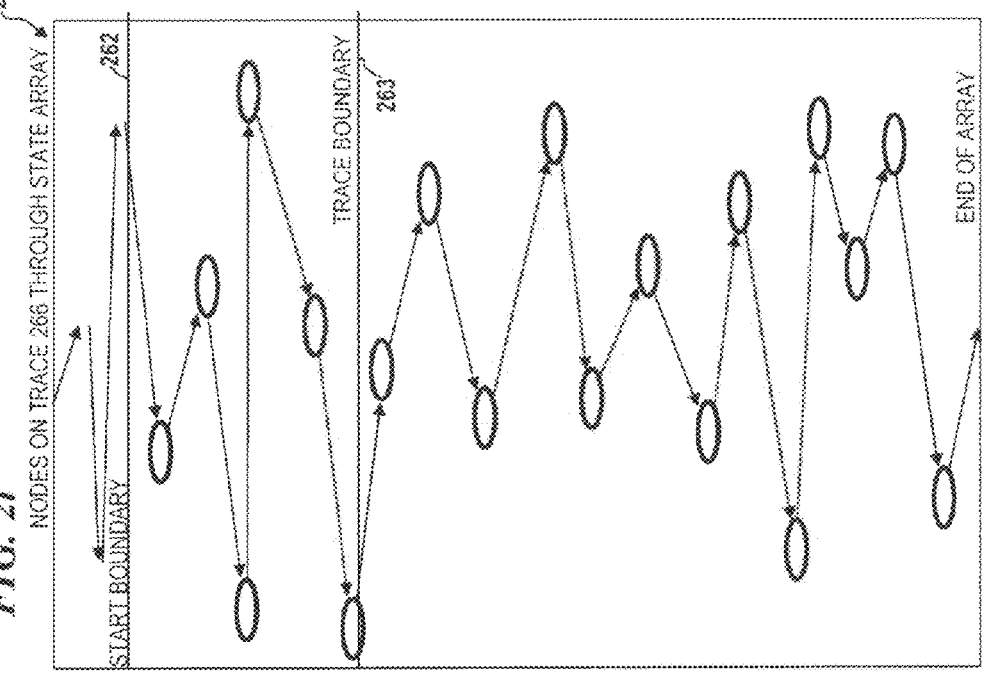
FIG. 2i is another diagram of a state array, according to some embodiments of the present disclosure.
Figure 2H:
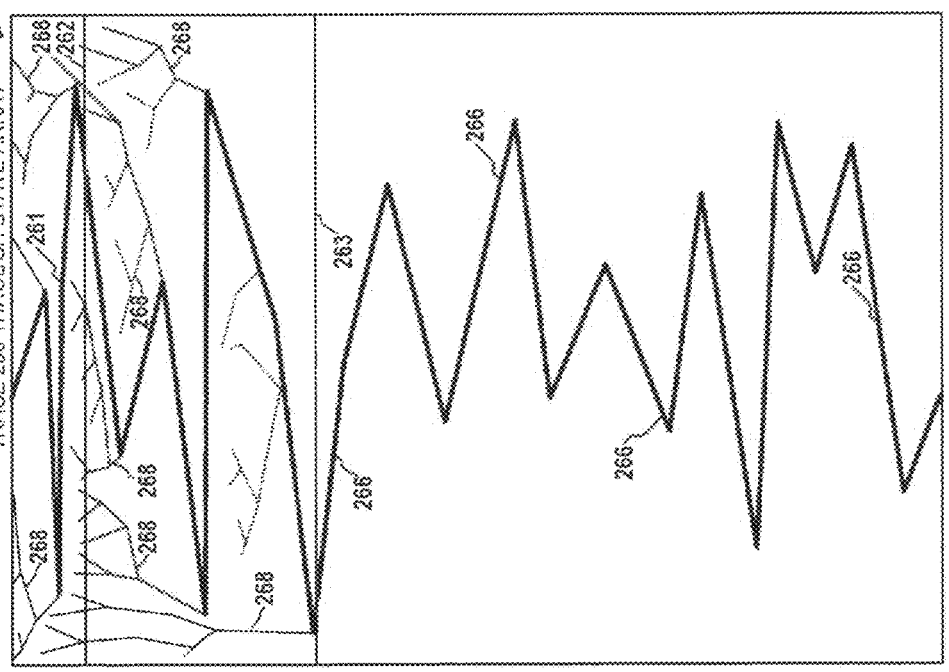
FIG. 2H is another diagram of a state array, according to some embodiments of the present disclosure.

FIG. 2H is a diagram of state array 208, representing trace 266 traversing state array 208 on path 261, according to some embodiments of the present disclosure. In some embodiments of the present invention, a trace 266 is defined as the portion of path 261 located below the trace boundary 263. That is, trace 266 includes only state-array locations that are located below the trace boundary 263. Note that in contrast to a cycle, trace 266 does not perform an end around when the last state-array location located at about the end of the state array is encountered. Rather, trace 266 begins at the first state-array location that is located below the trace boundary 263 and trace 266 end at the last state-array location at about the end of the state array corresponding to the last current-state address and as described above, as long as the starting dendrite begins at a point that is located above start boundary 262 the dendrite will converge and join the path at a location that is above trace boundary 263, ensuring that only a single trace (i.e., a unique set of state-array locations located below the trace boundary) will exist.

FIG. 2i is a diagram of state array 209, and represents the node locations (black ovals) of path 261 and trace 266 through the state array 209 according to some embodiments of the present disclosure. In some embodiments, the node locations are the locations in the state array that corresponds to the current-state addresses.

Figure 3:
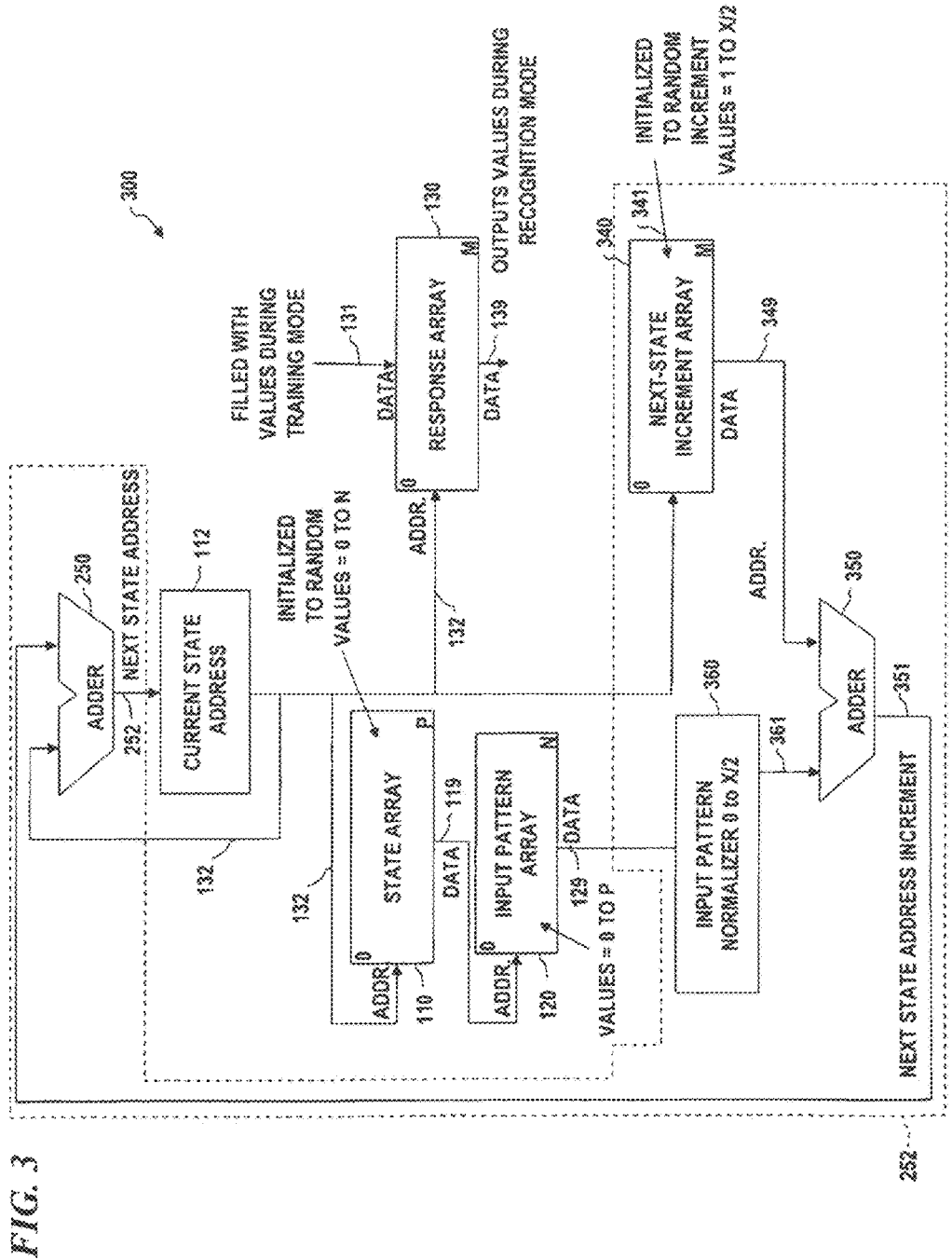
FIG. 3 is a block diagram of another limited jump pattern-recognition system, according to some embodiments of the present disclosure.

FIG. 3 is a block diagram of another limited jump pattern-recognition system 300, according to some embodiments of the present disclosure. LJPR system 300 provides an alternative next-address generation mechanism, wherein a single NSIA 340 provides approximately half of the branch (e.g., a random value between 1 and X/2) and the data 129 from the input pattern array 120 is normalized (by input pattern normalizer 360) to a value of between 0 and X/2, and these two values (the partial next address increment 349 from NSIA array 340, and the normalized version 361 of input pattern value 129) are added together by adder 350 to provide the next address increment 351, which is then added to the current address 132 by adder 250 to obtain the next current state address in register 112. Other aspects of this embodiment are as described above.

Representing Patterns by a Random Set of Addresses Using Cycles Offers Many Advantages Simplicity of Implementation:

The PME and APM are based on simple rules and implemented basically without computation. Its simplicity accounts for its high speed and offers the potential of simple hardware implementation and for parallel operation of multiple PMEs by independent or successive PME processors. In some embodiments, a PME processor is the code and memory used to sample an input data pattern (which may be the result of preprocessing an earlier input pattern (e.g., to detect edges or enclosed areas in an image)) and to follow or process a path through a state array. Note that the actual path taken, in some embodiments, is not recorded but rather a hash code is generated based on whether the path included a certain set of addresses (generally, that set of addresses is spread out across all or a large portion of the state array's address space). For example, the state array could have 1, 4, or 16 million addresses (or any other suitably large number of addresses), and 10 hash codes could be generated each having 20 bits (a 1-megabyte addresses space for each of the one or more recognition arrays or tables), and each bit of each hash tracks, for example, 88 addresses (these 88 addresses comprise one "vertical sensor" (described in detail below) which deter nines the value of one bit of one hash) and whether the path encountered any of those addresses (thus a total of 10 hashes times 20 bits/hash times 88 addresses/bit, which equals 17600 addresses of the suitably large number of addresses used for the state array). In other embodiments, other numbers of hashes, bits per hash, and/or numbers of addresses per bit (number of addresses tracked per vertical sensor).

Common Language for Different Pattern Inputs:

Cycles are a set of "random" addresses in memory (note that while these addresses in one of the cycles appear random due to the spread values loaded into the state array and/or next-address-increment array, the set of addresses of a cycle will always be the same for a given input pattern). A new pattern input (i.e., the new data into an input-pattern array to be processed by another PME processor) can be created simply by incrementing a value at these addresses in another memory, or by using vertical-sensor bits from one path, or by using pattern identifiers that were located using the path or hashes derived from the path. Visual, auditory, and other sensory patterns are all represented in the same manner and their cycles can be superimposed in the same memory to form a new input pattern. A A PME can be applied to the new patterns to train associations between different sensory inputs.

Automatic Segmentation of Time Varying Patterns:

The process of sampling the input pattern can occur on a continuous basis without defining an initial state. Responses emerge and training is enabled only when a cycle is present. If the input pattern is changing rapidly no cycle can emerge. If the pattern stabilizes for at least the time of the minimum cycle training is enabled and/or a response can be generated. This allows the potential of automatic segmentation of time varying patterns such as continuous speech.

Temporal and Spatial Integration:

Cycles from patterns recognized within time varying patterns can be superimposed to create a new input pattern to be trained and recognized at a higher level of temporal integration. The same applies to spatial integration of patterns.

Figure 14:
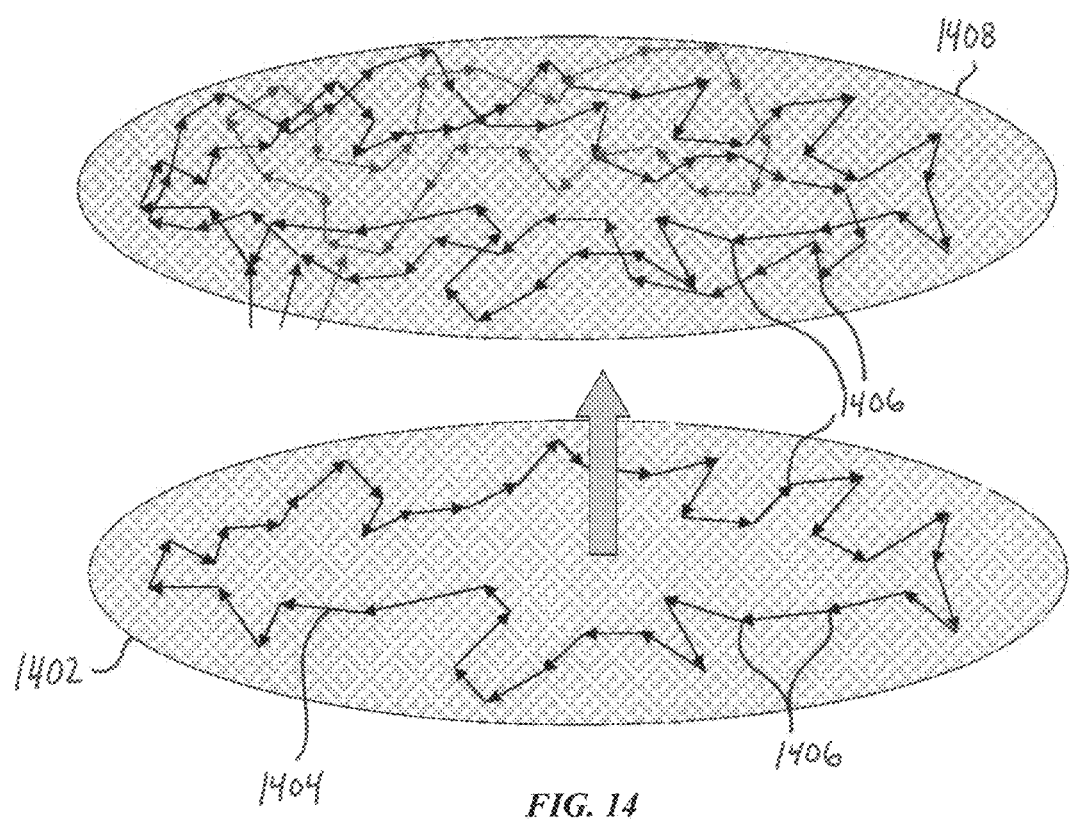
FIG. 14 is a diagram conceptually illustrating how cycles from patterns recognized within time varying patterns can be superimposed to create a new input pattern to be trained and recognized at a higher level of temporal integration.

FIG. 14 helps conceptually illustrate this superimposition. Borrowing again from biological neural networks, FIG. 14 shows two layers of neurons. The lower layer 1402 generates different cycles 1404 in time that represent different input patterns imposed on it. The "hot spots" or states 1406 in these cycles are superimposed on a higher layer 1408 to form a new pattern representing the temporal and/or spatial integration of lower level patterns.

For example, during visual recognition of text, saccades move our eyes rapidly to new locations where a stable image allows cycles to occur for recognition of each sequential block of text. These cycles are superimposed at a higher level to form a new pattern of words and sequences of words. Cycles could also represent sound patterns. When we first hear speech, we learn the stable sounds of phonemes that form the building blocks of words and phrases. The sounds and words are combined with other sensory patterns that are also superimposed in the hierarchy, such as the visual pattern of the word's text, just described, the visual movement of our lips as the word is spoken, or the touch or picture of the object described by the word. Some or all of these may be combined as cycles to form a total pattern at higher levels, e.g., higher layer 1408.

PME can start to make predictions at a higher level. Prediction can occur when PME recognizes a pattern at a higher level before all of the lower level patterns have contributed all the cycles. Learning can occur continuously at all levels of the hierarchy and allows us to predict higher level outcomes earlier as we learn.

An implementation of this with PME can be described with respect to FIG. 13, which is discussed in more detail below with regard to vertical sensors. To implement a hierarchy in PME, an additional single-dimensional array of the same size as arrays 1204, 1206, 1208, 1302, and 1304 may be provided. We will refer to this array as the hierarchy array. This additional hierarchy array may then become an input pattern for a higher level PME. For example, Diagram 4 shows that a specific input pattern created a cycle that included states 515, 524, and 528. An input pattern may be created in the hierarchy array by setting the locations indexed by these states to a number. States from other cycles representing other patterns may also set numbers in the hierarchy array. Higher level recognition may then be achieved by another PME using this array as its input pattern. Multiple PMEs may be used for such spatial and temporal, or hierarchical, integration from different sensory inputs. This PME implementation of hierarchy can be generally real time and continuous.

Large Associative Capacity:

In one current example, a cycle of length approximately 3700 addresses within an address space of 1 million addresses is created for each pattern. If the sequence of addresses in the cycle is also considered in its uniqueness then the number of possible unique cycles is very large. Basically capacity relates to the number of possible different address sequences of 3700 exist within 1 million. Clarification on how this is implemented is given below under the category of vertical sensors Fuzzy Recognition:

Intuitively it would seem likely that similar patterns would create similar cycles. This is the case and is an extremely important advantage that is discussed in more detail below.

Vertical Sensors—Detecting Cycles

In the conceptual example described above, trained responses are stored in response memory at the addresses within the cycle. With a cycle length of 3700 and 1 million available addresses the response memory would quickly fill up. Vertical sensors provide the solution for this.

The term vertical sensor is used to convey how cycles are detected. Conceptually, if one considers that a cycle is generated in a two-dimensional memory plane, the vertical sensor detects the presence or absence of a cycle address within a small region of this plane and communicates this information to a next higher-level memory plane. The set of addresses sensed is called the vertical sensor field. (See FIG. 7A.)

For the current example, this cycle distributes its 3700 addresses randomly throughout the one-million-memory plane. Approximately one cycle address for every 270 memory addresses. A close approximation of the required vertical sensor field size can be computed as follows: For the current example a vertical sensor field size of 1 would have a probability of 269/270 (i.e., 0.9963) of NOT including a cycle point. A vertical sensor field size of 2 would have a 0.9963×0.9963 or 0.9926 probability of not including a cycle point. In the current example, the required size of the sensor field is N, where $(0.9963)^N=0.5$ probability. In this case N is 186. That is, each vertical sensor with a sensor field size of 186 addresses (random or consecutive) will have a 50/50 chance of including a cycle point. If the cycle is present, then the vertical sensor bit is set to 1, if not, it is set to 0. Twenty-six vertical sensor bits (corresponding to twenty-six addresses in the state array and the corresponding twenty-six addresses in the vertical-sensor array; these twenty-six addresses can be consecutive addresses or spread out) can produce a unique binary number (of 26 bits) (called the path-hash code (also called the cycle-hash code if the path is determined by detecting a cycle, or a trace-hash code if the path is determined by following a path beyond a trace boundary)) associated with that input pattern, and which can address a response memory of 64 million locations. The path-hash codes each address the response memory for training and response. In this example, there could be 1,000,000 divided by (186 times 26) or 206 path-hash codes generated in one cycle. If ten of these path-hash codes (of the 206 possible path-hash codes) are used, each addressing one of ten independent response tables a total of 640 million response addresses would be available. In actual applications of some embodiments, only 10 path-hash codes (of the 206 possible path-hash codes) are used (each path-hash code is 20 bits which addresses 1 MB of memory, there being 10 MB of memory used for the ten response tables, each of which is addressed by one of the ten path-hash codes; the ten tables being used for voting if they do not all agree (independent recognizers)). Multiple cycle codes are used to provide redundancy to the recognition. Theoretically, it is possible to have a completely different pattern generate the same cycle code. However, since each cycle code is an independent recognition, it is not likely that more than one would do the same mapping. Compared to the conceptual example, the individual vertical sensor bit status is superimposed in another memory to create new input patterns and the cycle code(s) address the response memory for training and response.

Figure 4:
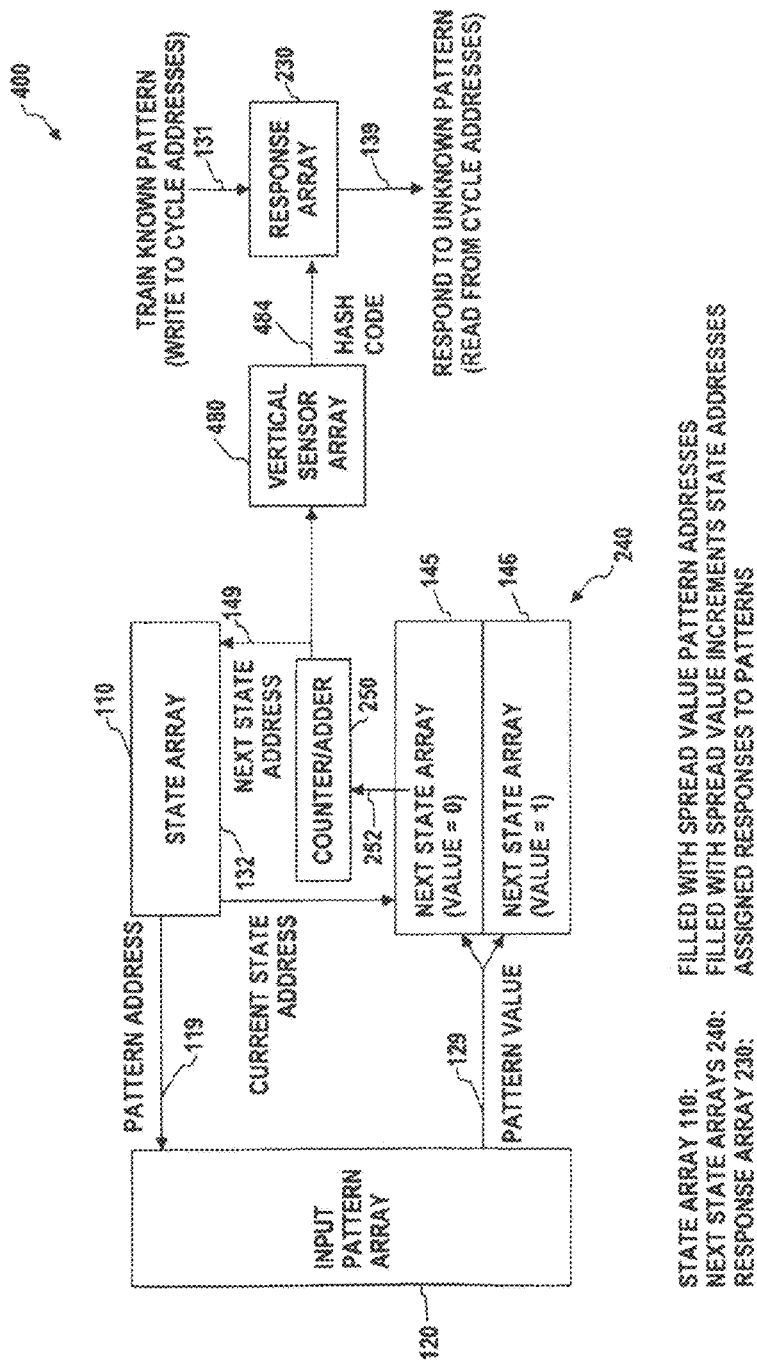
FIG. 4 is a conceptual block diagram of a limited jump pattern-recognition system, according to some embodiments of the present disclosure, which can be implemented in software and/or hardware.

FIG. 4, shown below, is one actual implementation concept of the PME that is somewhat different than the concept of FIG. 1B. In some embodiments, state array 110 is a one-dimensional array of 64,000 addresses and the counter/adder value is the next state. The next state arrays 240 contain random numbers that increment the counter. The random numbers range from 1 to 256 and therefore the average increment of the counter is 128. When the counter exceeds 64,000 the counter rolls over to the remainder. A cycle is detected when the next state address is the same as a previous state address, which cannot happen until the counter rolls over. Therefore, with an average step size of 128, the average cycle length is 64,000/128=500. And, since the maximum step size is 256, the minimum cycle length is 64,000/256=250.

Another addition is the vertical sensor bit array. This array is the same size as the state array (1 by 64,000) and is also addressed by the next state address. When a cycle is present, its content identifies which bit of which hash code to set to binary 1 or 0.

Figure 13:
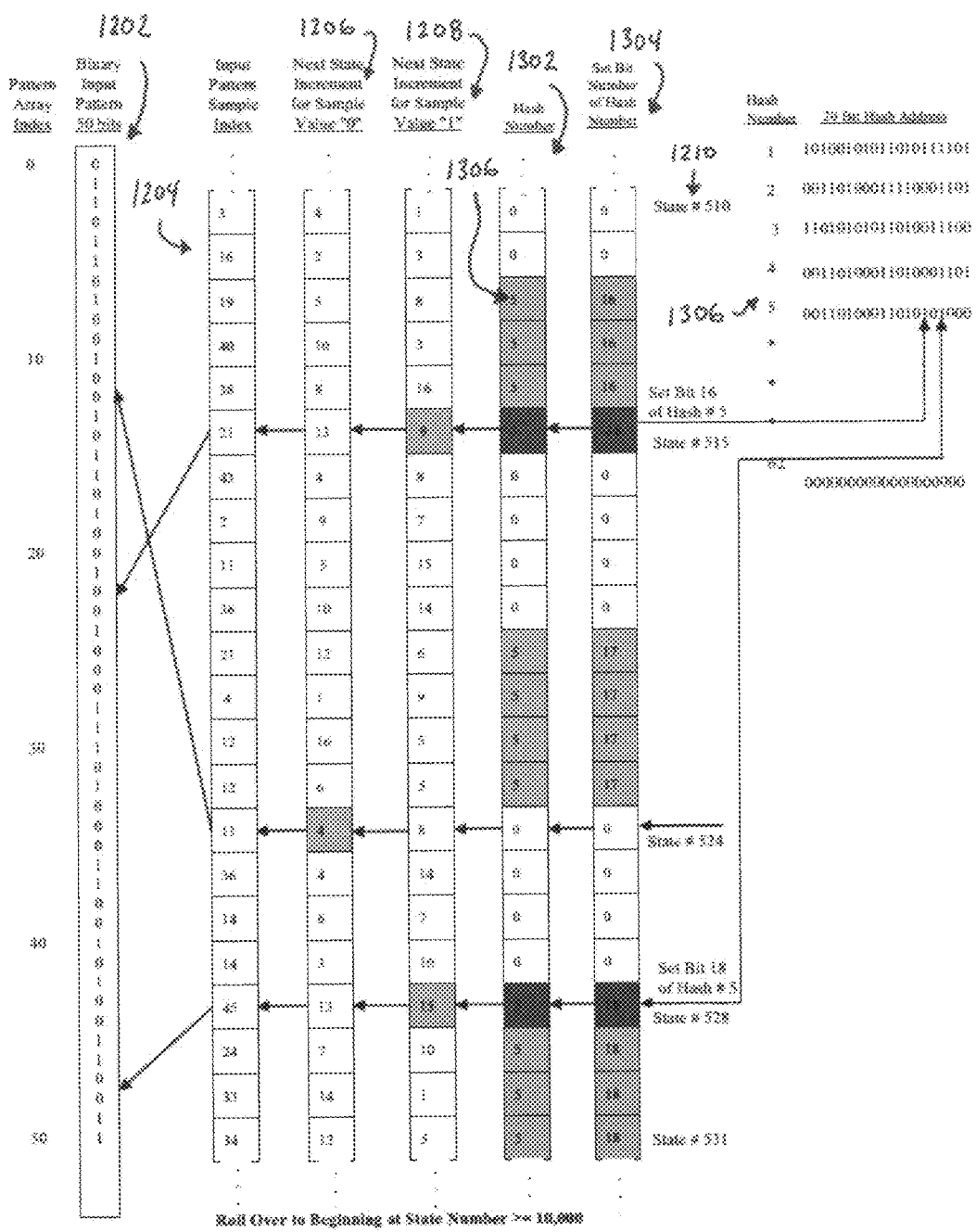
FIG. 13 illustrates a sample portion of PME arrays, according to other embodiments of the present disclosure.

FIG. 13 illustrates a practical example of the PME illustrated in FIG. 4. FIG. 13 illustrates the same four arrays of FIG. 12, each of which is configured and operates the same as described with respect to FIG. 12. FIG. 13, however, further includes a vertical sensor bit array, illustrated therein as two separate arrays 1302 and 1304. Of course the vertical sensor bit array could comprise two or more separate arrays, or could be single array, either way identifying which bit of which hash code to set. For ease of illustration, there are two separate arrays 1302 and 1304 in FIG. 13. Array 1302 is a hash code or hash number array, containing a value identifying a particular hash code or number 1306. Array 1304 is a hash bit number array, containing a value identifying a particular bit of a corresponding hash code or number identified by array 1302 that is to be set, in this case to a "1". Like arrays 1204, 1206, and 1208, arrays 1302 and 1304 may be of a length equal to the number of states. The number of states may typically be much larger than the input pattern array, and in this example there are again 10,000 states. As may be appreciated, only a portion of arrays 1204, 1206, 1208, 1302, and 1304 is illustrated in FIG. 13. Specifically, only states 510 to 531 are illustrated. A common index to each of arrays 1204, 1206, 1208, 1302, and 1304 is the current state, which may be maintained in the state counter 1210.

In one embodiment, during initialization of the PME, the PME generator may fill array 1204 with spread numbers such that vertical sensors are distributed throughout the state addresses and spaced to assure that each bit of a hash has about or around a 50/50 probability of being set, as described above. Of course other chances of probability would also be suitable.

The state counter 1210 may serve as the index to arrays 1204, 1206, 1208, 1302, and 1304 and, as described with respect to FIG. 12, may be incremented depending on the sampled input pattern values 129. The state counter 1210 rolls over to the beginning when the state counter increments, in this case, to 10,000 or above. As may be appreciated, generally, a cycle will not occur or be detected until after the state counter 1210 rolls over.

In FIG. 13, the current state of the state counter 1210 is 515. Beginning, therefore, with state 515, address 515 of array 1204 is indexed and is determined to store the value 21. The value 21 is used to index array 1202, and it is determined that address 21 of array 1202 stores the value 1. Accordingly, array 1208 will be used to determine the increment value for determining the next state. Thus, address 515 of array 1208 is indexed and is determined to store the increment value 9. The state counter is then incremented by 9 to determine the next state of 524. Additionally, address 515 of array 1302 is indexed and is determined to identify hash number 5. Likewise, address 515 of array 1304 is indexed and is determined to identify hash bit number 16. Thus, bit 16 of hash number 5 is set, in this case to a "1". The process then repeats for the new state. Specifically, since the new state is 524, address 524 of array 1204 is indexed and is determined to store the value 11. The value 11 is used to index array 1202, and it is determined that address 11 of array 1202 stores the value 0. This time, array 1206 will be used to determine the increment value for determining the next state. Thus, address 524 of array 1206 is indexed and is determined to store the increment value 4. The state counter is then incremented by 4 to determine the next state of 528. Additionally, address 524 of arrays 1302 and 1304 are indexed, and it is determined that no hash is to be modified. Again, the process repeats. Specifically, the new state is now 528, so address 528 of array 1204 is indexed and is determined to store the value 45. The value 45 is used to index array 1202, and it is determined that address 45 of array 1202 stores the value 1. Now, array 1208 will again be used to determine the increment value for determining the next state. Thus, address 528 of array 1206 is indexed and is determined to store the increment value 15. The state counter is then incremented by 415 to determine the next state of 543. Additionally, address 528 of array 1302 is indexed and is determined to identify hash number 5. Likewise, address 528 of array 1304 is indexed and is determined to identify hash bit number 17. Thus, bit 17 of hash number 5 is set, in this case to a "1". This process repeats until the state counter rolls over and a state is repeated, thus indicating a cycle has been detected.

Figure 5A:
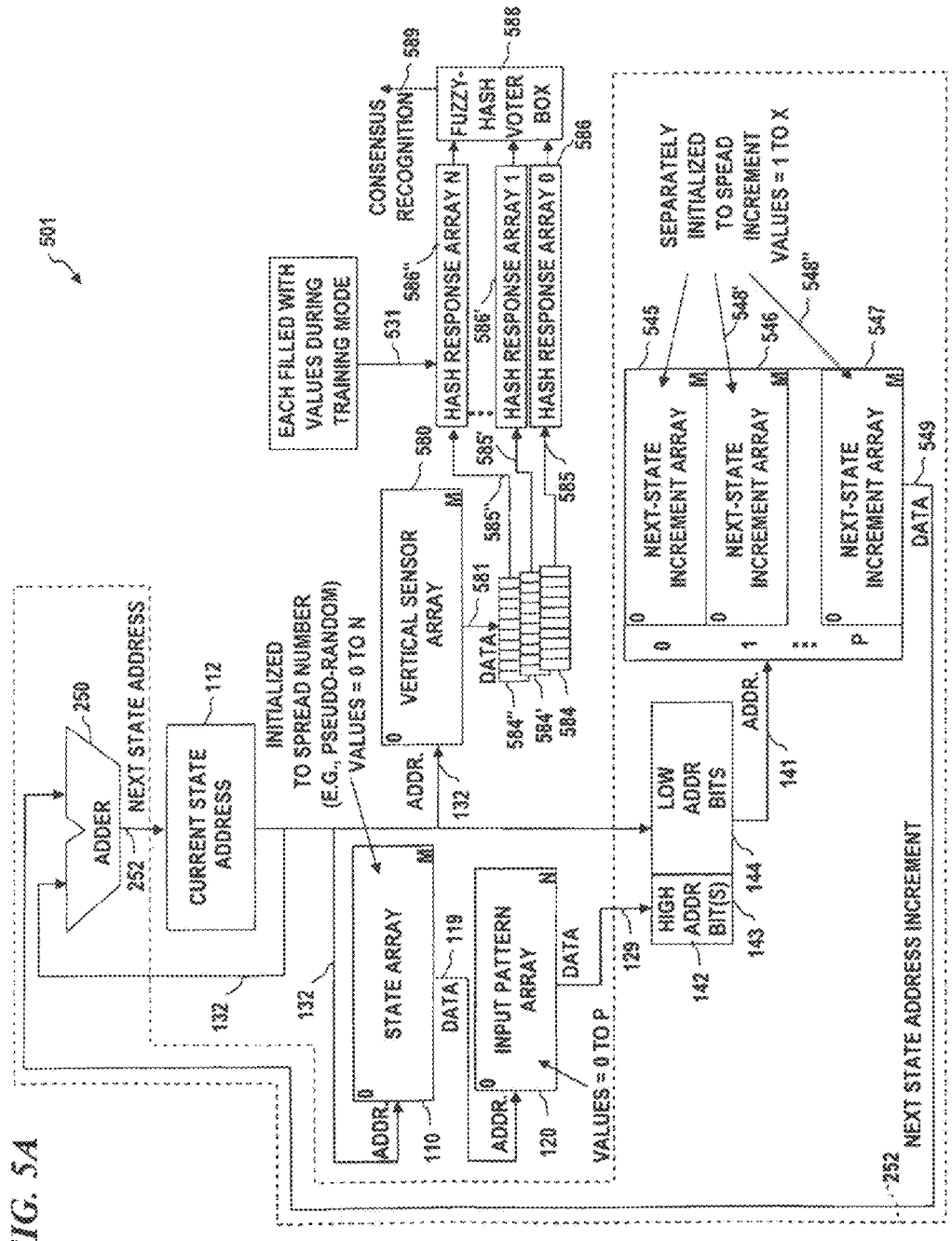
FIG. 5A is a block diagram of yet another limited jump pattern-recognition system, according to some embodiments of the present disclosure.

FIG. 5A is a block diagram of yet another limited jump pattern-recognition system 501, according to some embodiments of the present disclosure. In some embodiments, LJPR system 501 uses path-hash codes 584, 584', . . . 584" whose binary bit positions are filled with binary value outputs from what are called "vertical sensors" 581. Each vertical sensor detects the presence or absence of a cycle or trace address within a predetermined number of state addresses (called the vertical-sensor field), which in some embodiments, are consecutive addresses (e.g., in some embodiments, 88 addresses are used for each vertical sensor (each of which determined the value of one bit of one hash code) if the maximum jump size is about 256 and the average jump size is about 128), and each vertical sensor sets its respective associated vertical-sensor bit in one of the path-hash codes 584, 584', through 584". In some embodiments, once a complete cycle or trace has been hashed (i.e., every location of the cycle or trace is read, and for each cycle or trace location within one of the vertical sensors, the corresponding vertical-sensor bit in one of the path-hash codes 584, 584', through 584" is set (or left unset if none of the addresses for the corresponding vertical sensor is in the path)), and each of the path-hash codes 584, 584', through 584" is used as an address 585, 585', through 585" into one of the hash-response arrays 586, 586', through 586" (during training mode, a response value (e.g., an ASCII "a" might be a response in a handwriting pattern recognition system for handwriting patterns that are to be recognized as "a") is written to the respective addressed locations in hash-response arrays 586, 586', through 586", and then later during the recognition mode, the response values are read from each of the hash-response arrays 586, 586', through 586'"), in some embodiments, a fuzzy-hash voter box will receive the respective responses from hash-response arrays 586, 586', through 586", and generate a consensus recognition response 589 based on a combination of the responses (e.g., by voting (one response-one vote), where the most numerous response is output (or if a tie in the counts of responses, two or more responses might be output, in some embodiments), or by a weighted average wherein certain of the responses could be weighted more than others during voting).

Figure 5B:
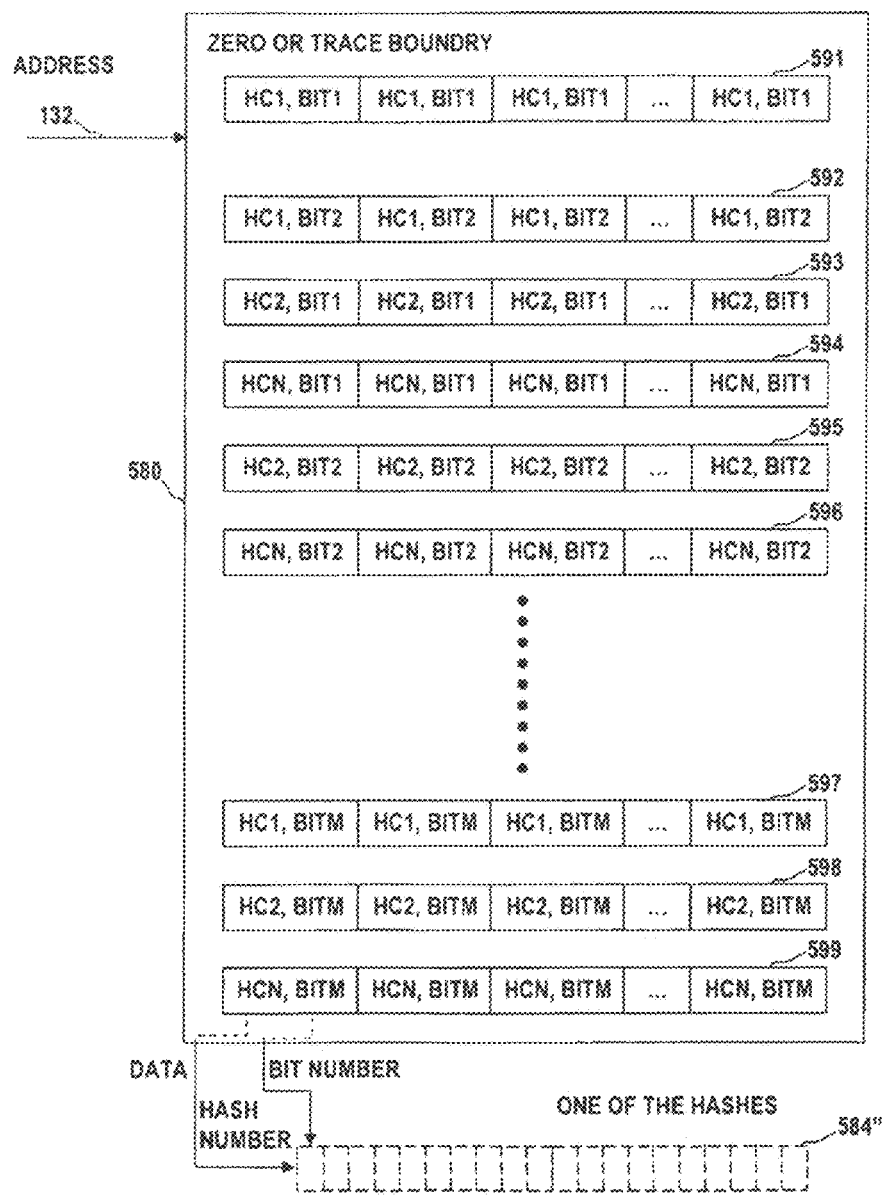
FIG. 5B is a more detailed block diagram of a limited jump pattern-recognition system that uses a vertical sensor array to generate hashes, according to some embodiments of the present disclosure.

FIG. 5B is a more detailed block diagram of a limited jump pattern-recognition system 502 that uses a vertical sensor array 580 to generate hashes 584, according to some embodiments of the present disclosure. In some embodiments, the first bit of the first hash is set if any of the addresses in group 591 are used in a path through the vertical-sensor array 580 (generally the same as the path through the state array, although in some embodiments, other ways of finding equivalent or corresponding addresses between the two arrays is used), the second bit of the first hash is set if any of the addresses in group 592 are used in a path through the vertical-sensor array 580, and so on such that the $M^{th}$ bit of the first hash is set if any of the addresses in group 597 are used in a path through the vertical-sensor array 580. Similarly, the first bit of the second hash is set if any of the addresses in group 593 are used in a path through the vertical-sensor array 580, the second bit of the second hash is set if any of the addresses in group 595 are used in a path through the vertical-sensor array 580, and so on such that the $M^{th}$ bit of the second hash is set if any of the addresses in group 598 are used in a path through the vertical-sensor array 580. If N hashes are implemented, the first bit of the $N^{th}$ hash 584' is set if any of the addresses in group 594 are used in a path through the vertical-sensor array 580, the second bit of the $N^{th}$ hash 584" is set if any of the addresses in group 596 are used in a path through the vertical-sensor array 580, and so on such that the $M^{th}$ bit of the $N^{th}$ hash 584" is set if any of the addresses in group 599 are used in a path through the vertical-sensor array 580.

FIG. 5C is a more detailed block diagram of a limited jump pattern-recognition system 503 that uses a vertical sensor array 580 to generate hashes 584, according to some embodiments of the present disclosure. In some embodiments, the various bits of the first hash of a path (e.g., the sequence of addresses 132 used in the state array addressing) are set based on vertical sensors 571, 572, and 577 and the other vertical sensors shown in dashed lines relative to the path through the vertical-sensor array 580. Similarly, the various bits of the second hash for the path are set based on vertical sensors 573, 575, and 578 and the other vertical sensors shown in dotted lines relative to the same path through the vertical-sensor array 580. If N hashes are implemented, the various bits of the $N^{th}$ hash 584" are set based on vertical sensors 574, 576, and 578 and the other vertical sensors shown in solid lines relative to the path through the vertical-sensor array 580.

Figure 6:
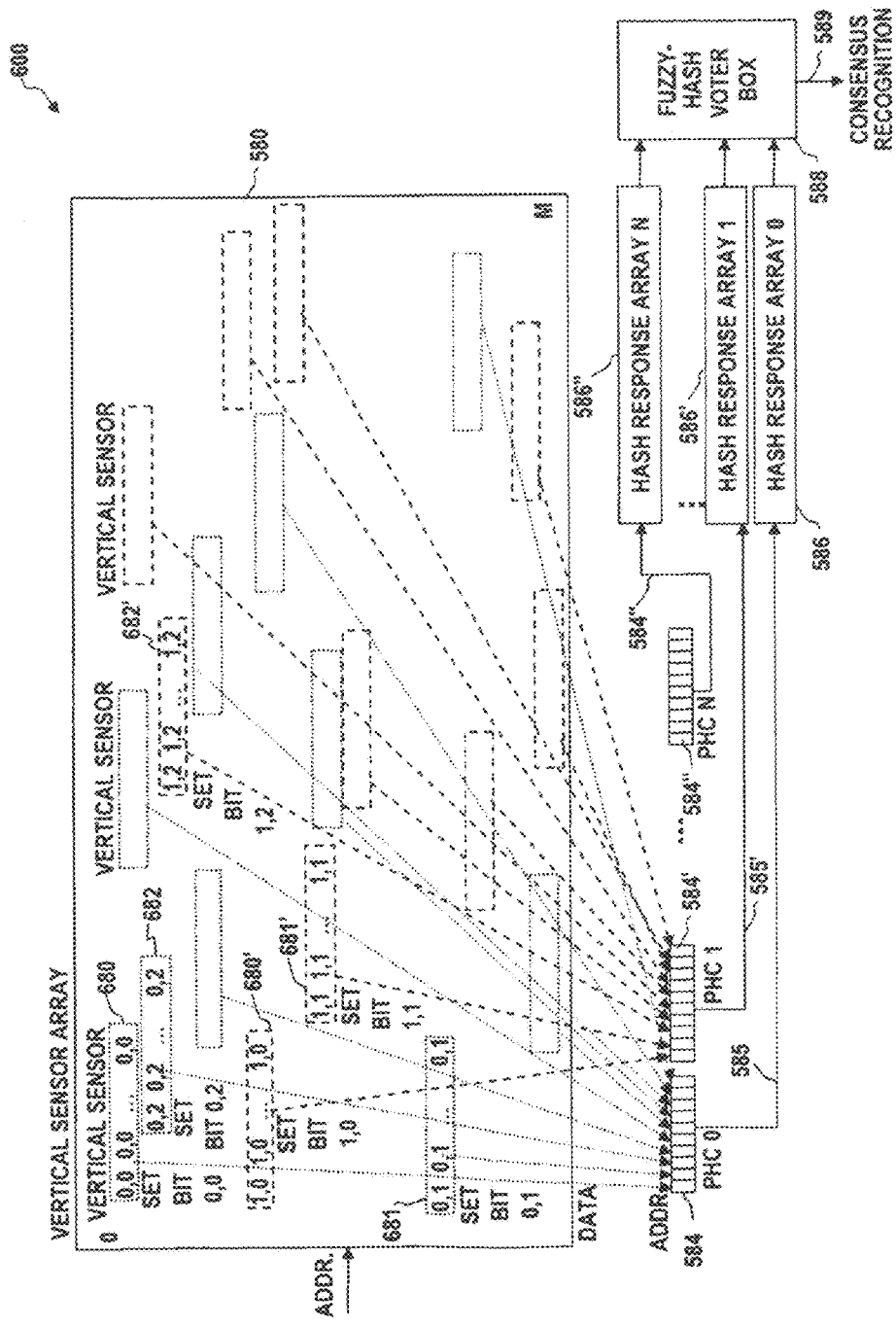
FIG. 6 is a block diagram of a vertical sensor system, according to some embodiments of the present disclosure, which uses path-hash codes and provides fuzzy pattern recognition.

FIG. 6 is a more detailed block diagram of a vertical sensor system 600, according to some embodiments of the present disclosure, which uses path-hash codes and provides fuzzy pattern recognition. Since FIG. 6 depicts an embodiment using cycles and cycle detection, the path-hash codes (PHCs) in this case are cycle-hash codes (CHCs). In some embodiments, the vertical sensor system 600 is used with PME processors using cycle detect to generate cycle-hash codes (CHCs) used to identify the path of an input pattern, and in other embodiments, vertical sensor system 600 is used with PME processors using a trace boundary to generate trace hash codes (THCs) used to identify the path of an input pattern. The resulting hash codes (CHCs or THCs) are sometimes generically referred to as path hash codes (PHCs). In some embodiments, a vertical sensor array 580 has locations zero to M (in other embodiments, the locations start at the trace boundary address and extend to M). In some embodiments, all entries that are not used for a vertical sensor are set to a null value such as zero or hexadecimal 'FFFF'x (all bits being binary ones), and each location used for a vertical sensor has data specifying a first index value (path hash code (PHC) identifier) corresponding to one of the hash codes 584 (e.g., if the null value is zero, then the first path-hash-code identifier is one, which indicates PHC0, the second hash identifier is 2 which indicates PHC1 584', and so on through the N+1$^{st}$ hash identifier indicates PHCN 584"), and a second index value corresponding to 'one of the bits in the selected one of the path-hash-codes (PHC) 584, 584', through 584" determined from the first index value. In some embodiments, each vertical sensor is a string of N consecutive addresses, each having the same pair of index values (in some embodiments, both values are encoded into a single number, wherein the same PHC value (the index or address of the selected PHC 584 that receives the output of that vertical sensor) is loaded into its first index value, and the same bit value (the bit number that receives the output of that vertical sensor) is loaded into its second index value. In some embodiments, every bit in all the PHCs 584 is initialized to zero. If any location in the vertical sensor field is visited by a path (a detected cycle or a trace), the corresponding bit in the respective PHC 584 is set. Each respective PHC 584, 584' through PHC 584" then contains a different hash (the result of lossy data compression) of the cycle or trace being trained or recognized. Thus, a visit during a detected cycle or trace to any location in vertical sensor field 680 sets a one in bit 0 of PHC0 584, a visit during a detected cycle or trace to any location in vertical sensor field 681 sets a one in bit 1 of PHC0 584, and a visit during a detected cycle or trace to any location in vertical sensor field 682 sets a one in bit 2 of PHC0 584, and visits to any other vertical sensor field 680 (shown by small-dot outlines) will set the corresponding other bit of PHC0 584. Similarly, a visit during a detected cycle or trace to any location in vertical sensor field 680' sets a one in bit 0 of PHC1 584', a visit during a detected cycle or trace to any location in vertical sensor field 681' sets a one in bit 1 of PHC1 584', and a visit during a detected cycle or trace to any location in vertical sensor field 682' sets a one in bit 2 of PHC0 584', and visits to any other vertical sensor field 680' (shown by small-dash outlines) will set the corresponding other bit of PHC1 584'. Thus, each path-hash code PHC0 584, PHC1 584' through PHCN 584" has a different hash from a different set of vertical sensors in the vertical sensor array 580.

In one implementation example the next-address increment is RANDOM(1:256), so the average increment for the next state address is 128. In some embodiments, each vertical sensor field is a number of addresses selected such that for half of the possible paths (cycles or traces), the output bit for the vertical sensor field is 0 and the other half output a bit of 1; e.g., in some embodiments, a vertical sensor detects the presence or absence of a cycle or trace address within N consecutive state addresses (called the vertical sensor field) and sets the associated vertical sensor bit (N computed from $(127/128)^{**}N=0.5$ where N is 88 as described in paragraph 0066). Therefore, the probability that a cycle or trace address is contained within the range of the vertical sensor field is 0.5. The Y-bit path-hash code is created by concatenating Y vertical sensor bits corresponding to the status of each vertical sensor. The actual content of the N consecutive state addresses is a number, representing the first index and second index that identify which bit to set in which hash code. In this implementation, 10 hash codes are used to access 10 different response arrays. Each hash is 23 bits therefore the 10 response memories are each 8 Meg or 80 Meg total.

With a vertical sensor field of 88 addresses of the state array and 10 hash codes of 23 bits each, the total number of state addresses covered by vertical sensors is 20,240. The vertical sensor field for each bit of each hash code is evenly spaced over the state addresses. Fields from different hash codes are interleaved and not overlapping. Each hash code is an independent hash of the input pattern.

In some embodiments, an important property of the hash codes is that they are a fuzzy hash. In some embodiments, similar input patterns create similar cycles or traces that can generate the same hash code or similar hash codes (hash codes are similar if the differ by just a few bits). During training all ten hash codes that address the response memory can be assigned the response. In response mode, a response can be identified if 3 or more responses are the same, also contributing to the fuzzy nature of the hash.

Adjacent Hashes

A further method of improving the pattern-recognition systems of the present disclosure is to use adjacent hashes in training and recognition to enhance the degree of hash fuzziness. As discussed earlier, similar input patterns generate identical or similar hash codes because the corresponding cycles or traces are similar (i.e., they have overlapping state addresses). As used herein, a similar hash code is one that differs only by a few bits from another hash code and are called adjacent hash codes (e.g., a three-bit hash code will have three adjacent hash codes that differ by only one bit, three adjacent hash codes that differ by two bits and one adjacent hash code that differs by three bits, as shown in Table 2).

TABLE 2

| | |
|---|---|
| 3 bit Hash Code | 000 |
| Adjacent Hash Codes | 100 |
| (1 bit difference) | 010 |
| | 001 |
| Adjacent Hash Codes | 110 |
| (2 bit difference) | 101 |
| | 011 |
| Adjacent Hash Codes | 111 |
| (3 bit difference) | |

During training, the adjacent hash codes can also be trained (i.e. the pattern ID is stored in the response memory (hash table)) as well as the original hash code. In a supervised training mode, a known pattern is presented for training. If similar patterns are to be recognized, the adjacent hashes are trained as well. The degree of fuzziness can be adjusted by setting the maximum number of bits that differ in the adjacent hash codes. In recognition mode, the adjacent hashes can be generated and used as part of the consensus voting to determine the pattern's identity.

As shown in FIG. 3, another variation of the concept diagram relates to the pattern value. Rather than having a separate next state array for each possible pattern value, the pattern value is simply added to the counter along with the random increment. In this implementation, only one next state array is needed. Variation in the pattern value itself provides the uniqueness to the next state address.

From the description above, it would appear that the path-hash code is just another way of generating a hash code for the input pattern. This is true except for the very important difference that similar patterns generate similar cycles or traces and therefore similar or identical PHCs (CHCs or THCs). Even though there may be only 26 sensor fields represented in a path-hash code, each code essentially represents the whole input pattern. This is partially because each path address (once the cycle has been detected or the trace boundary is crossed) already has memory related to previously sampled points of the input pattern. Typically, ten path-hash codes are more than sufficient to recognize the pattern and provide fuzzy recognition. In some embodiments, if even just two of the path-hash codes match one another (or are adjacent hashes differing by only one or two bits), this is sufficient to recognize the pattern and provide fuzzy recognition.

Figure 7A:
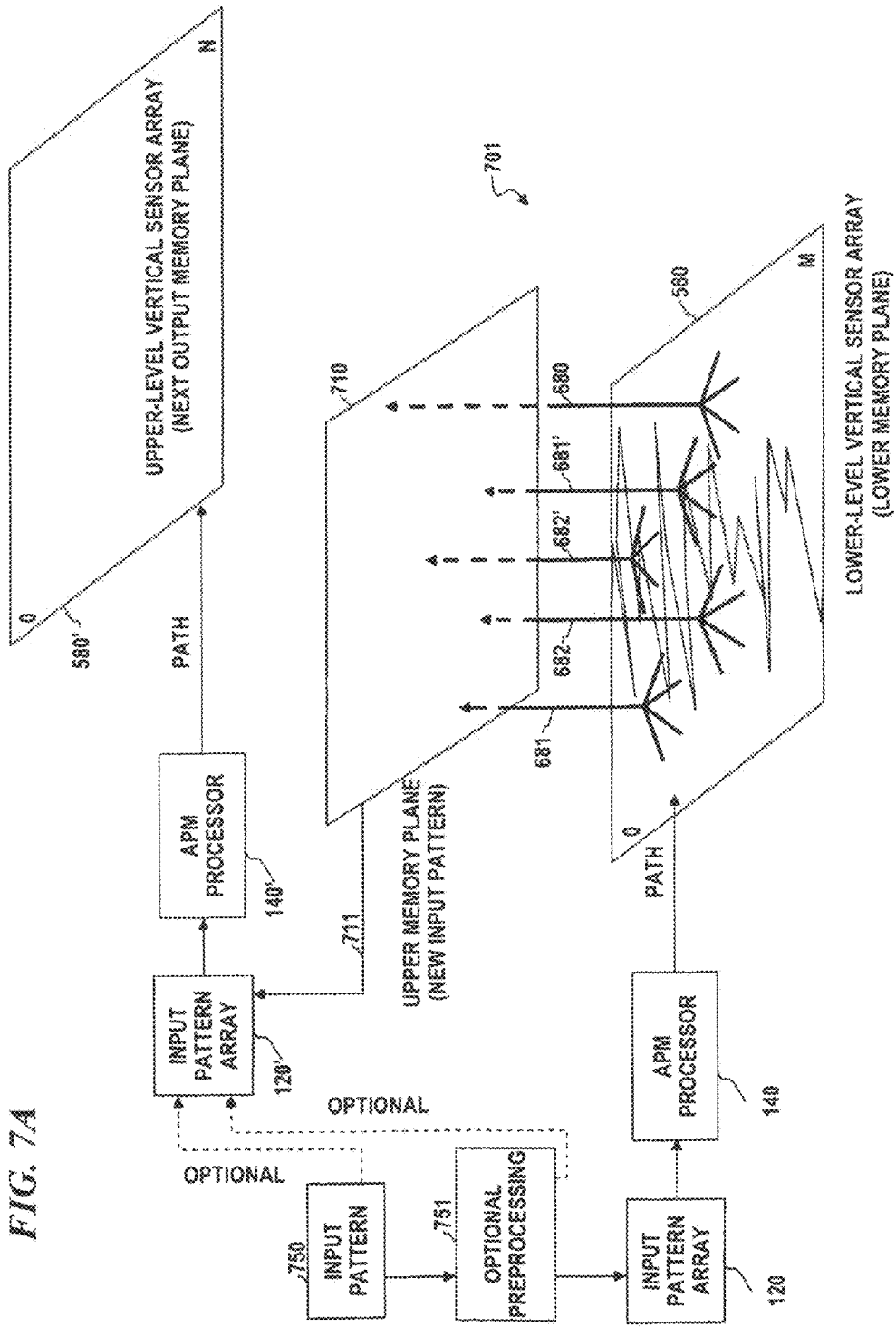
FIG. 7A is a diagram of a recursive low-level-higher-level vertical-sensor system, according to some embodiments of the present disclosure.

FIG. 7A is a diagram of a recursive low-level-higher-level vertical-sensor system 701, according to some embodiments of the present disclosure. In some embodiments of system 701, an input pattern 750 is optionally processed by a preprocessing operation 751 and the result (either the original input pattern and/or the results from the preprocessing operation 751) is loaded into input-pattern array 120, which is then processed by APM/PME processor 140 to obtain a path that is used to access various vertical sensors 681, 681', 682, 682', and 680. The data from these vertical sensors and/or the pattern indications fetched from hash tables indexed by the hashes formed from the vertical sensors are input to a higher-level upper memory plane 710 (essentially, the results are further preprocessing to the input pattern) and the data from upper memory plane 710 and optionally data from the original input pattern 750 or the earlier preprocessing operation 751 are then input to a next input pattern array 120', which is then processed by APM/PME processor 140' to obtain a path through memory 580' that is used to access various vertical sensors (essentially higher-level vertical sensors that can be used to generate higher-level hashes that are then used to retrieve higher-level pattern indicators from their respective hash tables and/or fuzzy and/or adjacent hashes). This entire process can optionally be executed yet again to use the results from the higher-level pattern indicators for further PME processing in yet higher levels of APM recognition. This can be used, for example, to process video sequences (e.g., following moving objects), stereo image sets (to determine depths of objects), seismological data (e.g., to anticipate earthquakes or volcano eruptions or to find oil-field locations), or other processing that initially does low-level recognition as a pre-processing step for higher-level recognition.

Figure 7B:
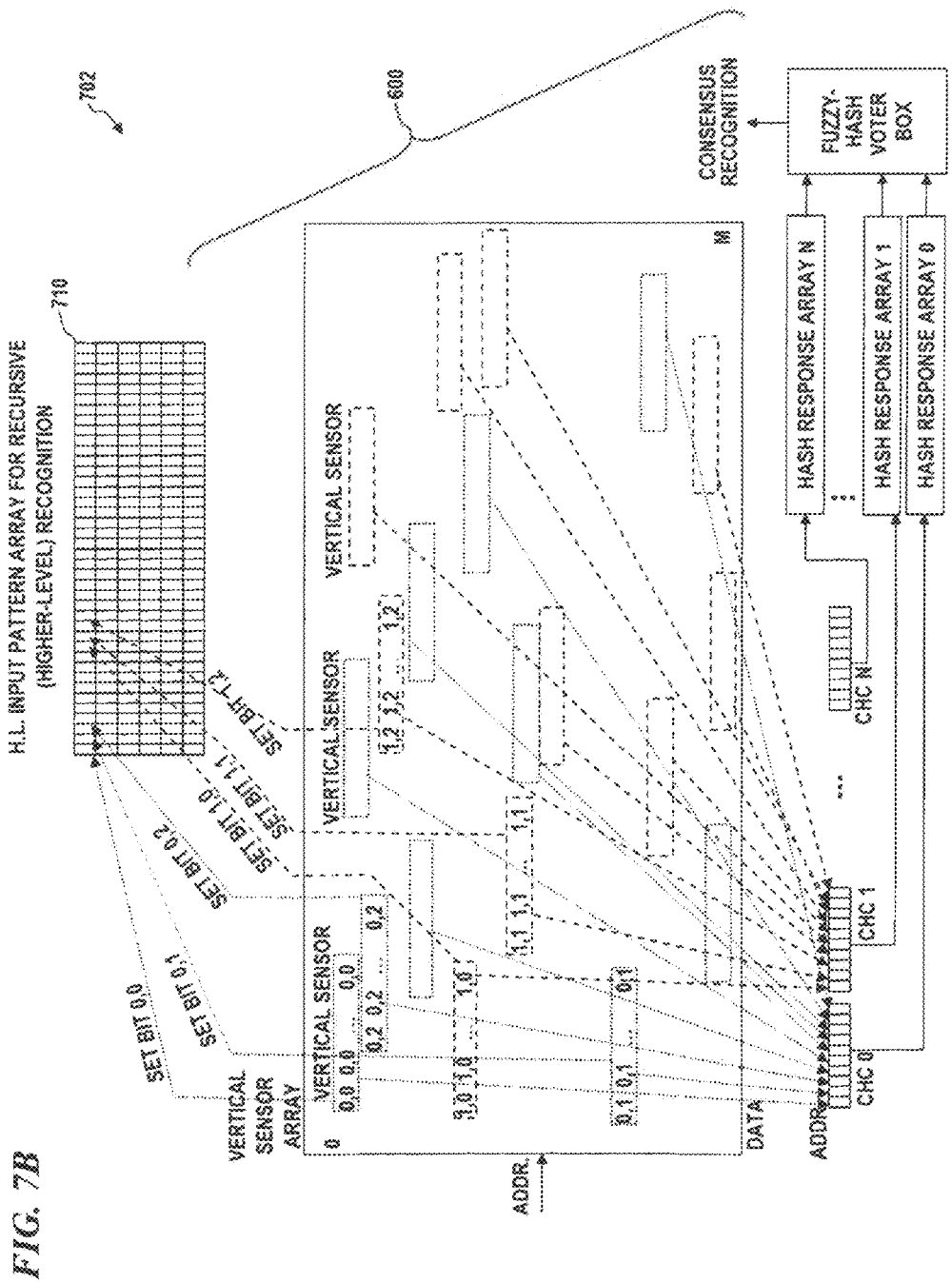
FIG. 7B is a diagram of a vertical sensor system, according to some embodiments of the present disclosure, which also implements upper-plane recursive pattern recognition.

FIG. 7B is a block diagram of a vertical sensor system 702, according to some embodiments of the present disclosure, which also implements upper-plane recursive pattern recognition. As was described for FIG. 6, the output of vertical sensors 680, 681 and the like are used in some embodiments for the bits of PHC0 through PHCN. However, in some embodiments, as shown in FIG. 7B, the vertical sensors (either the same ones used for the PHC bits or a different set of vertical sensors) provide bits that are set in a high-level pattern array 710 for recursive (i.e., higher level) pattern recognition (in some embodiments, high-level pattern array 710 is also called the upper-memory plane). In some embodiments, once all portions of some or all of the original input data are analyzed, the values of high-level pattern array 710 are used as inputs for another pattern-recognition operation (e.g., they are input in whole or in parts into an input pattern array 120 of one of the above embodiments, and a pattern training/pattern recognition process is run against these outputs of the vertical sensors 680-681).

Figure 8:
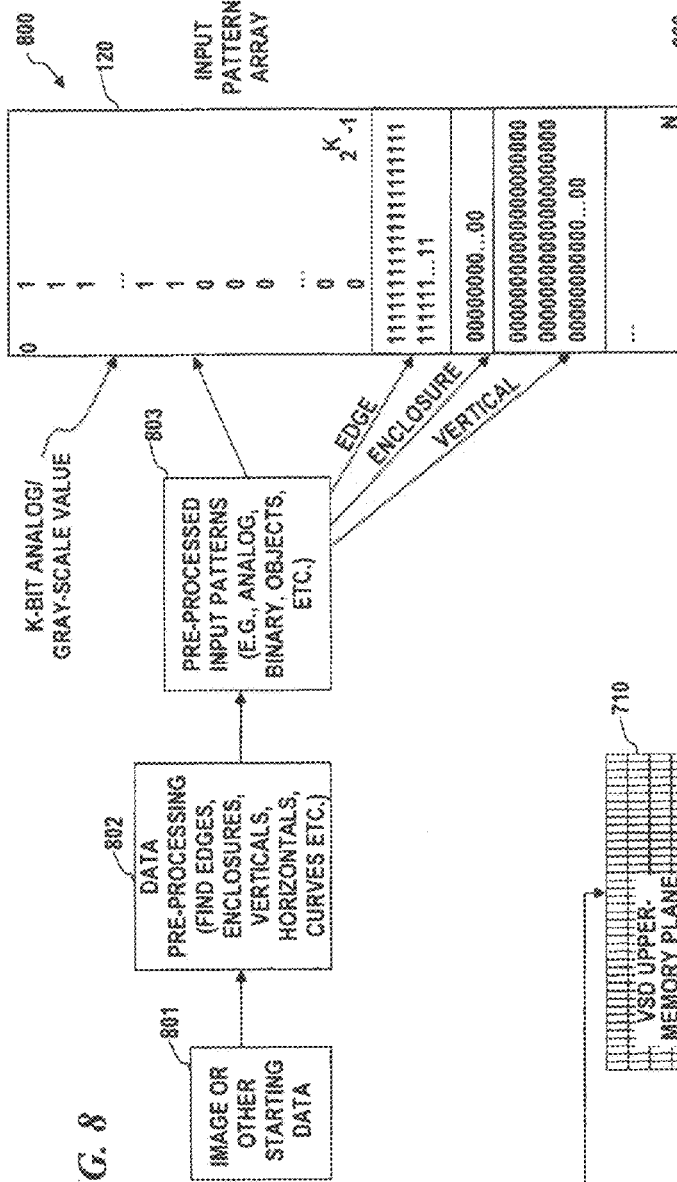
FIG. 8 is a block diagram of a pattern-data pre-processing system, according to some embodiments of the present disclosure, which implements fuzzy magnitude sensing.

FIG. 8 is a block diagram of a pattern-data pre-processing system 800, according to some embodiments of the present disclosure, which implements fuzzy magnitude sensing. In some embodiments, system 800 starts with an image or other starting data 801, performs some preprocessing 802 to obtain pre-processed input patterns (e.g., analog values, binary (e.g., presence of edges, enclosures, vertical lines, horizontal lines, certain colors, and the like) for portions of the input data 801). In some embodiments, analog values are converted to a bar-graph format (e.g., a number of ones corresponding to the value, followed by zeros to fill out the field of 2" bits). In some embodiments, analog values are converted to a bar-graph format (e.g., a number of ones corresponding to the value, followed by zeros to fill out the field of K bits). In some embodiments, binary values can be weighted by different amounts by repeating their values a different number of times for edges, enclosures, vertical lines, etc.

Figure 9:
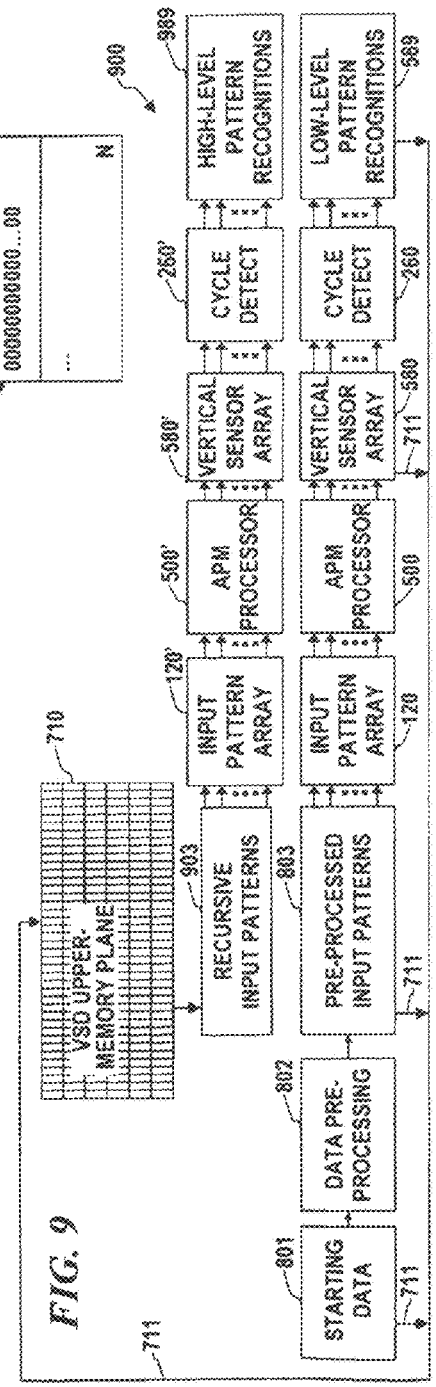
FIG. 9 is a block diagram of a pattern-recognition system, according to some embodiments of the present disclosure, which implements upper-plane or higher-level cycle detection and pattern recognition.

FIG. 9 is a block diagram of a pattern-recognition system 900, according to some embodiments of the present disclosure, which implements upper-plane or higher-level cycle detection and pattern recognition. In some embodiments, the data is analyzed along the bottom row of blocks as described above, and data 711 from the vertical sensor array 580 (and/or optionally data 711 from starting data 201, pre-processed-input patterns 803, and/or low-level pattern recognitions) are output into the vertical sensor bit array 710 (i.e., the upper-level-memory plane) and placed into recursive patterns 903 and then recursively analyzed (processed again one or more times recursively) to obtain the high-level recognition 989.

Alternative to Cycles

In some embodiments, an alternative to generating a complete cycle is used to speed up the APM of the PME described in some embodiments above. In some of the embodiments described above, cycles are detected using a cycle-detection algorithm that detects a looping path obtained by processing a given input pattern with a given state array pattern and given next-state address pattern. As describe above, regardless of the starting state, the branching pattern or path will eventually end up in a loop branching pattern, herein called the cycle. The purpose for detecting a complete cycle is that the system is not aware of being on a path that will eventually end up in a looping pattern until the loop (i.e., cycle) has completed. A limitation of using complete cycles is that computational resources and memory are required to execute the cycle-detection algorithm. In some embodiments, the alternative to using complete cycles to determine that a state is on a looping path is to use only a portion of the path (herein called a trace) and use statistics as described below to determine whether a state is on a path that will eventually end up in a looping pattern. The use of traces as an alternative to cycles can be used without any loss in functionality, and traces are faster than cycles because the cycle-detection array, cycle detection, and write cycle ID can be eliminated. In some embodiments, all other components of the PME are as described previously.

In some embodiments, any portion of a looping path (i.e., a cycle) can be referred to as a memory trace or simply a trace and as is true for a cycle, a trace consists of a random set of addresses in the state array. In some embodiments, the state address starts at address 0 for each training or recognition process and a minimum number of steps through the state array are taken before vertical sensors are encountered. Delaying a minimum number of steps through the state array ensures that the state addresses converge to a trace that would be a portion of a looping path. With the state address starting at address 0, any vertical sensors that would be at the beginning of the state array would be highly dependent on the starting state regardless of the input pattern. Therefore, by waiting a minimum number of steps, the trace is dependent on the input pattern and not the starting state. In some embodiments, as in the case of a cycle, there will be only one possible trace for each input pattern.

As mentioned previously, statistics are used to determine whether a state is on a path that will eventually end up looping. Specifically, the probability that a state is on a looping path after progressing through a particular number of states in the state array is used to determine when to start encountering vertical sensors. In some embodiments, the maximum step size determines the number of steps (from state 0) to delay before vertical sensors are encountered. Any state that occurs in the trace has some memory of the states preceding it and therefore memory of the corresponding input pattern samples. A large maximum step size results in a long memory and a short maximum step size results in a short memory. The memory associated with any maximum step size is related to the probability that a preceding state (N steps ago) still determined the current state. This relationship is described in Equation 1:

$$P = \left(\frac{(AvgStep - 1)}{AvgStep}\right)^N$$

where, P is the probability that the current state has not yet randomly landed on a looping path (the trace) for the current input pattern and AvgStep is the average step and is equal to the maximum step, MaxStep, divided by two (i.e., AvgStep=MaxStep/2) for a random step size of 1 to MaxStep. For example, with a MaxStep size of 256 and therefore an AvgStep size of 128 the probability of landing on a point on the looping path (or trace) for any given pattern is 1 in 128. The probability of not landing on it is 127/128. With random independent selections, the probability of not landing on the input pattern's looping path (or trace) is given by the probability of Equation 1 above. For the given example, P=0.05 after 382 steps. That is, after 382 steps there is a 95% chance that the current state is on the looped path (or trace) created only by the current input pattern and not dependent on the state that occurred 382 steps ago. For this example, the vertical sensors would therefore begin after 382 steps and as the AvgStep size is 128, the vertical sensors would begin after state address 48,896 (i.e., 128×382). In some embodiments, the vertical sensors are encountered when the probability that the current state has not yet randomly landed on a looping path (i.e., the trace) for the current input pattern is equal to about 10% or less. In some embodiments, the vertical sensors are encountered when the probability that the current state has not yet randomly landed on a looping path (i.e., the trace) for the current input pattern is equal to about 7% or less. In some embodiments, the vertical sensors are encountered when the probability that the current state has not yet randomly landed on a looping path (i.e., the trace) for the current input pattern is equal to about 5% or less. In some embodiments, the vertical sensors are encountered when the probability that the current state has not yet randomly landed on a looping path (i.e., the trace) for the current input pattern is equal to about 2% or less.

In some embodiments, the size of the vertical sensor field is also computed from Equation 1, but with P substantially equal to 0.5 (i.e., the size of the vertical sensor field is log(0.5)/log((A−1)/A), such that the probability of any given trace or cycle using one of the bits in the vertical sensor field is about 50%). The size of the vertical sensor field is chosen such that there is an equal chance of the vertical sensor field encountering a state having a trace point and not encountering a state having a trace point. In the case described above, with the MaxStep size equal to 256, to achieve a probability of 50%, the vertical sensor field size is N=88. That is, each vertical sensor with a vertical sensor field size of 88 addresses (random or consecutive) will have a 50/50 chance of including a trace point. If the trace point is present, then the vertical sensor bit is set to 1, and if the trace point is not present, the vertical sensor bit is set to 0.

Figure 10:
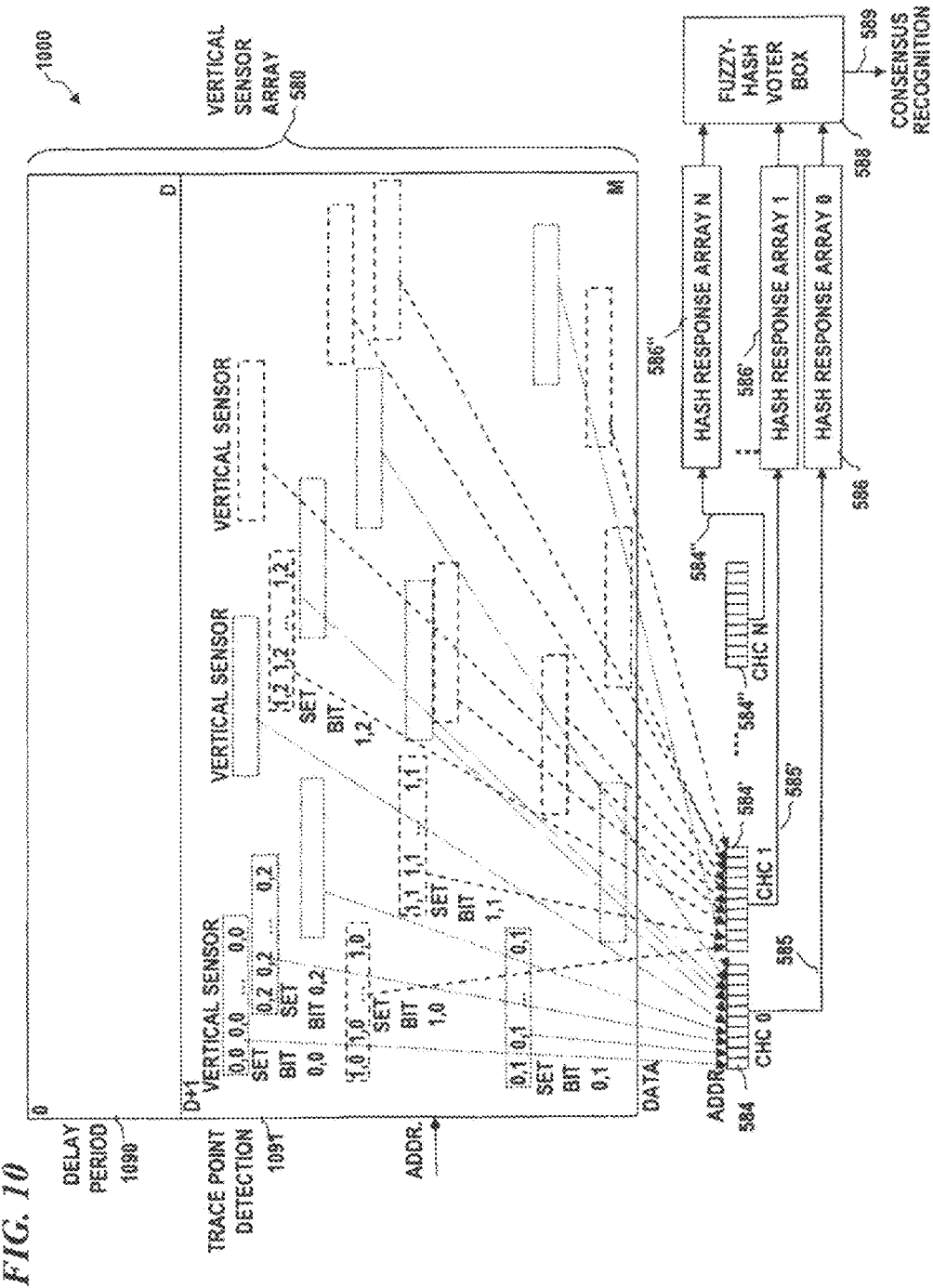
FIG. 10 is a block diagram of a vertical sensor system, according to some embodiments of the present disclosure, which implements a delay prior to initiating trace point detection.
Figure 11:
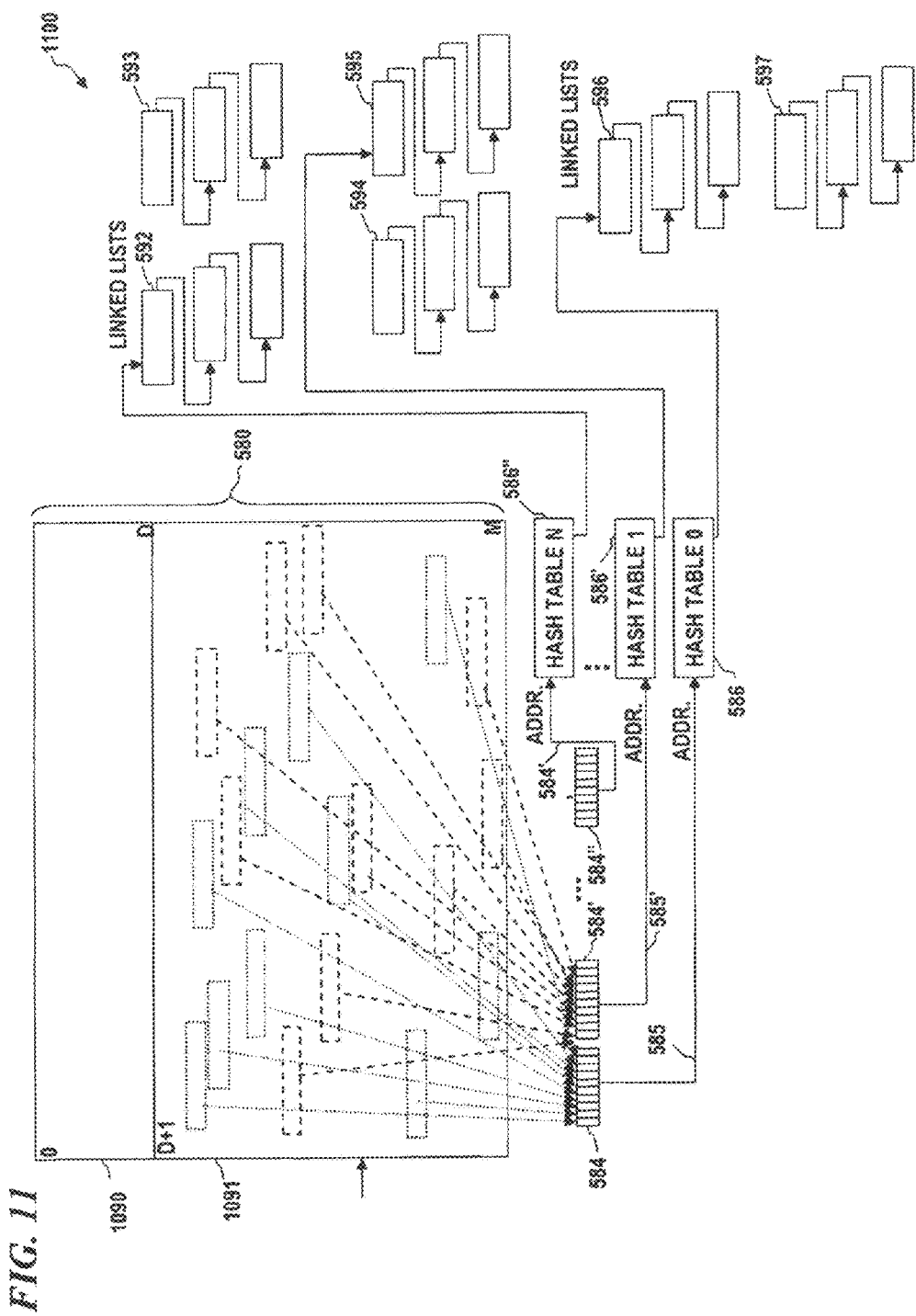
FIG. 11 is a block diagram of a vertical sensor system, according to some embodiments of the present disclosure, which implements linked lists that can be used as a form of content-addressable memory.

FIG. 10, is a block diagram of a vertical sensor system 1000, according to some embodiments of the present disclosure, which implements a delay period 1090 prior to initiating trace point detection 1091 to ensure the state has randomly landed on a trace point. In some embodiments, vertical sensor system 1000 can be used with previously described pattern-recognition systems. In some embodiments, vertical sensor system 1000 is similar to vertical sensor system 600 described in FIG. 6 and above except that vertical sensor system 1000 implements a delay period 1090 that includes vertical sensor array addresses 0 to D, prior to starting the vertical sensors and trace point detection 1091 at address D+1. That is, in some embodiments, the vertical sensor array has address locations from 0 to M, however the vertical sensors are not encountered until address location D+1 has been reached. Using the case described above, with the MaxStep size equal to 256 and the probability of Equation 1 set to 5%, the delay period would last until vertical sensor array address D=48,896 and vertical sensors would begin at D+1=48,897.

Sampling the Input Pattern

A number in the input pattern could represent any number of features. Visual features could be edges, enclosures, intersections, etc. If the number represents a magnitude such as a gray level, similar magnitudes should have similar representations. The operation of the PME is not driven by mathematical representation, and therefore, the number 10, for example, is totally different from the number 11 even though their magnitudes are similar. Given the way the PME is described, a number of magnitude 10 would be assigned a completely different next state than the number 11. The solution is to sample magnitudes as an image of a bar graph. A bar graph image of magnitude 10 is very similar to a bar graph of 11. If the range of the magnitude were from 0 to 64 (64 bits, each bit is an address) a magnitude of 10 would have 10 lower bits set to a 1 and the rest 0. The full 64-bit range would be part of the sample space of the input pattern. In actual application, the state array could include a fixed random magnitude that is compared to the sampled magnitude (for those sampled values that are a bar graph representation of a magnitude). The random magnitude would range from zero to the maximum range of the bar graph. If greater, the sample value is a 1 and if smaller the value is a 0.

A more specific implementation in PME can again be described with respect to FIG. 13. To implement magnitude data in PME, an additional single-dimensional array of the same size as arrays 1204, 1206, 1208, 1302, and 1304 and indexed in the same manner may be provided. We will refer to this array as the random magnitude array. During initialization of the PME, the PME generator may fill the random magnitude array with spread numbers, or otherwise a pattern of random or non-random numbers, as described above. In this case, the spread numbers may range from a minimum expected to a maximum expected magnitude of the pattern (e.g., 0 to 64, using the above example). For a given state, the location of the random magnitude array is indexed to obtain the value stored therein. That value may be compared to the sampled input pattern value 129 of array 1202 to determine whether the sampled input pattern value is greater than or less than the value from the random magnitude array. The appropriate next state array or next-state increment array to be indexed to obtain the next state may be selected based on whether the sampled input pattern value is greater than or less than the value from the random magnitude array (as opposed to, for example, whether the sampled input pattern value is a "1" or "0", as previously described). The result is generally equivalent to a spatially distributed binary pattern.

Usually the total number of states is much larger than the number of input sample points (i.e., the pattern dimension). As a result, each input pattern magnitude would likely be sampled multiple times with a different random magnitude comparison providing an estimate of its magnitude. For example, with a pattern of dimension 100 and a cycle length of 1,000, each input pattern would, on average, be sampled and compared to a random magnitude about 10 times.

In the case of a category pattern, such as but not limited to, a text string, a next-state increment array may be provided for each possible input value. For example, if there are 64 different characters possible, there could be 64 different next state choices provided by 64 next-state increment arrays. During initialization of the PME, the PME generator may fill the random magnitude array with spread numbers, or otherwise a pattern of random or non-random numbers, as described above with respect to the next-state increment arrays of FIG. 12.

These implementations permit the use of a common representation (i.e., cycles) and APM recognition process for different input types (e.g., magnitude or category patterns). These implementations of PME can eliminate or reduce the complexity required to conventionally process absolute magnitude numbers mathematically. In many cases, the absolute magnitudes of digitized signals is noisy, and only an overall approximation of the intensity pattern is needed anyway. These implementations account for this. Furthermore, similar (noisy) intensity patterns can be clustered and recognized as the same pattern without complex mathematical comparisons. Representing magnitudes in this way helps enhance fuzzy recognition.

Recreating Input Patterns from Cycles

So far, cycles have been described as pattern representations that, in some cases, can even be superimposed at successively higher level inputs to form higher level representations. However, cycles determined by a CME can also be used to move down the hierarchy, by recreating the learned input patterns they represent. Specifically, as described above, each state in a cycle points to, or corresponds to, a specific sample point of the input pattern, and each next state determines what the sampled value was, or at least the sampled value can be determined from knowing the next state. As a result, the cycle can be used to reproduce the input pattern that created it. This can be repeated at each level of a hierarchy.

Various Applications and Implementations

Unsupervised and Supervised Learning

The various embodiments of PME may generally apply to two segments of machine learning: unsupervised learning and supervised learning. In unsupervised learning, the patterns of interest in a dataset are generally not known, and therefore, there is no supervisor to train the correct pattern identity. The machine learning task is to identify clusters of similar patterns and determine if these clusters reveal meaningful insights about the data (e.g., identifying similar consumer purchasing patterns for target marketing). In supervised learning, the identity of the patterns in the dataset are typically known, and there is a supervisor that provides a known identity. The machine learning task is to learn the known identities with each pattern (e.g., learning a person's identity (ID) with their facial image pattern).

Figure 15:
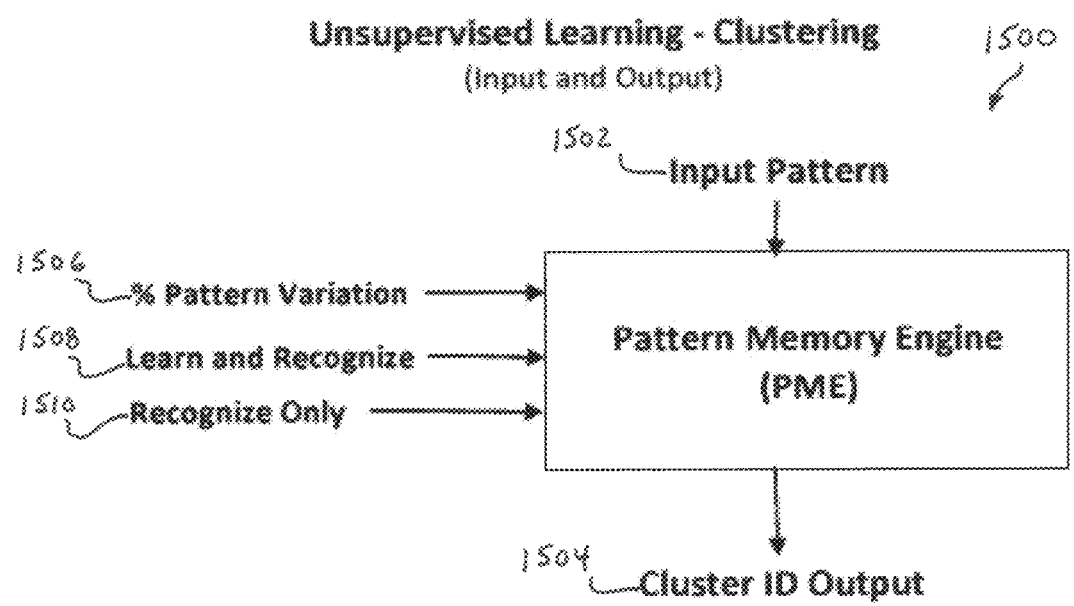
FIG. 15 is a block diagram of a PME configured for unsupervised learning, according to some embodiments of the present disclosure.

One embodiment or implementation of a PME 1500 in unsupervised learning is illustrated in FIG. 15. Typically, although not required, a raw input pattern 1502 is described by a list of numbers. A dataset of patterns could be described by an analogy to a spread sheet. The number of rows identifies the number of patterns and the number of columns identifies the number of parameters describing each pattern. For example only, the parameters could be ASCII code for text, measurements of a person's facial features, a digitized signal, a frequency count of a histogram, or any other list of numbers or categories that describe a pattern. As shown in the embodiment of FIG. 15, each input pattern 1502 may generate a cluster ID output 1504. The PME may first attempt to recognize the input pattern 1502 as similar to a previous pattern it has already learned. If a similar learned pattern is recognized, the PME outputs the cluster ID corresponding to that similar pattern. If, however, the input pattern 1502 is not similar to any other previously learned pattern, the PME "learns" the input pattern by assigning it a new cluster ID, which becomes the cluster ID output 1504. Basically, the PME recognizes and learns substantially simultaneously. This allows it to learn the clusters and recognize patterns in a single pass or nearly a single pass through a data set, and allows it to operate efficiently on streaming patterns of data.

The % pattern variation 1506 parameter specifies an acceptable degree of similarity between patterns that identify a cluster. Generally, to cluster similar patterns there should be a way to measure their similarity. A common measure of similarity for clustering is the Manhattan Distance measure. This distance measure can be computed as the sum of the absolute difference between respective parameters of two input patterns 1502. This is generally the distance measure that can be used by the PME. However, the PME does not need to compute an actual difference between patterns by comparing it with other patterns, as would otherwise be required. Instead, similarity is inherent to the unique way the PME represents patterns (i.e., cycles). Pattern similarity emerges automatically based on random sampling and laws of probability. For example, if the % pattern variation 1506 was set to 10%, each cluster would contain patterns that vary by 10% or less. If set to 0%, the PME would identify clusters for which the patterns were identical.

The learn and recognize 1508 parameter, if enabled, causes the PME to learn (assign a new cluster ID) to any input pattern 1502 not recognized (i.e., no similar pattern has been learned). On the other hand, the recognize only 1510 parameter, if enabled, causes the PME to only recognize patterns it has already learned. One example use for recognize only mode would be for identifying what are commonly referred to as outliers. For a more specific example, if a process has been monitored such that all normal patterns have been learned, the trained PME could be operated with recognize only 1510 mode enabled, so that any pattern outliers would be identified by a predetermined cluster ID output, such as a cluster ID output of "0" (i.e., not recognized).

Figure 16:
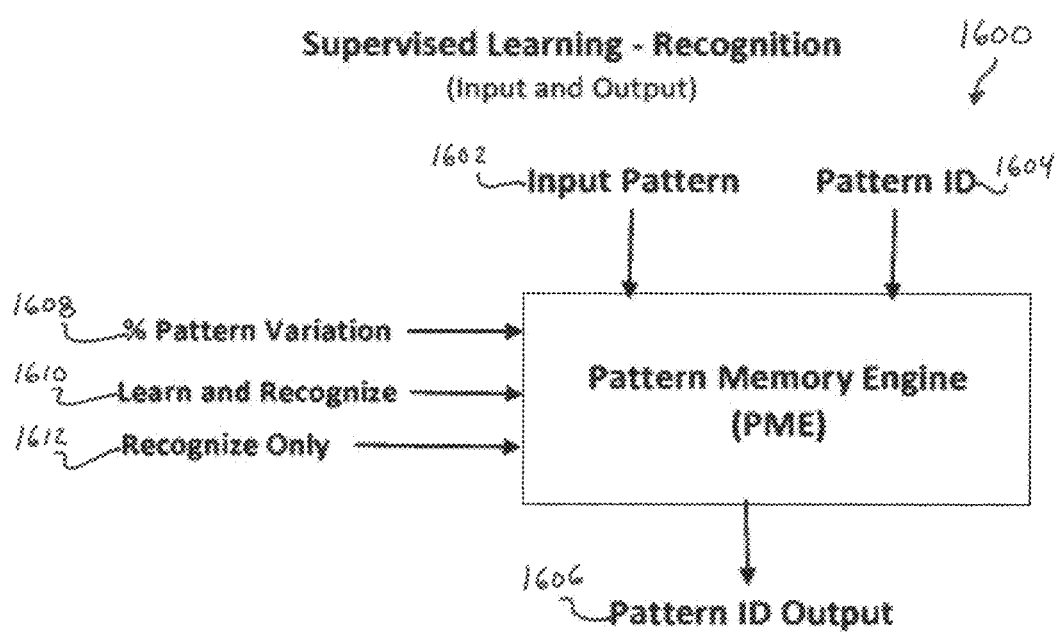
FIG. 16 is a block diagram of a PME configured for supervised learning, according to some embodiments of the present disclosure.

One embodiment or implementation of a PME 1600 in supervised learning is illustrated in FIG. 16. As described above, typically, although not required, a raw input pattern 1602 is described by a list of numbers. In supervised learning, the input patterns 1602 to be learned will generally already have a known identity (ID). For example, the facial features (e.g., pattern) of a person's face associated with their name (e.g., ID). As each input pattern 1602 is presented, its pattern ID 1604 is also presented. The PME 1600 learns the input pattern 1602 by assigning it the ID 1604. If the same or similar input pattern, depending on the % pattern variation parameter; occurs or is input to the PME 1600 at a later time, the PME will output its previously learned pattern ID at pattern ID output 1606.

Although not dissimilar, the % pattern variation 1608 parameter typically has a different meaning for supervised learning than unsupervised learning. In the case of supervised learning, % pattern variation 1608 relates more to noise immunity or the ability to identify the same pattern despite noise. For example, two successive snapshots of the same image will typically never be exactly identical. For example, the intensity of different pixels will usually vary based on some degree of random noise. The % pattern variation 1608 parameter can be used to set the expected degree of noise or other distortions in subsequent presentations of the learned pattern. As a result, the PME 1600 will output the same pattern ID if the pattern presented is distorted less than the amount allowed by the % pattern variation 1608 parameter from the originally learned pattern.

The learn and recognize 1610 parameter in the implementation illustrated in FIG. 16 operates generally the same as described with respect to the implementation illustrated in FIG. 15. However, it could also be used in a different way. For example, consider a database of facial images with known identities. While learning each pattern's ID, the PME could also identify any duplicates in the database since it would have already learned the same pattern previously. Likewise, in supervised learning, multiple facial profiles of the same individual, or other pattern based data, could be learned and associated with the same pattern ID. The recognize only 1612 parameter in the implementation illustrated in FIG. 16 operates generally the same as described with respect to the implementation illustrated in FIG. 15.

Hardware Implementations

Although described above as having potential for simple hardware implementation, a specific hardware implementation for a PME will now be described with respect to FIG. 17. At a basic level, the embodiment of a PME 1700 in FIG. 17 may consist, largely, of conventional random access memory or other suitable memory. The Current State Address 1702 generally controls the APM process. In one embodiment, the Current State Address 1702 comprises a block of random access memory, and contains the current state that simultaneously addresses or indexes the contents of various other random access memory or read-only memory blocks. These other memory blocks are the Pattern Input Addresses 1704, Next State Memory Addresses0 1706 and Next State Memory Addresses1 1708, or additionally or alternatively any other number of next state or next-state increment memory blocks, as appropriate for the implementation, any Magnitude Comparison Memory 1710, if desired, and a vertical sensor memory (later discussed), if desired. As described above, each of these blocks of memory stores an array, and the arrays in these blocks of memory can be preloaded by the PME generator at initialization with spread numbers, or otherwise a pattern of random or non-random numbers, with the range of the spread numbers typically dependent on the type of application. The content of these memory blocks 1704, 1706, 1708, 1710, and 1712 may generally define the type of PME and remains constant during processing. The sizes of these random access memory blocks 1704, 1706, 1708, 1710, and 1712 may all be the same and may each match the size of memory potentially addressable by the Current State Address 1702 memory block. For example, a 17-bit Current State Address 1702 memory will address a memory size of 131,072 addressable locations (e.g., array size). The total of all possible addresses addressed or indexed by the Current State Address 1702 memory block may be referred to herein as the state addresses.

The Pattern Input Addresses 1704 memory block generally stores the sample address locations of the pattern stored or inputted into an Input Pattern Memory 1714 block. The Input Pattern Memory 1714 block may be an addressable memory containing an input pattern, and may be memory that is internal to the PME or may be memory that is external to, but accessible by, the PME. The Pattern Input Addresses 1704 memory block, in other words, defines the sampling distribution of the input pattern 1716. More specifically, for any given state address stored in the Current State Address 1702 memory block, the contents of each location in the array stored in the Pattern Input Addresses 1704 memory block identifies the specific address or index in the Input Pattern Memory 1714 block to sample. As an example, for a pattern length of 192, the Pattern Input Addresses 1704 memory block may contain an array where each addressable array location may store a value in the range of 0 up to 191. As described herein, the distribution of these values stored in the Pattern Input Addresses 1704 memory block could be random or any other distribution.

The Next State Memory Addresses0 1706 and Next State Memory Addresses1 1708 memory blocks generally identify the next state to be loaded into the Current State Address 1702 memory block, depending on the input value sampled, as indicated by the Pattern Input Addresses 1704 memory block as described above, from the Input Pattern Memory 1714 block. In the example illustrated in FIG. 17, the Processed Sampled Value 1718 is a binary "1" or "0", and therefore, there is a choice of two next states, which are determined by the contents of the arrays stored in the Next State Memory Addresses0 1706 and Next State Memory Addresses1 1708 memory blocks indexed by the address stored in the Current State Address 1702 memory block. The next state identified or otherwise determined or indicated by the appropriate one of the Next State Memory Addresses0 1706 and Next State Memory Addresses1 1708 memory blocks will ultimately be stored in the Current State Address 1702 memory block as the next current state.

In one embodiment, the preloaded content of each memory may be created by first defining a maximum next state increment, such as 64. Of course, the various embodiments described herein are not limited to a maximum next state increment of 64, and any other suitable increment may be used, and may depend on the application or other factors. The PME generator may, for each addressable location in the Next State Memory Addresses0 1706 and Next State Memory Addresses1 1708 memory blocks, and any other number of next state or next-state increment memory blocks, as appropriate for the implementation, generate and store at that location a random number between 1 and the maximum next state increment, e.g., 64. During cycle detection/recognition, the random next state increment value indicated by the appropriate one of the Next State Memory Addresses0 1706 and Next State Memory Addresses1 1708 memory blocks may be added to the address stored in the Current State Address 1702 memory block and overwritten back into the Current State Address 1702 memory block as the next current state. When the next current state would address a location larger than the size of the Pattern Input Addresses 1704 memory block, e.g., it becomes greater than 131,071 (the maximum of the 17-bit Current State Address), the Current State Address 1702 memory block rolls over and starts anew, e.g., address 13,080 becomes address 9.

The Magnitude Comparison Memory 1710 block generally stores a preloaded random, or otherwise predetermined, magnitude value in each addressable location thereof. The magnitude value, preloaded by the PME generator, in any given addressable location of the Magnitude Comparison Memory 1710 block may be a value between a predetermined minimum magnitude value and maximum magnitude value expected to be sampled from the pattern input into the Input Pattern Memory 1714 block. Although the magnitude values preloaded by the PME generator could be within some other suitable range, as desired for the application. As an example, a maximum pattern parameter value that might be expected to be sampled from the pattern input into the Input Pattern Memory 1714 block could be 255. In such a case, each addressable location of the Magnitude Comparison Memory 1710 block may be preloaded with a magnitude value of between 0 and 255. The distribution of magnitude values in the addressable locations of the Magnitude Comparison Memory 1710 block could be random, or could be any other suitable distribution, such as but not limited to, logarithmic (e.g., human scale of light intensity). Each value sampled from the pattern input into the Input Pattern Memory 1714 block, as determined by the Pattern Input Addresses 1704 memory block, may be compared to the random magnitude value in the Magnitude Comparison Memory 1710 block indexed by the address stored in the Current State Address 1702 memory block. In one embodiment, if the value sampled from the Input Pattern Memory 1714 block is greater than the random magnitude value in the Magnitude Comparison Memory 1710 block indexed by the address stored in the Current State Address 1702 memory block, this may be considered a binary value of "1" (or "0", if desired). Likewise, if the value sampled from the Input Pattern Memory 1714 block is less than the random magnitude value in the Magnitude Comparison Memory 1710 block indexed by the address stored in the Current State Address 1702 memory block, this may be considered a binary value of "0" (or "1", if a "0" was used to represent a greater value). The appropriate one of the Next State Memory Addresses0 1706 and Next State Memory Addresses1 1708 memory blocks may be selected based on the result of this comparison.

The vertical sensor memory 1720 block is generally used to generate hash addresses for the pattern inputs as the Current State Address sequences in a cycle, and its contents may comprise, for example, arrays 1302 and 1304. A learned or recognized identity (ID) of a pattern input may be stored in a hash table in a block of memory, referred to herein as ID Memory 1722 block, and can be indexed or addressed by ID hash addresses. The ID hash addresses are generated as the PME cycles through the state addresses. Addresses stored in the Current State Address 1702 memory block index the vertical sensor memory 1720 memory block, which outputs either a hash number and its bit number or, for example, a "0". If the output is non-zero, the outputted bit number in the hash indexed by the hash number is set to "1" (see also FIG. 13). In one embodiment, during initialization of the PME, the PME generator may fill vertical sensor memory 1720 such that vertical sensors are distributed throughout the state addresses and spaced to assure that each bit of a hash has about or around a 50/50 probability of being set. Of course other chances of probability would also be suitable. Those vertical sensors that are part of a cycle generate ID hash addresses, indexing the ID Memory 1722 block.

The ID Count Histogram Memory 1724 block may be sized to the maximum number of cluster IDs, as specified, for example, by the PME generator, and may be based on the particular application. Each address location in the ID Count Histogram Memory 1724 block may be indexed by a pattern ID, and each address location may store a value representing how many times the pattern ID has been recognized, i.e., how many patterns are in that cluster.

In some embodiments, a State Address Count Memory 1726 block may be provided. This memory block may also be sized to match the size of memory potentially addressable by the Current State Address 1702 memory block (e.g., 131,072) and each addressable location may be initialized to "0". During cycle detection/recognition, the contents of each location indexed by the Current State Address 1702 memory block as states are sequenced through the Current State Address 1702 memory block may be incremented. Any location in the State Address Count Memory 1726 block storing a count of "1" indicates or represents a transition state. That is, a sequence of state addresses that lead to a cycle. Any location in the State Address Count Memory 1726 block storing a count of "2" indicates that the state addresses are repeating, and in a cycle. Any location in the State Address Count Memory 1726 block storing a count of "3" indicates that all state addresses in a cycle have been identified (e.g., as "2s").

Certain functions may additionally be implemented within the PME hardware. In one embodiment, zero address count and zero ID count functions may be provided to clear the contents of the State Address Count Memory 1726 block and the ID Count Histogram Memory 1724 block. An additional function implemented within the PME hardware may be an integer comparison of the current ID count with some predetermined threshold, which may be set, for example, by the PME generator, and may be based on the particular application. Yet another function implemented within the PME hardware may be to set the bits in the ID Memory 1722 block pursuant to the contents of the vertical sensor memory 1720 block, which may be referred to herein as a generate ID hash address function. Still another function, referred to as a create new ID function, may be implemented within the PME hardware and may increment the total ID count, so as to generate a new learned pattern ID. Another function implemented within the PME hardware may include turning off learning or recognition when the State Address Count Memory 1726 block comprises a count of "1" and turning it on when it comprises a count of "2" or "3". Still another function implemented within the PME hardware, and referred to herein as the process sampled value function, includes choosing the appropriate next state for storing in the Current State Address 1702 memory block depending on, at least, the value sampled from the pattern input into the Input Pattern Memory 1714 block. In one embodiment, as described above, the value sampled from the pattern input into the Input Pattern Memory 1714 block identifies which next state memory address memory block to select. In some embodiments, the process sampled value function may include an integer comparator that as described above, compares the magnitude from the Magnitude Comparison Memory 1710 block with the magnitude of the value sampled from the pattern input into the Input Pattern Memory 1714 block.

Example specifications, although not limiting specifications, for a single PME hardware memory module 1700 may include a single core 2.5 GHz processor and 2 gigabytes of memory. In one embodiment, the maximum pattern memory capacity may be 5,000 pattern IDs. Generally, this relates to the maximum number of patterns that can be learned. In supervised learning, for example, this may be the number of different patterns to be recognized. In unsupervised learning, for example, this is the number of different clusters that can be identified. Of course, more or less than 5,000 pattern IDs could define the maximum pattern memory capacity of the PME memory module 1700 in other embodiments. There is, however, generally no limit on the number of patterns that can be processed. In one embodiment, the PME may be configured with a maximum % variation of 15%. However, other maximum % variations could be used, as desired or appropriate. The maximum % variation generally refers to the maximum variation of patterns within a cluster (in, for example, unsupervised learning) or the maximum variation to recognize a pattern as the same pattern previously learned (in, for example, supervised learning). As described above, all clusters with pattern variation less than this maximum will be identified, including clusters that have identical patterns (i.e., 0% variation). In one embodiment, the maximum pattern length may be set, such as, to 1,000 pattern parameters. However, any other maximum pattern length may be used, as desired or appropriate. Likewise, in one embodiment, the maximum parameter magnitude for a pattern may be set, such as, to an integer value of 255. However, any other maximum parameter magnitude may be used, as desired or appropriate. In many instances, these specifications permit a pattern recognition speed of less than 100 microseconds per pattern.

The above PME specifications are for just one example. It is recognized that other PMEs with different performance specifications can be created. In one embodiment, a PME generator may operate or run offline in software and define the content of the appropriate arrays in each PME module and stores one or more of the above-described configurations in memory or a file. A PME managing processor, offline from the PME hardware module, can load these different configurations onto the module to customize each PME for a specific application(s). In addition to the memory content of each PME, the PME generator can configure where the input and output of each PME is directed.

Figure 18:
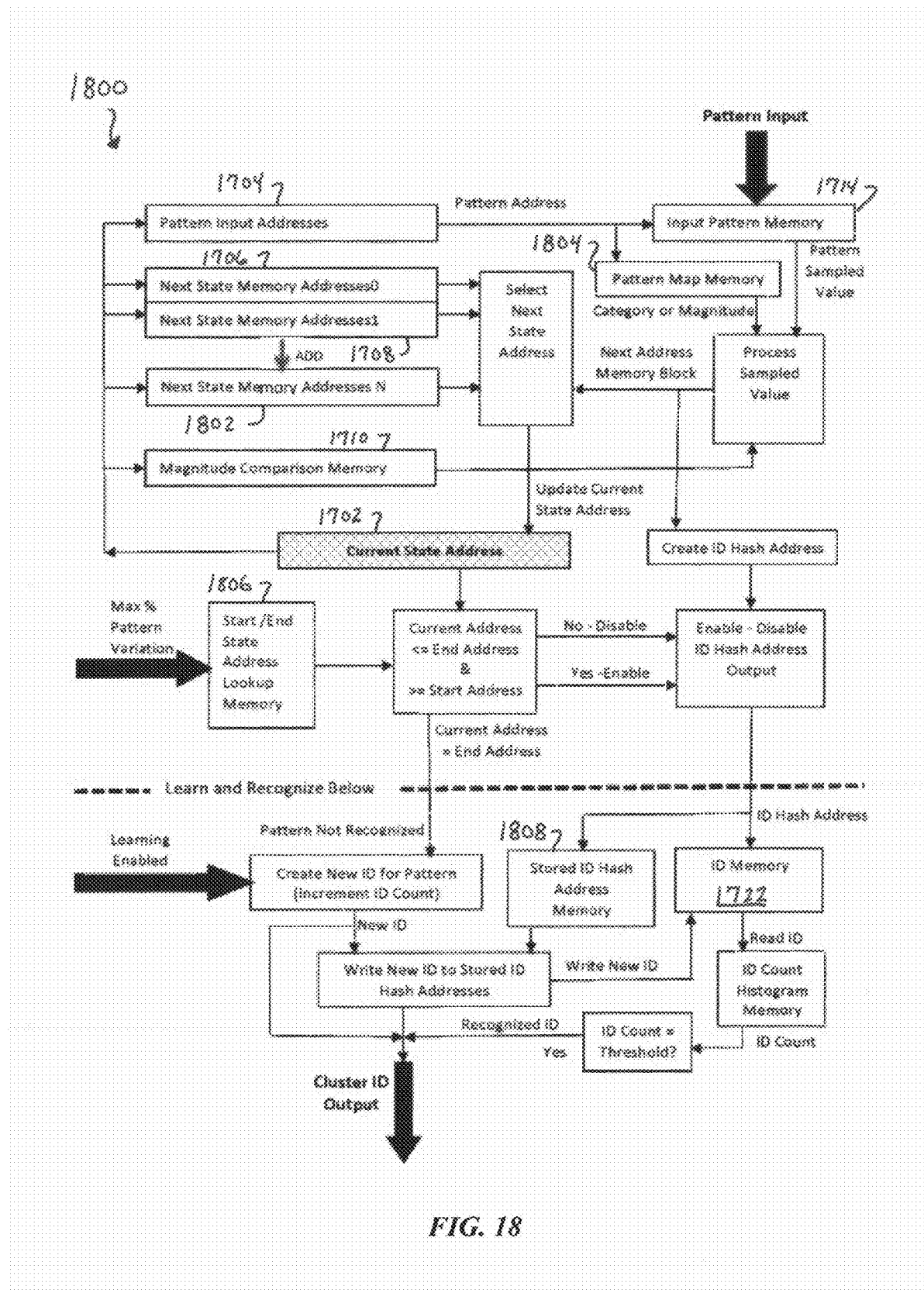
FIG. 18 is a block diagram of another hardware implementation of a PME, according to some embodiments of the present disclosure.

Another specific hardware implementation for a PME will now be described with respect to FIG. 18. The implementation of a PME 1800 in FIG. 18 still relies on the concept of cycles to represent patterns and the concept of hash addresses, generated by the cycle, to address the content of ID memory and generate a stream of ID outputs. However, there are shortcuts that can be implemented in hardware that increase the speed and simplify the process. In one embodiment, this involves eliminating the vertical sensor memory and the full amount of time for a cycle to repeat itself. FIG. 18 also shows two additional user inputs—Max % Pattern Variation and Learning Enabled, which have been described above. For PME 1800, the Current State Address 1702 memory block, Pattern Input Addresses 1704 memory block, Next State Memory Addresses0 1706 and Next State Memory Addresses1 1708 blocks, or additionally or alternatively any other number of next state or next-state increment memory blocks 1802, as appropriate for the implementation, any Magnitude Comparison Memory 1710 block, if desired, and Input Pattern Memory 1714 block may all be generally similar to, and may be used in generally the same manner as, those same components in PME 1700.

For PME 1800, consider that parameters that define a pattern may be of two types, referred to herein as magnitudes or categories. An example of a magnitude would be a digitized signal, such as the brightness intensity of a pixel (e.g., a gray level from 0 to 255). An example of a category would be the ASCII code of a character. The two types could be treated differently during processing due to their measures of similarity being different. For example, the intensity of magnitudes 200 and 201 could be very similar. On the other hand, using ASCII code as an example for categories, the ASCII code for "x" is 120 while the ASCII code for "y" is 121. These two characters, "x" and "y", are entirely different. The Pattern Memory Map 1804 block in PME 1800 may identify which parameters of the pattern input into Input Pattern Memory 1714 block are magnitudes and which are categories. The "map" input into the Pattern Memory Map 1804 block may be defined by the PME Generator and may depend on the desired application.

Because PME 1800 can distinguish more clearly between categories and magnitudes, where a magnitude of the value sampled from the Input Pattern Memory 1714 block is compared with the output of the Magnitude Comparison Memory 1710 block, PME 1800 operates generally similar to that described above for PME 1700. Where the value sampled from the Input Pattern Memory 1714 block is a category, however, there could be many more next state choices. In such a case, each different category could have a separate next state memory block, e.g., up to Next State Memory Adresses N 1802. For example, the ASCII code for "x" could select a Next State Memory Addresses120 block and the ASCII code "y" could select a Next State Memory Addresses121 block to determine the next address to be stored in Current State Address 1702 memory block.

Unlike PME 1700, the PME 1800 may create ID hash addresses to index ID Memory 1722 block directly from a sequence of next address memory block choices rather than from vertical sensors, thereby eliminating vertical sensors as described above. In the case of an all magnitude pattern, the sequence of next address memory block choices would be binary, and an ID hash address can be created, in one embodiment, by concatenating the sequence of bits. In the case where categories are included in the pattern, there are many ways to create an ID hash address from a sequence of next address memory blocks that includes numbers other than binary, and the method of how hashes are computed from such data is not the subject of this application. However, it is recognized that many methods for computing hashes may be used, and in PME 1800, the ID hash addresses indexing ID Memory 1722 block may be computed or otherwise based on the sequence of next address memory block choices.

In PME, the maximum % variation may be received as an input. In general, the value of the Max % Pattern Variation input sets the % variation of patterns identified as a cluster (in, for example, unsupervised learning) or the % variation (distortion) of a learned pattern that will still be identified with the same ID (in, for example, supervised learning).

The Start/End State Address Lookup Memory 1806 block may generally contain a lookup table for each choice of % variation (e.g., from 0% to 20%) that identifies the start and end state address as the ID hash addresses are created. Creation of ID hash addresses may be disabled if not in this range. This can eliminate the need to repeat a cycle several times, or in some cases, to even detect the cycle. Statistically, the probability of being in a cycle for an input pattern after a number of state address sequences can be predicted. For example, after 100 steps through the pattern (or 100 Current State Address 1702 memory block changes), there may be, as an example, a 99.9% probability that the sequence is already in a cycle. The second parameter in the lookup table of the Start/End State Address Lookup Memory 1806 block may identify the end state address for different levels of % variation. The concept implemented here is that an input pattern that is similar to an already learned pattern will still have segments of the cycle in common that generate the same ID as the learned pattern. For example, if the user's intent was to identify clusters of identical patterns in a dataset (i.e., % variation=0), the end state address would be low since 100% of the entire cycle would match the original pattern learned. In this regard, the IDs from the learned pattern would be continuous and the ID count would reach the ID count threshold in fewer steps of the sequence. If, however, the % variation of an input pattern was 10% different from a learned pattern, it would take more steps in the state address sequence of the Current State Address 1702 memory block in order to reach the ID count threshold. Basically, setting the end state address determines the maximum % variation of patterns in a cluster or the maximum distortion allowed in a pattern to be recognized. The lookup table of the Start/End State Address Lookup Memory 1806 block may be created by the PME generator at initialization and can remain fixed for each PME module 1800.

In addition to or in alternative to one or more functions described with respect to PME 1700, certain functions may additionally be implemented within the PME hardware of PME 1800. For example, an additional function implemented within the PME hardware may be a function that identifies when the address stored in the Current State Address 1702 memory block is within the range specified by the lookup table of the Start/End State Address Lookup Memory 1806 block. In one embodiment, ID hash addresses are only generated within this range. In one embodiment, as the Current State Address 1702 memory block steps through a sequence, the ID hash addresses may be stored in Stored ID Hash Address Memory 1808 block. According to another function that may be additionally implemented within the PME hardware of PME 1800, if a pattern ID is not recognized within the start/end points specified, the stored ID hash addresses in Stored ID Hash Address Memory 1808 block may be used to learn (i.e., store) a new ID into the ID Memory 1722 block for the unrecognized pattern input.

Parallel PME Implementations

Although described above as having potential for parallel operation of multiple PMEs, a specific implementation for parallel PMEs will now be described with respect to FIG. 19. Generally, in the implementation illustrated in FIG. 19, parallel PME 1900 includes a pattern memory managing processor 1902 and two or more parallel operating PMEs 1904. During setup, each of the parallel operating PMEs 1904 may be configured by the managing processor 1902 for the same or different types of applications. Specifications for each individual PME 1904 may be determined by files generated by an off-line (or online) PME generator 1906. During runtime, the parallel PME 1900 appears to act as a single PME, receiving an input pattern at pattern input stream 1908 and outputting a pattern ID or cluster ID at pattern or cluster ID output stream 1910. That is, for each pattern input, there is an ID output that identifies the pattern's cluster number or recognized identity. The managing processor 1902 may set each PME's 1904 parameters, direct input patterns to a particular PME 1904, and receive ID outputs from the PMEs 1904.

Figure 19:
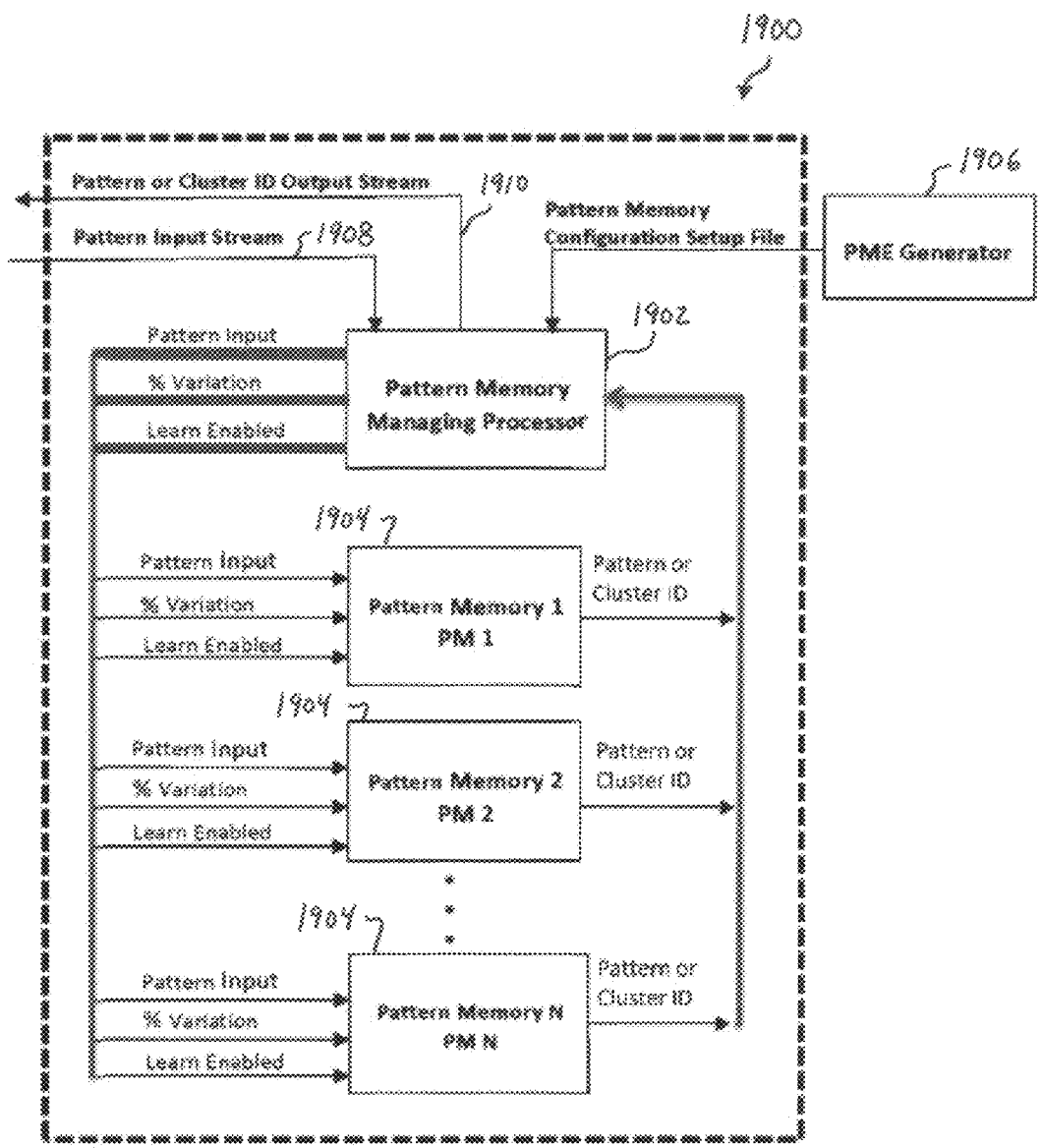
FIG. 19 is a block diagram of parallel operating PMEs, according to some embodiments of the present disclosure.

The parallel implementation illustrated in FIG. 19 permits scalability, in that additional parallel operating PME 1904 may be added to increase ID capacity, without degrading speed. Each PME 1904 may receive and process a pattern simultaneously with the other PMEs 1904. Each additional PME 1904 adds pattern ID capacity while maintaining recognition time. The "intelligence" of each PME 1904 can be exhibited by the random numbers initialized by the PME generator 1906 in its memory arrays. In one embodiment, each PME 1904 may be initialized by the PME generator 1906 with a different random seed, such that each PME 1904 follows different sequencing rules. As a result, the probability that any PME outputs a false accept is generally extremely small.

Other PME Configurations and Implementations

Although described above as having potential for a variety of parallel and/or sequential operation of multiple PMEs, further implementations or configurations and various uses of such configurations will now be described.

Spatial Integration (e.g., Sensor Fusion)

Figure 20:
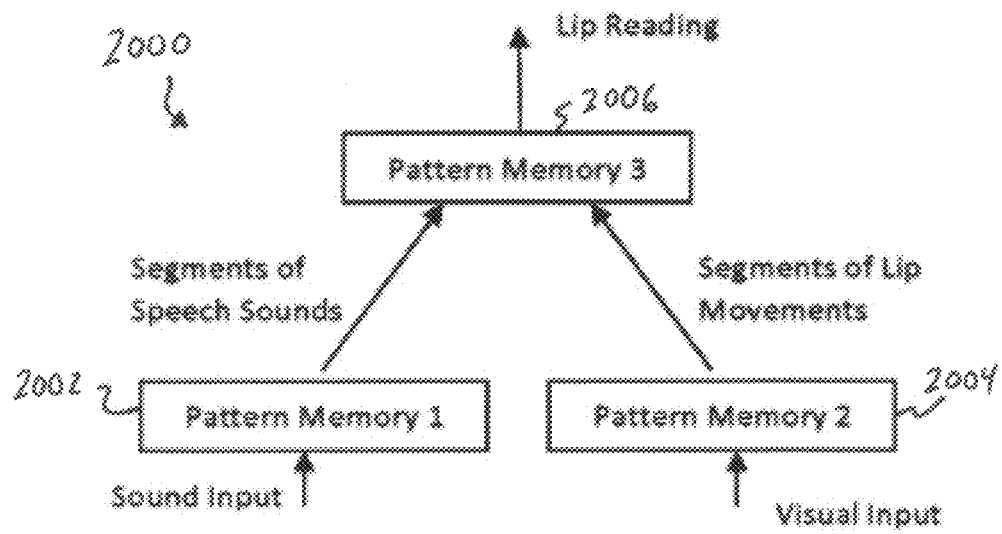
FIG. 20 is a block diagram of an implementation of parallel and sequential operation of PMEs for spatial integration of patterns, according to some embodiments of the present disclosure.

FIG. 20 illustrates an implementation 2000 of parallel and sequential operation of PMEs 2002, 2004, 2006 for spatial integration of patterns, or the combining of patterns from different inputs or locations into one pattern, potentially for further analysis or pattern recognition. One non-limiting example is combining sound patterns with visual patterns. For example, PME 2002 in FIG. 20 takes a sound pattern as input and uses the PME to learn and recognize segments of speech sounds while PME 2004 takes a visual pattern as input and uses the PME to learn and recognize segments of, for example, lip movements. PME 2006 may take the outputs of each of PME 2002 and 2004 to recognize corresponding speech sounds and lip movements. Another non-limiting example is combining patterns of sub-images from different "window" positions in a larger image. Still another non-limiting example is what is referred to herein as sensor fusion, or combining pattern input from different sensor types (e.g., vibration, temperature, orientation, pressure, etc.) into one pattern for further analysis or pattern recognition. Many other uses of PMEs for spatial integration are recognized. In general, the PMEs provide a common language (i.e., cycles) to communicate and integrate patterns. Basically, each different PME 2002, 2004 may provide an input pattern to a separate higher-level PME 2006. The higher-level PME 2006 identifies a new cycle representing the combined patterns.

Temporal Integration (e.g., Recognizing/Clustering Pattern Sequences in Time)

Figure 21:
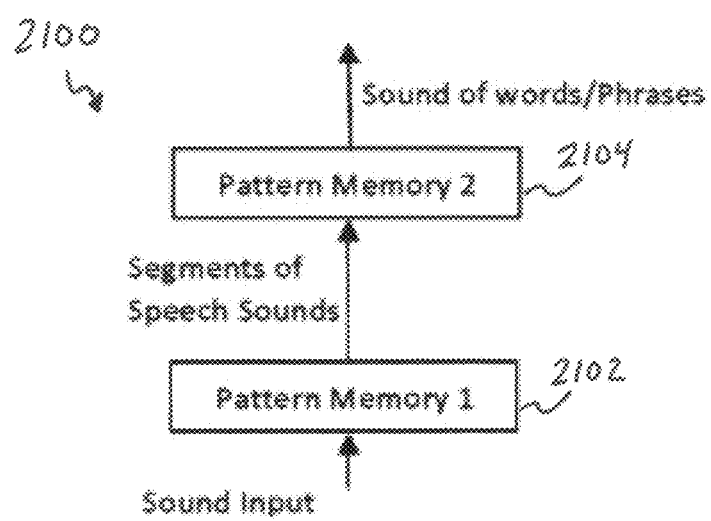
FIG. 21 is a block diagram of an implementation of sequential operation of PMEs for temporal integration of patterns, according to some embodiments of the present disclosure.

FIG. 21 illustrates an implementation 2100 of sequential operation of PMEs 2102, 2104 for temporal integration of patterns, or the combining of patterns at different instances in time into one pattern. One non-limiting example is recognizing sequences of patterns, such as but not limited to speech sounds, to form patterns of word sounds. For example, in FIG. 21, a sound pattern may be segmented into events by the generation of cycles by PME 2102. These events may be accumulated as the input to PME 2104, where the resulting learned or identified cycle represents the particular sequence of sounds, such as a sequence of sounds making up a word or phrase. Many other uses of PMEs for temporal integration are recognized, and are not limited to just recognizing patterns of sound.

Spatial/Temporal Integration:

In some embodiments, PMEs may be used in parallel and/or sequential operation for a combination of both spatial and temporal integration. For example, in sensor fusion, each of a plurality of parallel operating PMEs may provide an output corresponding to a different sensor that represents a sequence of patterns in time (i.e., temporal integration). The outputs of the plurality of parallel operating PMEs could be combined (i.e., spatial integration) as inputs to a higher-level PME for a spatial integration of data from the various different sensors over time.

Feedback of Pattern Memory Outputs (e.g., Process Learning and Monitoring)

Figure 22:
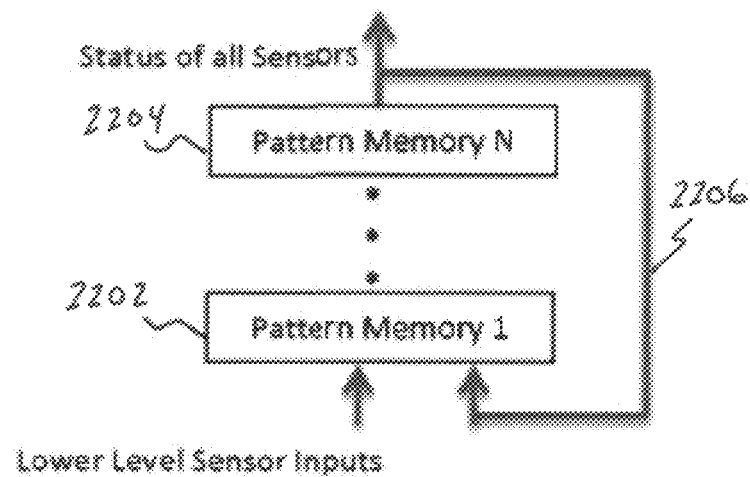
FIG. 22 is a block diagram of an implementation of PMEs with feedback, according to some embodiments of the present disclosure.

In the examples above, PME outputs at lower levels provide inputs to higher-level PME(s). However, as illustrated in FIG. 22, outputs from higher-level PMEs can also be fed back to lower-level PME(s). That is, after successive sequential operation of two or more PMEs 2202, 2204, the output of a higher-level PME 2204 can be fed back 2206 as input to a lower-level PME 2202 or multiple independent or parallel operating lower-level PMEs. This feedback 2206 can provide context for recognition or clustering at lower levels. For example, in a sensor driven process, the state of all sensors together may be described by a high-level PME; providing this feedback to lower-level PME inputs can create context to recognize the next overall state of the sensors. In process monitoring, such a configuration can learn or recognize expected sequences of events. If lower-level sensor inputs together with the higher-level feedback 2206 are not recognized, then the sequence has been disrupted from the learned sequence.

Generating a Learned Sequence of Actions (e.g., Process and Robotic Control)

Figure 23:
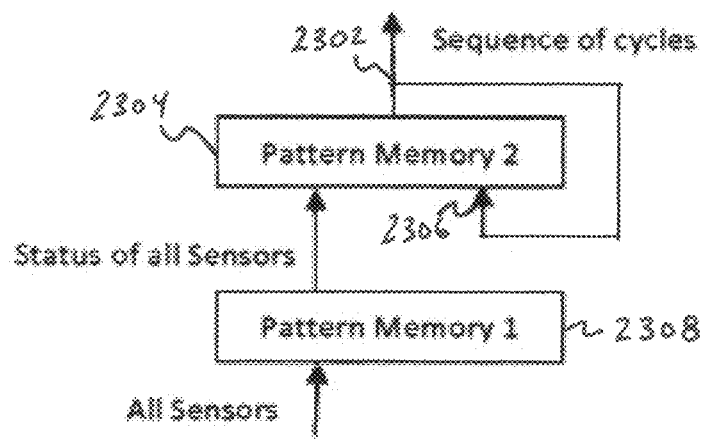
FIG. 23 is a block diagram of PME feedback used as an automatically generated sequence of cycles for learning a sequence of events or actions, according to some embodiments of the present disclosure.

Piggy-backing from the previous example, PME feedback may also be used as an automatically generated sequence of cycles for learning a sequence of events or actions. As illustrated in FIG. 23, in one embodiment, this may occur where the output 2302 of a PME 2304 is fed back to its own input 2306. In this example configuration, the PME 2304 can create a learned sequence of events or actions. With particular reference to the example configuration in FIG. 23, a lower-level PME 2308 may receive an input from, for example, a group of sensors as a combined pattern (see e.g., FIG. 20). Of course, the pattern input to PME 2308 could be any suitable pattern. PME 2308 may generate a cycle output reflecting, for example, the status of the sensors that serves as the input to a higher-level PME 2304. PME 2304 may generate a cycle output 2302, which can be fed back to its input 2306. Feeding this output 2302 back to the input 2306 of the same PME 2304 may change its input and generate a new cycle. The new cycle may also be fed back and may modify the input again to create another cycle, and so on. The process initiates a sequence of cycles and the PME 2304 can learn a specific sequence of actions that is uniquely derived from the current status of all the sensors.

An analogous example may be considered. By way of proprioceptive sensors, our brain monitors the current status of every muscle and other tactile sensors that, at some higher-level cycle, identifies the entire state of the system. If we were sitting in a chair, for example, and decided to go out a patio door, we would generate a sequence of learned events from that state that seem totally automatic. Every new state in our movement is recognized in the learned sequence. However, if we walked into an unexpected, closed screen door, the sequence would immediately be unrecognized. We would need to "recollect our senses" to recognize a new state of the system that would create a new sequence of learned cycles that would define a sequence of actions to automatically recover.

PME for Data Security

Figure 24:
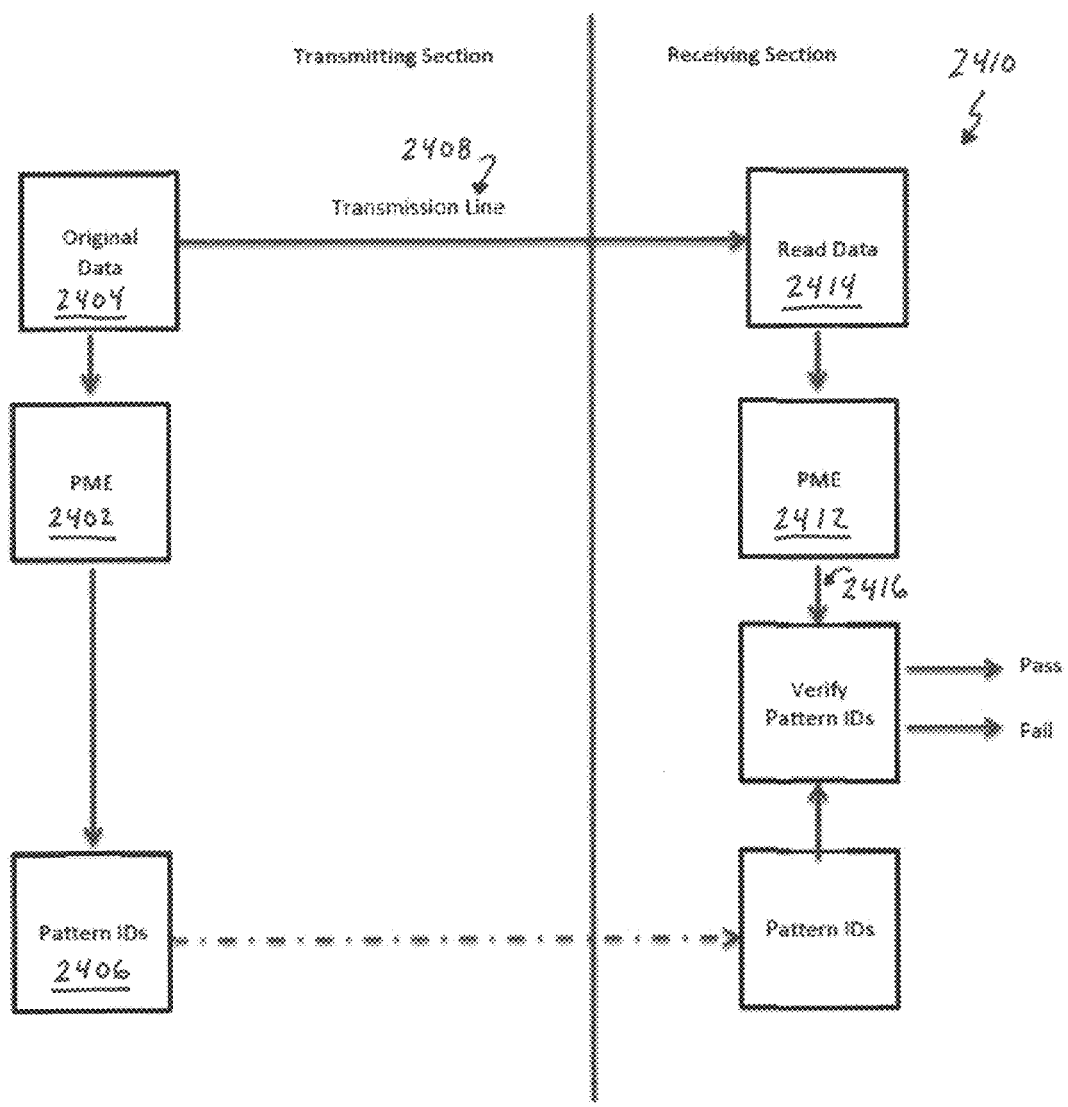
FIG. 24 illustrates a configuration of PMEs for data security applications, according to some embodiments of the present disclosure.

FIG. 24 illustrates a configuration of PMEs that may provide security to, for example but not limited to, data validation, data compression, and data encryption. With specific reference to an example of data validation, as illustrated in FIG. 24, a transmitting-side PME 2402 may receive original data 2404. PME 2402 may receive all or just a portion of the original data 2404. PME 2402 may generate a pattern ID 2406 for the sampled section of original data 2404. Either before this, after this, or simultaneously therewith, original data 2404 may be transmitted 2408, over some transmission line or wirelessly, to a data receiving side 2410. A receiving-side PME 2412 may receive or sample the received data 2414. PME 2412 may likewise sample all or just a portion of the received data 2414 and may generate a pattern ID 2416 for the sampled section of received data 2414. Either before this, after this, or simultaneously therewith, the pattern ID 2406 may be transmitted 2418, over some transmission line or wirelessly, to the data receiving side 2410. The pattern ID 2416 generated at the receiving side 2410 may be compared and verified against the pattern ID 2406 received from the transmitting side. If the pattern ID matches, the data is verified.

In this manner, PMEs can be used to validate data by assigning a set of data points an ID, or pattern ID. That ID is unique to that data section sampled by the PMEs. A transmitting-side can send that ID to the receiving side in several different ways, including but not limited to: sending the ID along with a data packet or in a data stream; sending the ID on a separate data communications path; or embedding the ID within a data packet, in some cases pre-encryption of the data packet.

PME for Pattern Finding and Triggering

Figure 25:
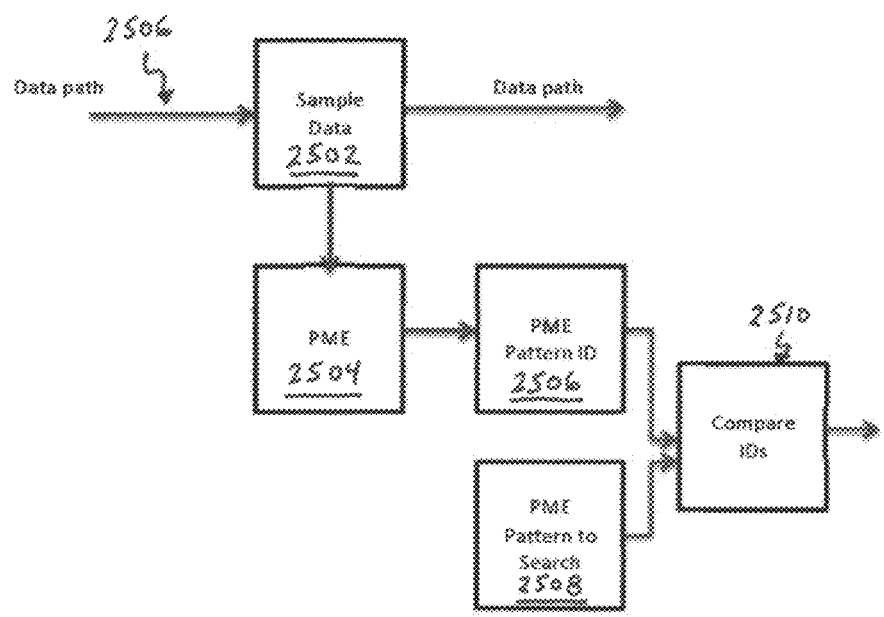
FIG. 25 illustrates a configuration for a PME to sample streaming data to find or recognize patterns, according to some embodiments of the present disclosure.

FIG. 25 illustrates an implementation for a PME that can sample streaming data and find or recognize patterns with minimal, or even substantially without, delay of the data transmission. More specifically, as illustrated in FIG. 25, data 2502 may be sampled by a PME 2504 as it streams along a data path 2506. The PME 2504 may generate pattern IDs 2506 for each section of sampled streaming data 2502. In one embodiment, the PME 2504 may store each ID in memory for comparison or lookup against future generated pattern IDs. In other embodiments, such as in supervised learning, where a pattern to search for and recognize 2508 is known, PME 2504 may simply stream the generated pattern IDs 2506 for comparison 2510 against the pattern to search for recognize 2508.

Another Parallel and Serial PME Implementation: 3D PME

Figure 26:
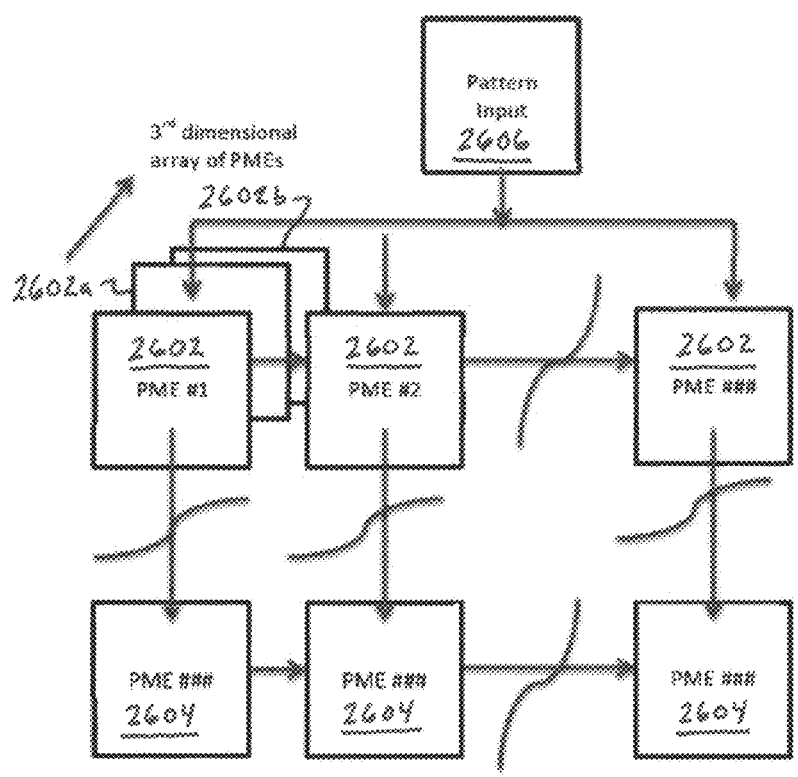
FIG. 26 illustrates a three-dimensional configuration of PMEs, according to some embodiments of the present disclosure.

While various parallel and/or serial PME implementations have been described above, FIG. 26 illustrates yet another configuration of PMEs, implementing what is referred to herein as a three-dimensional implementation of PMEs. As illustrated in FIG. 26, a parallel implementation of PMEs 2602 may provide a lower-level parallel PME, as generally described above. Likewise, one or more increasingly higher-level parallel implementations of PMEs 2604 may be provided, each level serially-connected with the previous level. However, as illustrated in FIG. 26, any given PME 2602, 2604 may actually be an array of parallel or serial PMEs 2602a, 2602b.

An input pattern 2606 may be presented to one or more of, or all of, PMEs or PME arrays 2602. In turn, those PMEs or PME arrays 2602 may pass its output to the next level of PMEs or PME arrays 2604, and so on as desired.

Teaching and Duplication of PMEs

Figure 27:
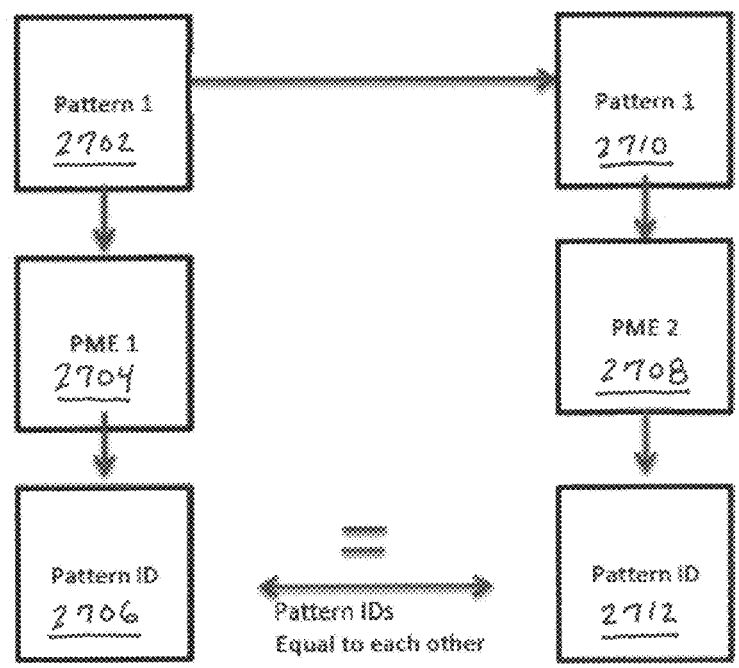
FIG. 27 illustrates a configuration of PMEs for teaching and duplication of patterns, according to some embodiments of the present disclosure.

In some embodiments, patterns can be learned and then transferred from one PME to another with substantial, or even identical, duplication of results and performance. An example implementation is illustrated in FIG. 27. As illustrated therein, an original pattern 2702 may be provided to a first PME 2704, and that PME may generate a pattern ID 2706. A copy 2708 of the first PME 2704 may be provided. The copied PME 2708, if given an exact copy 2710 of the original pattern 2702 should produce a duplicate pattern ID 2712. In a sense, the machine/entity housing the first PME 2704 has "taught" the machine/entity housing the copied PME 2708 how to duplicate the pattern ID. Such teaching across PMEs permits artificial intelligence for training robotics and vision systems, as well as machine learning technologies.

PME for Closed Loop Control

Figure 28:
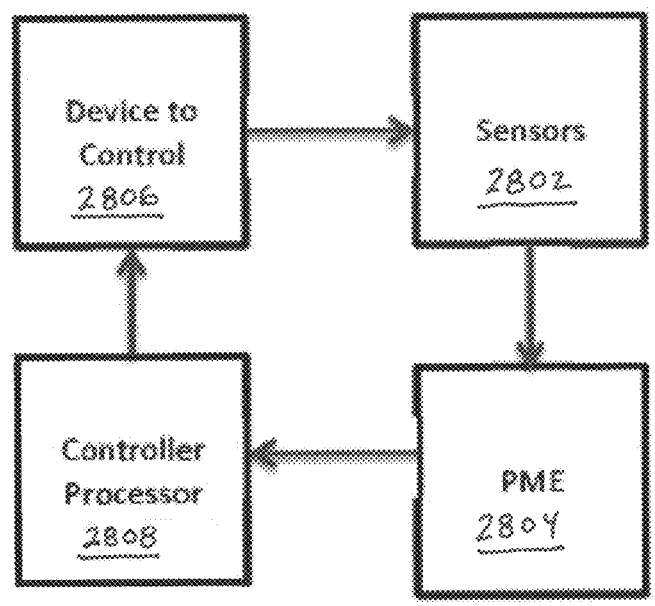
FIG. 28 illustrates a configuration for a PME in closed-loop processing, according to some embodiments of the present disclosure.

As illustrated in FIG. 28, a PME can create pattern IDs that may be used to control a device or circuit in, for example, a closed loop. More specifically, in a simple and non-limiting example embodiment, one or more sensors or other pattern generating devices 2802 may provide a pattern input to one or more PMEs 2804 operating individually, serially, and/or in parallel, as described above. The pattern input may be information about the state of a device 2806, the state of a higher-level system, or any other suitable information for process control of the device 2806. The output from the one or more PMEs 2804 may be fed to a control processor 2808, which may use the information from the one or more PMEs to control or modify operation of the device 2806, if necessary or desired. And, the loop repeats.

Various Industries and Uses for the Above-Described PME Implementations and Configurations There are many applications for PME, including handprinted character recognition, video compression, stock price prediction based on short-term patterns, and machine vision for high-speed inspection of manufactured products, to name just a few quick examples. Indeed, there are probably as many applications for PME as there are for hashing. However, the fuzzy recognition (or fuzzy hashing) offers solutions to additional classes of applications. These applications may relate more to human type pattern recognition for which computers continue to have difficulty (e.g. visual recognition, visual object tracking, continuous speech recognition etc.). The following section identifies just some of the possible applications for the above-described PME implementations and configurations.

Signal Processing Using Vector Quantization

Vector quantization is widely used for signal processing and compression. The most difficult part of its implementation is creating the codebook and searching the codebook for a match. Because of fuzzy recognition, the PME can automatically create the codebook and match entries in the codebook without searching.

Video Images

In some embodiments, the various embodiments of the present disclosure provide an apparatus and/or method for handling tasks involving visual images using video cameras include object tracking, object recognition, compression, smart surveillance, stereovision for depth perception, etc. Most of these tasks relate to matching segments of an image either from frame to frame for motion or camera to camera for stereovision. In some embodiments, the present invention provides a low-level PME processing of the individual video frames and/or audio segments, and then performs one or more recursive higher-level PME processing of sequences of the now-processed individual frames. In some embodiments, each subportion (e.g., each 8-by-8 pixel block from a much larger image) can be recognized in each of two or more images, and the optical flow of each recognized subportion is recognized or identified by higher-level processing. In other embodiments, each of two or more stereo images are processed at a lower level, and then higher-level PME processing of the subportions are processed to obtain depth and/or other information from the stereo images.

Content-Addressable Image Databases

The various embodiments of the present disclosure provide an apparatus and/or method of creating and accessing image databases where image content is the search category rather than text, labels, or indices. In some embodiments, the PME can be used for image searches on the Internet where an image is the search element rather than text. In some embodiments, the pattern identifier obtained by PME processing of a newly entered input image is used to point to one or more previously entered images (either during a training mode or during PME processing of earlier-entered input images) that, based on fuzzy voting and/or other techniques, have been determined to be similar to the newly entered input image.

Software Development Kit (SDK)

The various embodiments of PME of the present disclosure could be provided as part of a SDK for developers of machine learning applications. The SDK could enable developers to create new products and enhance existing products for their specific applications at a relatively lower introductory cost, to embed the SDK within existing software development environments to enhance their product and expand their customer base, and to embed the SDK with database products to offer enhanced high speed searching, recognition, and clustering of similar patterns.

Embedded in Conventional Memory to Create a New Type of Memory—PME Memory—or Embedded in Hardware or Software with Conventional Computer Processors Some embodiments of PME of the present disclosure could be provided as memory embedded within conventional hardware or computers, or other application specific embedded memory devices. Such embodiments allow memory manufacturers to offer an enhanced product for machine learning developers.

Recognition Applications

The various embodiments of PME of the present disclosure could be used for, to name just a few example recognition applications, facial recognition (e.g., on Internet servers or embedded in local/remote mobile devices), iris recognition (e.g., on Internet servers or embedded in local/remote mobile devices), and finger print recognition (e.g., on Internet servers or embedded in local/remote mobile devices).

Data Mining Large Databases

The various embodiments of PME of the present disclosure could be used for, to name just a few example data mining applications, clustering of similar patterns (e.g., in substantially any type of database records), financial forecasting (e.g., clustering stock price movements to discover profitable patterns), customer preferences (e.g., to target customer needs), and point-of-sale data (e.g., to identify product clusters and associated product purchases). In another embodiment, PMEs of the present disclosure could be used to provide a database option in consumer-accessible databases (e.g. Excel, Oracle, Microsoft, Google) for clustering or recognition.

Signal Processing and Multiple Sensor Fusion

The various embodiments of PME of the present disclosure could be used for a variety of processing and sensor fusion applications, where PME may use address cycles as a common representation for patterns from generally any number of source types. These cycles from different sensor sources can be superimposed to create new patterns. For example, digitized signals from different sensors, such as but not limited to, biometric sensors, audio sensors, seismic sensors, electromagnetic sensors, physiological sensors, biomedical sensors, tactile sensors, etc., may be combined to create new patterns for higher-level identification and/or recognition. With further reference to multiple sensor fusion in the medical field, PMEs may be used to combine digitized signals from different biomedical sensors (e.g., breathing sensors, heart rate monitors, thermometers, EEG sensors, etc.) for, for example, diagnostics and research. PMEs may also be used to identify normal clusters of sensor activity in order to identify outliers of abnormal activity.

Surveillance Applications

The various embodiments of PME of the present disclosure could be used for monitoring camera activity, for example, by adapting to normal clusters in order to find outliers (e.g., unusual events of interest). The various embodiments of PME of the present disclosure could also be used to, naming just a few activities, track multiple objects in real time, recognize objects or identify objects of interest, and recognize movements or gestures. The above tasks could be enhanced further with the use of stereo cameras, to add depth perception. Other sensors, detecting such things as sounds or vibrations, may simultaneously be learned and recognized using PME.

Guidance Applications

The various embodiments of PME of the present disclosure could be used for, to name just a few example guidance applications, vehicle guidance to maneuver around objects and avoid collisions, tracking of multiple objects in real time (e.g., visual identification of directional movement from passing objects), visual robot or drone guidance, and real time sensor driven coordinated movement (e.g., learned sequences of motion given the current feedback from multiple sensors such as tactile, joint position, pressure, speed, etc.). Again, the above tasks could be enhanced further with the use of stereo cameras, to add depth perception.

The Internet

The various embodiments of PME of the present disclosure could be used for many applications on the Internet, such as but not limited to, content-based image retrieval (i.e., searching for similar images, music, or video based on image content rather than by key words), searching for trademarks/logos (e.g., to identify unauthorized use), identifying similar web pages, identifying malware similar to known malware, and detecting potential new viruses.

Industrial Process Control

The various embodiments of PME of the present disclosure could be used for process control, including but not limited to, sensor fusion applications. The various embodiments of PME of the present disclosure could be used in process control for identifying outliers or controlling sequential processes based on real time sensor feedback, to name just a couple examples.

Signal Compression (e.g., For Efficient Storage and Transmission)

The various embodiments of PME of the present disclosure could be used to, for example, expand conventional methods for signal processing (e.g., vector quantization) by creating the code book for compression of digitized signals in real time and/or adapting to new signals by updating the code book in real time.

Recognize or Cluster Pattern Sequences in Time

The various embodiments of PME of the present disclosure could be used to, for example but not limited to, recognize continuous speech embedded on a local device (as opposed to servers in the cloud), recognize sequences of visual sub-images for translational and size invariance recognition, recognize sound sequences, and recognize video frame sequences (e.g., video content similarity).

Locally Embedded Devices (Possibly without Internet/Cloud Access for Processing)

The various embodiments of PME of the present disclosure could be used for many applications where highly computational processes might otherwise be unavailable or be performed via the Internet (e.g., by access to a cloud processor). Such applications may include, but are not limited to, recognizing continuous speech on a remote or local device, recognizing finger prints on a remote or local device, and recognizing irises on a remote or local device.

Real Time Gesture Recognition

The various embodiments of PME of the present disclosure could be used for, to name just a few example gesture recognition applications, recognizing movements for game control, recognizing movements for other computer control, and recognizing sign language.

Find Duplicates or Similar "Duplicates"

The various embodiments of PME of the present disclosure could be used to, for example only, search for "duplicate" or similar videos, music, photos, or text documents.

Image Stitching

The various embodiments of PME of the present disclosure could be used for combining images from video or still cameras to create a larger panoramic or 360° view, locally (i.e., not over the Internet or on a "cloud") and in real time. Such applications include, but are not limited to, creating panoramic real time video and real time video stitching for virtual reality display environments.

Image Stabilization

The various embodiments of PME of the present disclosure could be used for image stabilization in still cameras and video cameras.

3D Imaging

The various embodiments of PME of the present disclosure could be used for processing multiple (e.g., stereo) cameras for depth perception and in real time 3D applications, such as could be used for vehicle/robotic guidance.

Recognize Spectrograms and Histograms

The various embodiments of PME of the present disclosure could be used to, naming just a few examples, recognize or cluster color histograms for similar image recognition and clustering, to recognize word histograms for similar document content recognition, and to recognize frequency histograms for sound recognition.

Combine Visual Sensors with Orientation Sensors (e.g., Gyroscope)

The various embodiments of PME of the present disclosure could be used to provide rotationally invariant visual recognition.

Scanned Images

The various embodiments of PME of the present disclosure could be used on existing scanned images for, for example but not limited to, form processing, character recognition (e.g., postal code reading), and processing of, for example, medical images or satellite images.

Embedded PME for Run Time Solution in Applications

The various embodiments of PME of the present disclosure could be embedded in, for example, a microchip, for real time or run time processing in a variety of applications, including any of the applications described herein.

Visual Target Identification and Tracking

The various embodiments of PME of the present disclosure could be used to, but is not limited to, isolate targets from a scene, guide gun sights, or create "smart" munitions.

Features and Advantages of PME Pattern Recognition

The various embodiments for PME described herein include a number of features and advantages over conventional computerized pattern recognition. For example, PME is based on the principle that a fixed random assignment of a next state to each of a finite number of states will always converge to a cycle as it sequences from state to state. The states in a cycle will occur in a specific sequence and be a small subset of the total number of states dispersed randomly among the total number of states. Thus, where an input pattern dictates the random assignment of next states, then the resulting cycle will be become a representation of that pattern. The generation of a cycle is a discrete event that supports the representation of pattern sequences.

Additionally, with PME, pattern encoding can be continuous and automatic. The same cycle continues so long as the pattern is relatively stable and automatically converges to another unique cycle for the next different stable pattern. Furthermore, PME can provide automatic temporal segmentation and time invariance to sequences of real time patterns. Still further, PME can be configured such that short cycles will not occur using a refractory period. Further yet, PME can be used to find similar patterns. Similar patterns generate similar (overlapping) cycles, providing a representation with inherent properties of pattern similarity that accommodates noise and other distortions.

Generally, the various embodiments of PME provide an important function of recognizing one of many learned patterns at high speed. One of the unique features of PME is that it provides this function to types of applications for which other methods are impractical because they are too slow or too complex computationally, such as applications with the following properties: the number of learned patterns is very large or unlimited; patterns to be recognized may be somewhat distorted relative to the learned pattern; or patterns are complex (high dimensional) having many descriptive parameters. PME can provide a consistent high speed recognition on complex patterns independent of the number of patterns learned. The high speed of PME is a direct result of its unique and simple, relatively non-computational implementation. Its unique representation of patterns using cycles generally eliminates the need to compare any one pattern with another. The PME process allows the pattern itself to encode its own identity. To recognize or cluster a given pattern, other clustering algorithms typically must compute a pattern's similarity to all other patterns in a pattern database. As a result, PME is typically many orders of magnitude faster than other clustering algorithms.

Many of the advantages of PME are derived from its speed and simplicity. For example, the PME process requires little computation, and generally no complex computation; it is generally a memory-driven process. PME does not require searching, i.e., comparing one pattern to another to identify a match for recognition. As a result, it does not require access to a database of trained/learned patterns. The unique simplicity of PME's operation supports various hardware implementations, as described above. The simplicity of PME also enables massively parallel operation in software or hardware and allows it to be easily embedded in a variety of applications. Also for example, PME cycles can be a common language for representing patterns. They can be superimposed for spatial integration of patterns from widely different sensors or for temporal integration of time varying patterns, as described above. In still other embodiments, PME can be used, for example, for independent consensus recognition, by changing the random generator seed in the PME generator during initialization, which creates an entirely new independent PME for verification of the pattern(s).

Another advantage of PME is its ease of use or relatively simple interface with a user. There are many different alternative clustering and recognition algorithms. Some of these include: K-Means Clustering, Support Vector Machines, Locality Sensitive Hashing, and Hierarchical Clustering. These typically are described in academic journals, and nearly all are mathematically based and require sophisticated mathematical skills to understand and implement them. Likewise, there tends to be no one obvious choice for an application. To the contrary, PME requires almost no mathematical skills of its users.

Another advantage of PME is that PME can learn to recognize or cluster patterns with about one pass through the data set in run time mode. This enables the processing of streaming data. Other clustering or recognition algorithms typically separate the learning mode from the runtime mode. In learning mode, the other algorithms typically require many passes of the dataset to optimize the recognition or clustering performance. The learned patterns are then used in a separate run time process.

Neural Clues Implemented by the Pattern Memory Engine (PME)

The various embodiments of PME described herein are computerized attempts to imitate the pattern recognition and processing in the human brain. A number of neural clues are described below, along with each's implementation in an embodiment of PME. The neural clues, themselves, as discussed herein, involve a bit of theoretical speculation; the implementation of each these clues in a PME, as described herein below, does not.

For purposes of discussion in this section, the following terms are used to describe the neural clues and analogous PME hardware implementation:

| Brain | PME |
| --- | --- |
| Neural Oscillations | ↔ Address Cycles |
| Input Pattern as projected on a neural layer | ↔ Input Pattern Memory |
| Columnar Structures | ↔ Vertical Sensors |
| Engram or Memory Trace | ↔ Address Sequence |
| Neural Layer of Interconnections | ↔ Next Address Map Memory |
| Columnar Structures Output Pattern | ↔ Vertical Sensor Output Pattern |
| Hebbian Rule | ↔ Reinforcement Learning |

Neural Clue #1: Our Brain does not Compute

There are no numbers being processed in our brain—no mathematical formulas being executed, and nothing that resembles computer architecture. It uses a different process that learns to recognize and cluster patterns.

PME Hardware Implementation of Clue #1:

The core runtime process of a PME can operate without complex computation. It is generally a memory driven process that can be implemented using a computer's conventional addressable memory. More powerful implementations of PME, as described above, may involve direct hardware implementations. The core process of learning and recognition in the PME is based on randomness and simple laws of probability. Some of the most complex circuits in hardware implementations of PME (see FIGS. 17 and 18) are an incremental counter and an integer comparator.

Neural Clue #2: Presenting the Pattern

Patterns in the brain are presented as a spatially distributed stimulus with varied intensity (e.g., sound as a frequency spectrum in the cochlea, vision as an image, tactile as an image). Higher levels of intensity in these patterns (e.g., intensity of light) are also spatially distributed. Neurons with different firing thresholds will create a different spatial distribution of activity for higher intensities. For the brain, the information content of an input pattern is presented by the spatial position of neural activity within a localized network of neurons.

PME Hardware Implementation of Clue #2:

Oftentimes, nowadays, raw patterns originate from some computing device. As a result, these raw patterns are defined by a list of numbers (e.g., digitized signals, video, facial measurements for face recognition, banking data, and histograms). These lists of numbers can also be presented as an image—like a histogram. The height of each bar may reflect the magnitude (intensity) of each number in the pattern, and the number of bars in the histogram reflect the pattern's length. For example, a pattern defined by 100 variables having a maximum parameter magnitude of 10 defines a 10×100 image. This example pattern can be stored in an array of size 1,000. Each point of the histogram image is addressable and can be sampled by the PME. Conceptually, all patterns are presented to the PME as a spatially distributed image—analogous to the neural presentation. Hardware implementations of PME (see FIGS. 17 and 18) index the Input Pattern Memory where the pattern is stored and sampled while processing. The described presentation of a pattern in the PME as an image contrasts with most conventional machine learning algorithms that present the pattern mathematically as a high dimensional vector in hyperspace.

Neural Clue #3: Projecting the Pattern onto a Layer of Neurons

A raw pattern in the brain, presented as an image, is projected into a planar network of interconnected neurons, e.g., the optic nerve projected on the cortical layer.

Figure 17:
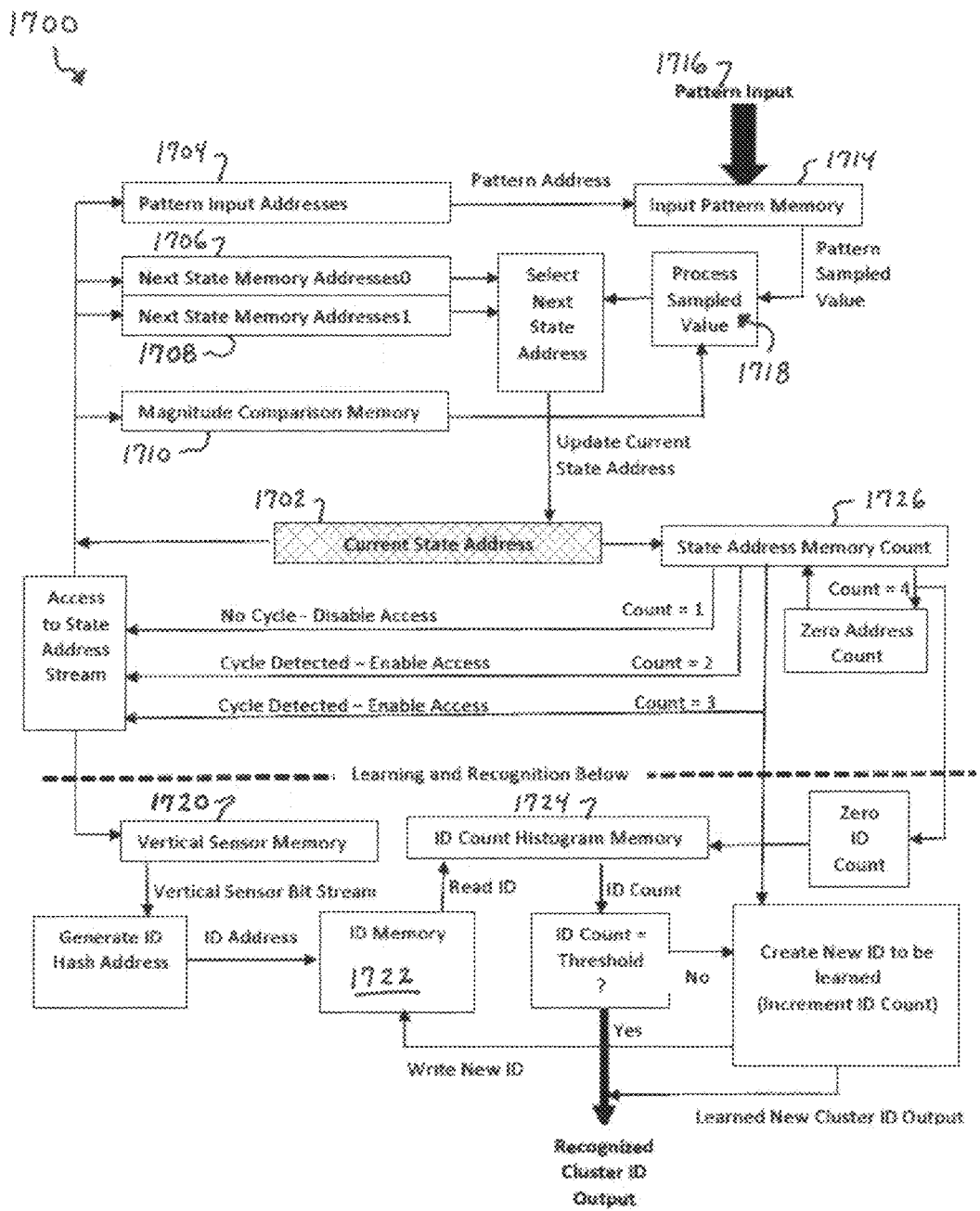
FIG. 17 is a block diagram of a hardware implementation of a PME, according to some embodiments of the present disclosure.

PME Hardware Implementation of Clue #3:

The raw pattern in an embodiment of a PME may be stored in an array of conventional memory (see FIGS. 12 and 13 (i.e., "Binary Input Pattern") or FIGS. 17 and 18 (Input Pattern Memory)). With regard to FIGS. 12 and 13, for purposes of explanation, the pattern is "projected" onto the Input Pattern Sample array by assigning each memory location in the Input Pattern Sample array an address to sample in the Binary Input Pattern. The pattern sampling addresses in the Input Pattern Sample array may be a random distribution or a structured distribution.

Neural Clue #4: Neurons within a Cortical Layer are Connected to Nearby Neurons.

In the brain, a planar network of neurons are randomly interconnected to multiple nearby neurons in the same layer. The localized types of pattern features projected onto localized regions of neurons in the layer directs the excitatory activity to one of the nearby neurons. That is, the pattern directs the "charge."

PME Hardware Implementation of Clue #4:

Analogous to neuron interconnections, PME interconnections may be defined, for example, by the next state or next-state increment arrays (see FIGS. 12 and 13). There is a memory for each localized pattern feature type. In the examples in FIGS. 12 and 13, there are only two such memories, since the sampled feature from the pattern is either a binary "1" or "0". There could be many more such memories, if there were many more types of features sampled. In this case, these two memories identify the next nearby addresses to jump to depending on the sampled value. Basically, the pattern's sampled features direct the PME process.

Neural Clue #5: Neural Excitatory Activity is Directed by the Pattern

The state of activity of a network layer in the brain can be defined at any instant in time by identifying the position of the actively firing neurons within the layer. The next state of activity is determined from the current state and the localized pattern feature imposed on the layer. This process becomes a sequential flow of excitatory activity dependent on the projected pattern.

PME Hardware Implementation of Clue #5:

Referring to FIG. 12 for illustration again, the current address is identified as the Current State. Given any current state, the next state will be the state identified by or determined from information contained in the appropriate next state or next-state increment array, depending, in this case, if the sampled value at the current state is a "1" or "0". The maximum increment in these two memories relates to the nearness of the neighbor (i.e., the next address to the Current State). If the maximum increment was 32, for example, in one embodiment, each memory location in the next state or next-state increment arrays would be filled with numbers from 1 to 32 by the PME Generator. In other implementations, the memory locations are filled with the actual next state address, which eliminates the process of adding the increment during processing. Increasing or decreasing the maximum increment can have a significant effect on the overall PME processing properties.

Neural Clue #6: Representing Patterns by Neural Oscillations

Based simply on the laws of probability, the sequential flow of excitatory activity in a layer will ultimately converge on itself and oscillate along the same trace so long as the pattern remains relatively consistent. This neural oscillation represents the pattern. It identifies itself by the increased firing rate of those neurons participating in the oscillation relative to others in the layer. Neural oscillations, as the representation for patterns, is an essential component of the process. They become the common language of the brain for widely different types of sensory patterns (e.g., vision, speech, tactile, etc.).

PME Hardware Implementation of Clue #6:

An analogous process occurs in PME embodiments, only patterns may be represented by memory addresses that converge to a cycle, rather than neuron oscillations. For example, in FIGS. 12 and 13, the next state or next-state increment arrays may each be, for example, 10,000 addresses long. The Current State will sequence from one address to the next and roll over to the beginning when it exceeds 10,000. Based simply on the laws of probability, the sequential process will converge to a repeating cycle of addresses so long as the pattern stays relatively stable.

Neural Clue #7: The Neuron Refractory Period

As noted above, a network can converge to different cycles depending upon the starting state of the network. This would be a problem if the cycle is used as a representation for patterns (e.g., a cycle could consist of one neuron). However, neurons are known to exhibit a property called refractory period; i.e., the time during which another stimulus given to the neuron will not lead to a second action potential (about 1 millisecond). This sets the minimum length of an oscillation, which assures that the pattern is sufficiently sampled and that there cannot be more than one oscillation for any given pattern. As a result one unique oscillation is generated for each unique pattern, independent of the starting state.

PME Implementation of Clue #7:

An analogous refractory period is also implemented by embodiments of a PME. Referring to FIGS. 12 and 13, for example, the total number of states is 10,000, and the address sequence rolls over to the beginning as it steps beyond 10,000. A cycle cannot occur until the sequence rolls over and intersects a state address that has previously occurred. A minimum number of sequences must occur before a cycle is generated. Therefore, the minimum length of a cycle can be set. This assures (with relatively high probability) that there will not be more than one cycle of at least the minimum length that intersect with each other.

Neural Clue #8: Large Memory Capacity

Our brain seems to have an unlimited capacity to learn new patterns. This could be a reflection of the near infinite number of possible oscillations that could occur in a relatively small network.

PME Implementation of Clue #8:

Embodiments of a PME reflect the same large pattern memory capacity, except that the cycles are based on sequences of addresses in conventional memory. As an example, a PME with 100,000 state addresses and a minimum cycle length of 1,000, for example, can reliably converge to a single unique oscillation of about 1,000 sequential states for any given pattern (For a second independent cycle of minimum length 1,000 to exist, it cannot intersect with the first cycle. The probability of a second independent cycle is, thus, the probability of not randomly selecting one of the about 1,000 states of the first cycle in 1,000 tries of the second cycle. This probability for a PME of 100,000 state addresses is: $(0.99)^{1,000} = 0.0000432$, where 0.99 is the probability of not hitting one of 1,000 out of 100,000 in one random try. Therefore, the PME with 100,000 states from above will reliably converge to a single cycle of about 1,000 states.). Mathematically, the pattern capacity of this network corresponds to how many different sequences of 1,000 there are in 100,000.

Neural Clue #9: Detecting Neural Oscillations Using Columnar Structures

The structure of the brain indicates that there are columnar structures that penetrate perpendicularly throughout the cortical layers. Their role is to detect the position of neural oscillations present in the cortical layer. Columnar structures that intersect the path of the oscillation will become active while others not in the path will not. The output of all the columnar structures together can define another input pattern that can be projected onto higher cortical layers and to other structures in the brain. Basically, the network layer encodes the input pattern projected on to it, and the columnar structures communicate it to other neural structures.

PME Hardware Implementation of Clue #9:

Address cycles can be detected by the PME in multiple ways: by detecting when the Current State Address repeats (see e.g., PME implementation of FIG. 17); by waiting until a specified number of state sequences occur to assure statistically (high probability) that it has entered a cycle (see e.g., PME implementation of FIG. 18). Referring to FIG. 17 for illustration, after the Current State Address memory block is in a cycle, the PME may use "vertical sensors," analogous to columnar structures, to "sense" the addresses participating in the cycle. Those intersecting an address, or region of addresses, participating in the cycle output a "1", otherwise a "0". The output of all the vertical sensors together can define another binary input pattern that can be communicated to other PME processors. As illustrated in FIG. 13, vertical sensors can be implemented by adding vertical sensor arrays 1302 and 1304 that are indexed by the current state. In addition to detecting the cycle, they can also create hash addresses that address a hash table where the pattern ID is stored for learning or recognition. Vertical sensor arrays 1302 and 1304 together identify the bit number to set in the selected hash address.

Neural Clue #10: Oscillations as a Common Language of the Brain

Columnar structure outputs can communicate neural oscillations as a new input pattern to other parts of the brain and network layers. In addition, their outputs, from widely different sensor types, can be combined/superimposed to create combined input patterns. A convenient property of oscillations as a pattern representation is that it offers a common language for widely different sensor types, such as vision, speech, tactile, muscular position, etc. Some examples of combined patterns include spatial and/or temporal integration of patterns.

PME Hardware Implementation of Clue #10:

As with columnar structures, vertical sensor outputs can communicate cycles as a new input pattern to one or more other PMEs. Vertical sensor outputs from widely different sensor types can be combined/superimposed to create combined input patterns, spatially or temporally. Address cycles, thus, become a common language of PME.

Neural Clue #11: Context Representation

Our brain processes input patterns in context. For example, you recognize the word "stop" in this sentence as you are reading. If you were driving a car and saw the word "stop," its recognition has a total different meaning because of context. Columnar structures communicate pattern representations (i.e., oscillations) both up from lower levels and down from higher levels. For example, in speech, the pattern representations may be communicated "upward" from phonemes, words, and phrases to meaning. However, they are also communicated "downward" from higher levels. The highest level representations may be the context of our current worldview (e.g., all our senses together).

PME Hardware Implementation of Clue #11:

In some embodiments, the simplicity of hardware implementations of PME allow massively parallel implementations. The parallel PMEs can be configured to communicate pattern representations between them that is optimal for an application. The pattern representation may be derived, for example, from each PME's vertical sensor output and can be communicated to any other PME by adding this output to any other PME's input pattern.

Neural Clue #12: Automatic Temporal Segmentation of Pattern Sequences

A feature of neural oscillations are the inherent ability to identify pattern segments in a continuous stream of sensed data. For example, the sounds from continuous speech consist of plosives followed by other sounds of some duration. The "sounds of some duration" create a somewhat stable frequency spectrum in the cochlea that allows time for an oscillation to occur and also to categorize/recognize the sound. Plosives totally disrupt the frequency spectrum and the oscillation until the next stable sound. The columnar structures project these discrete sequences of stable sounds as an input pattern to higher-level network layers. This input pattern represents pattern sequences of words, phrases, etc.

PME Hardware Implementation of Clue #12:

Embodiments of a PME implement this in a similar manner, except columnar structures are vertical sensors, oscillations are address cycles, the network layer is the next state or next-state increment arrays, and the input pattern is in, for purposes of illustration, the Binary Input Pattern array of FIGS. 12 and 13.

Neural Clue #13: Identifying Similar Patterns

Low level sensory input patterns will rarely be exactly repeatable. Even the same speech sound spoken multiple times by the same speaker will not be exactly repeatable. There is a need to cluster similar patterns together and give them the same identity. Another feature of neural oscillations are the inherent ability to identify patterns that are similar to each other. Similar patterns generate similar overlapping oscillations, and therefore, similar columnar structure outputs. There will be sequences of the oscillations that are common between similar patterns; more for more similar patterns, less for dissimilar patterns.

PME Hardware Implementation of Clue #13:

Embodiments of PME use vertical sensor outputs to create a hash address that accesses a hash table that contains the ID of a learned input pattern. As the cycle sequences, there will be a sequence of hash addresses. Given the bit length of the hash address, the PME can detect segments of the cycle sequence that are still intact relative to the originally learned pattern ID. As a result, a stream of IDs will match the originally learned ID where the sequences remain intact. This can be seen implemented in FIGS. 17 and 18 as the ID Count Histogram Memory block, which accumulates the count for each ID that is read from the ID Memory block as cycle sequences generate hash addresses. If an ID Count reaches a fixed threshold during the cycle, the pattern is recognized.

Neural Clue #14: Learning to Recognize

Neural learning is about assigning identities, predictions, or responses to patterns of information. The patterns may be combinations of sensory input from many different spatial sources (e.g., sound, visual, touch, proprioceptive, etc.) and patterns that combine them in time. The columnar structures feed back or feed forward neural oscillations (i.e., recognized pattern representations) to form patterns that include context. Basically, we learn all the common patterns that occur in our sensed environment that creates our predictable world view.

PME Hardware Implementation of Clue #14:

Embodiments of PME can learn by assigning pattern or cluster IDs to the ID Memory block (see FIGS. 17 and 18) at the hash addresses created by a pattern's cycle and the vertical sensor output bits. The input patterns can be any combination of feedback or feed forward combinations from the outputs of other parallel operating PMEs. These patterns can consist of patterns from widely different sources for sensor fusion (e.g., a combination of video and text). Also, higher-level patterns could describe sequences of patterns in time, such as but not limited to, sounds of speech (i.e., temporal integration). The specific configuration of parallel operating PMEs may be application dependent.

Neural Clue #15: Hebbian Rule; Neurons that Fire Together in Sequence, Wire Together Neurons repeatedly participating in an oscillation create reinforcement in the sequence of neural connections that participate in the oscillation: The result is a preferred path of neural oscillation for familiar repeating patterns—a part of the learning process.

PME Hardware Implementation of Clue #15:

Embodiments of PME can implement reinforcement learning. When a PME learns a new pattern, it may store the pattern's ID to an ID Memory at hash addresses generated by the pattern's cycle. On subsequent recognitions of a similar pattern that recognizes the same ID, the cycle may generate only a portion of the original states trained. That is, the cycles are slightly different. The PME can reinforce learning by assigning the slightly different cycle the same ID, thus reinforcing the learning of the input pattern. The result is a higher probability of recognizing the pattern's ID in future occurrences. The hardware implementation of a PME illustrated in FIG. 18, utilizes a Stored ID Hash Address Memory that stores the hash addresses generated by a cycle. With reinforcement learning enabled (not shown in FIG. 18), any recognized ID can be reinforced by assigning the same ID to any missed hash addresses.

Neural Clue #16: Continuous Processing of Streaming Sensory Patterns

The brain does not operate in batch mode like most computer programs. There is no start processing trigger or done processing trigger; the processing is continuous. This is due to the dynamic nature of the oscillations. There could be many thousands of oscillations running at any instant that together represent the current state of all our sensory inputs. Any change in a sensory input pattern causes an automatic convergence to a new oscillation that causes an adjustment to the dynamic steady state. The nature of the dynamic steady state depends on the feedback or feed forward from columnar structures that communicate these oscillations as input patterns to other neural structures.

PME Hardware Implementation of Clue #16:

Embodiments of a PME can also operate in a dynamic steady state on continuously streaming patterns. For the PME, address cycles can be communicated as input to other PME modules by vertical sensors or the recognized ID itself. Any change in a sensor input can adjust the dynamic steady state, depending on the interconnection between multiple PME modules.

Neural Clue #17: Sensor Driven Coordinated Movement

We have proprioceptive sensors that together create a pattern of all the current muscle positions of our body. This overall sense of body position is probably created by the spatial integration of many thousands of lower-level proprioceptive sensor oscillations. Feedback of oscillations from higher- to lower-level inputs can generate a sequence of new oscillations at lower levels that can initiate learned coordinated movements.

PME Hardware Implementation of Clue #17:

Embodiments of a PME can implement sensor driven process control. Given a cycle generated from the input patterns of one or more sensors, the cycle output (e.g., vertical sensors or just the pattern ID) can be fed back and contribute to the existing input pattern. This, in turn, can generate another cycle that can be trained to initiate an action that then changes the sensor input pattern generating another cycle, etc.

As may be appreciated, a system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes. Logical connections may include wired and/or wireless connectivity to a local area network (LAN), a wide area network (WAN), hotspot, a global communications network, such as the Internet, and so on. The system may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer hardware and software products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A computer-readable storage memory comprising:
input memory comprising addressable blocks of random access memory, the input memory storing an input data pattern;
pattern input address memory comprising addressable blocks of random access memory, each of the addressable blocks storing a predetermined address of the input memory;
current state address memory comprising a block of random access memory storing a current state address;
at least one next state memory comprising addressable blocks of random access memory, each of the addressable blocks storing predetermined data for determining a next state address to store in the current state address memory;

wherein the pattern input address memory and the at least one next state memory are each sized with at least a number of addressable blocks as a maximum state address storable in the current state address memory; and wherein the current state address indexes an addressable block of the pattern input address memory and the at least one next state memory; and pattern map memory comprising addressable blocks of random access memory, data in an addressable block of the pattern map memory indexed by the predetermined address in an addressable block of the pattern input address memory indexed by the current state address;

wherein each addressable block of the pattern map memory stores data identifying the type of data stored in an addressable block of the input memory indexed by the predetermined address in an addressable block of the pattern input address memory indexed by the current state address.

2. The computer-readable storage memory of claim 1, wherein the at least one next state memory comprises at least two next state memories, each comprising addressable blocks of random access memory, each of the addressable blocks storing predetermined data for determining a next state address to store in the current state address memory; and wherein data in an addressable block of the input memory indexed by the predetermined address in an addressable block of the pattern input address memory indexed by the current state address determines which of the at least two next state memories to index for determining a next state address to store in the current state address memory.

3. The computer-readable storage memory of claim 2, further comprising: magnitude comparison memory comprising addressable blocks of random access memory, each of the addressable blocks storing a predetermined magnitude value;

wherein data in an addressable block of the input memory indexed by the predetermined address in an addressable block of the pattern input address memory indexed by the current state address is compared with a magnitude value in an addressable block of the magnitude comparison memory indexed by the current state address, and the result of the comparison determines which of the at least two next state memories to index for determining a next state address to store in the current state address memory.

4. The computer-readable storage memory of claim 1, wherein the predetermined data in each of the addressable blocks of the at least one next state memory comprises a random number between a predetermined range of numbers.

5. The computer-readable storage memory of claim 1, wherein the predetermined data in each of the addressable blocks of the at least one next state memory comprises a next state address value, the next state address value being a summation of an index of the respective addressable block of the at least one next state memory and a random number between a predetermined range of numbers.

6. The computer-readable storage memory of claim 2, further comprising ID memory comprising addressable blocks of random access memory, each of the addressable blocks storing an ID hash of predetermined bits, and addressable by an ID hash index.

7. The computer-readable storage memory of claim 6, further comprising vertical sensory memory comprising addressable blocks of random access memory, each of the addressable blocks storing predetermined data from which a hash index and bit number can be determined, the bit number identifying which bit in the ID hash indexed in the ID memory by the hash index to set.

8. The computer-readable storage memory of claim 1, wherein the type of data stored in an addressable block of the input memory comprises one of binary data, magnitude data, or category data.

9. The computer-readable storage memory of claim 8, wherein category data comprises data from a dataset having a predetermined number of data choices.

10. The computer-readable storage memory of claim 9,
wherein the at least one next state memory comprises a next state memory corresponding to each data choice, each comprising addressable blocks of random access memory, each of the addressable blocks storing predetermined data for determining a next state address to store in the current state address memory; and wherein, if an addressable block of the pattern map memory indexed by the predetermined address in an addressable block of the pattern input address memory indexed by the current state address identifies the type of data stored in an addressable block of the input memory indexed by the predetermined address in an addressable block of the pattern input address memory indexed by the current state address as a category type, then a next state address to store in the current state address memory is determined from data in the next state memory corresponding to the data in an addressable block of the input memory indexed by the predetermined address in an addressable block of the pattern input address memory indexed by the current state address.

11. The computer-readable storage memory of claim 6, wherein the ID hashes of ID memory are determined from a sequence of selections of the at least two next state memories.

12. A parallel pattern memory engine comprising at least two of the computer-readable storage memories of claim 1 operating in parallel.

13. The parallel pattern memory engine of claim 12,
wherein the addressable blocks of the pattern input address memory of one of the at least two of the computer-readable storage memories comprises a different set of predetermined addresses than the addressable blocks of the pattern input address memory of another of the at least two of the computer-readable storage memories; and wherein the addressable blocks of the at least one next state memory of one of the at least two of the computer-readable storage memories comprises a different set of predetermined data than the addressable blocks of the at least one next state memory of another of the at least two of the computer-readable storage memories.

14. The parallel pattern memory engine of claim 12, wherein the input data pattern of one of the at least two of the computer-readable storage memories comprises data from a different source than the input data pattern of another of the at least two of the computer-readable storage memories.

15. The parallel pattern memory engine of claim 14, further comprising:

a first sensor generating a first type of data and providing pattern data as the input data pattern to one of the at least two of the computer-readable storage memories; and a second sensor generating a second type of data and providing pattern data as the input data pattern to another of the at least two of the computer-readable storage memories.

16. A serial pattern memory engine comprising at least two of the computer-readable storage memories of claim 1 operating in serial, such that a computer-readable storage memory of the at least two computer-readable storage memories of claim 1 on a lower level provides its output to a computer-readable storage memory of the at least two computer-readable storage memories of claim 1 on a higher level.

17. The serial pattern memory engine of claim 16, further comprising at least two of the computer-readable storage memories of claim 1 operating in parallel.

18. The serial pattern memory engine of claim 16, wherein a computer-readable storage memory of the at least two computer-readable storage memories of claim 1 on a higher level provides its output as feedback to a computer-readable storage memory of the at least two computer-readable storage memories of claim 1 on a lower level.

* * * * *